US006117967A

United States Patent [19]

Fuller et al.

[11] Patent Number: 6,117,967

[45] Date of Patent: Sep. 12, 2000

[54] ARYLENE ETHER ALCOHOL POLYMERS

[75] Inventors: Timothy J. Fuller, Pittsford; John F. Yanus, Webster; Damodar M. Pai; Markus R. Silvestri, both of Fairport; Ram S. Narang, Macedon; William W. Limburg, Penfield; Dale S. Renfer, Webster, all of N.Y.

[73] Assignee: Xerox Corporation, Stamford, Conn.

[21] Appl. No.: 09/326,169

[22] Filed: Jun. 4, 1999

[51] Int. Cl.[7] .............................. C08G 14/00; C08G 8/02

[52] U.S. Cl. .......................... 528/125; 528/127; 528/128; 528/488; 528/499; 522/111; 522/146; 522/149; 522/155; 522/162; 430/270.1; 430/280.1; 430/281.1; 430/311

[58] Field of Search .................................... 528/125, 127, 528/128, 488, 499; 522/111, 146, 149, 155, 162; 430/270.1, 280.1, 281.1, 311

[56] References Cited

U.S. PATENT DOCUMENTS

| | | | |
|---|---|---|---|
| 2,125,968 | 8/1938 | Theimer | 260/153 |
| 3,367,914 | 2/1968 | Herbert | 260/52 |
| 3,455,868 | 7/1969 | D'Alessandro | 260/38 |
| 3,914,194 | 10/1975 | Smith | 260/18 R |
| 4,086,209 | 4/1978 | Hara et al. | 260/49 |
| 4,110,279 | 8/1978 | Nelson et al. | 260/19 R |
| 4,435,496 | 3/1984 | Walls et al. | 430/285 |
| 4,448,948 | 5/1984 | Tsubaki et al. | 528/95 |
| 4,623,558 | 11/1986 | Lin | 427/44 |
| 4,667,010 | 5/1987 | Eldin | 528/125 |
| 4,739,032 | 4/1988 | Jones | 528/230 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,818,650 | 4/1989 | Limburg et al. | 430/56 |
| 4,935,487 | 6/1990 | Yanus et al. | 528/203 |
| 4,956,440 | 9/1990 | Limburg et al. | 528/99 |
| 5,030,532 | 7/1991 | Limburg et al. | 430/56 |
| 5,268,444 | 12/1993 | Jensen et al. | 528/125 |
| 5,336,577 | 8/1994 | Spiewak et al. | 430/59 |
| 5,336,720 | 8/1994 | Richards | 525/78 |
| 5,438,082 | 8/1995 | Helmer-Metzmann et al. | 522/149 |
| 5,561,202 | 10/1996 | Helmer-Metzmann et al. | 525/471 |
| 5,728,498 | 3/1998 | Yanus et al. | 430/59 |

FOREIGN PATENT DOCUMENTS

| | | |
|---|---|---|
| 0-281-808 | 9/1988 | European Pat. Off. . |
| 0 663 411 A1 | 7/1995 | European Pat. Off. . |
| 0 698 823 A1 | 2/1996 | European Pat. Off. . |
| 56-050-928 | 5/1981 | Japan . |
| 56-50-929 | 5/1981 | Japan . |
| 6-57-826 | 5/1981 | Japan . |
| 63-247757 A2 | 11/1988 | Japan . |
| 04294748 | 10/1992 | Japan . |

OTHER PUBLICATIONS

Daly, "Chloromethylation of Condensation Polymers Containing an Oxy–1,4–Phenylene Backbone," Polymers Preprints (1979), vol. 20, No. 1, pp. 835–837.

Camps, "Chloromethylstyrene: Synthesis, Polymerization, Transformations, Applications," JMS–REV. Macromol, Chem. Phys., C22(3), 343–407 (1982–83).

Tabata, "Pulse Radiolysis Studies on the Mechanism of the High Sensitivity of Chloromethylated Polystyrene as an Electron Negative Resist," 1984 pp. 287–288.

Jurek, "Deep UV Photochemistry of Copolymers of Trimethylsilymethyl Methacrylate and Chloromethylstyrene," Polymer Preprints, 1988, pp. 546–547.

Hergenrother, "Poly(arylene ethers)," Polymer, 1988, vol. 29, Feb.

(List continued on next page.)

*Primary Examiner*—Duc Truong

*Attorney, Agent, or Firm*—Judith L. Byorick

[57] ABSTRACT

Disclosed is a polymer of the formula

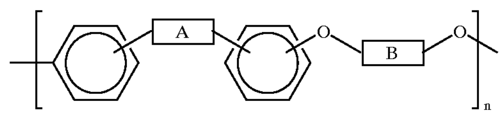

wherein A is

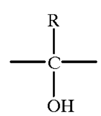

or a mixture of

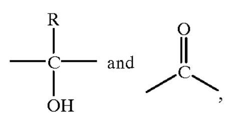

wherein R is a hydrogen atom, an alkyl group, an aryl group, or mixtures thereof, B is one of specified groups, such as

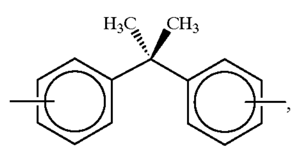

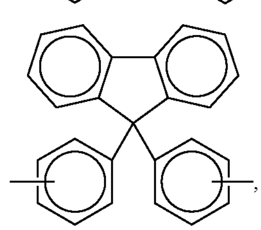

or mixtures thereof, and n is an integer representing the number of repeating monomer units.

26 Claims, No Drawings

OTHER PUBLICATIONS

Havens, "Ethynyl–Terminated Polyarylates: Synthesis and Characterization," Journal of Polymer Science: Polymer Chemistry Edition, vol. 22 (1984), pp. 3011–3025.
Hendricks, "Flare, A Low Dielectric Constant, High Tg, Thermally Stable Poly(Arylene Ether) Dielectric for Microelectronic Circuit Interconnect Process Integration: Synthesis, Characterization, Thermomechanical Properties, and Thin–Film Processing Studies," Polymer Preprints 37(1) 150 (1996), vol. 37, No. 1, Mar. 1996, pp. 150–151.
Zupancic, "Styrene Terminated Resins as Interlevel Dielectrics for Multichip Modules," 1991, pp. 178–179.
Percec, "Functional Polymers and Sequential Copolymers by Phase Transfer Catalysis, 2a)," Makromal Chem., 1984, pp. 1867–1880.
Percec, "Functional Polymers and Sequential Copolymers by Phase Transfer Catalysis, 3a)," Makronal Chem., 1984, pp. 2319–2336.
Percec, "Functional Polymers and Sequential Copolymers by Phase Transfer Catalysis 4. A New and Convenient Synthesis of p– and m–Hydrozymethylphenylacetylene," Polymer Bulletin 10, 223–230, 1983.

Amato, "A New Preparation of Chloromethyl Methyl Ether Free of Bis(chlorormethyl) Ether," 1979 Georg Thieme Publishers.

McKillopp, "A Simple and Inexpensive Procedure for Chloromethylation of Certain Aromatic Compounds," Tetrahedron Letters, vol. 24, No. 18, 1983, pp. 1933–1936.

Tepenitsyna, "Synthesis of Intermediates for Production of Heat Resistant Polymers (Chloromethylation of Diphenyl Oxide)," Zhurnal Prikladnoi Khimii, vol. 40, No. 11, Nov., 1967, pp. 2540–2546.

ARYLENE ETHER ALCOHOL POLYMERS

BACKGROUND OF THE INVENTION

The present invention is directed to high performance polymers and processes for the preparation thereof. More specifically, the present invention is directed to high performance polymers suitable for applications such as photoresists, microelectronic devices, ink jet printheads, electrophotographic imaging members, and the like. One embodiment of the present invention is directed to a polymer of the

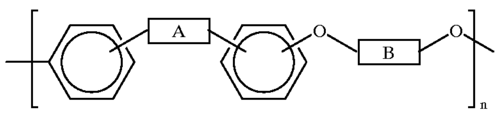

wherein A is

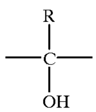

or a mixture of

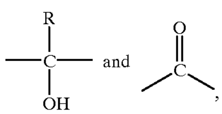

wherein R is a hydrogen atom, an alkyl group, an aryl group, or mixtures thereof, B is

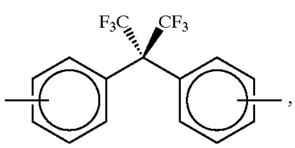

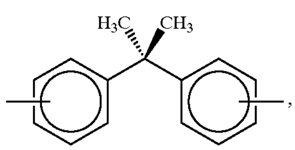

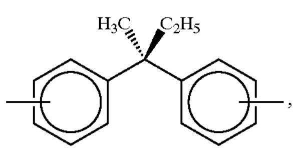

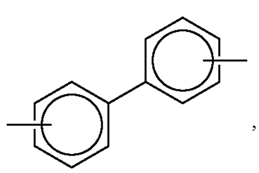

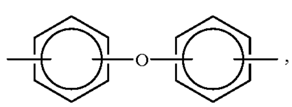

-continued

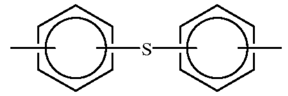

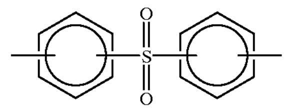

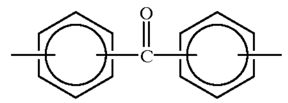

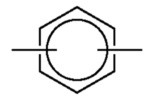

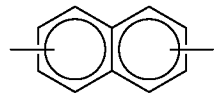

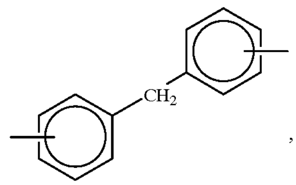

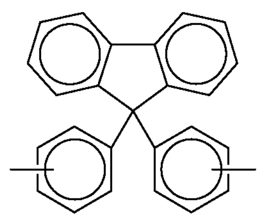

$-(CH_2)_v-$, wherein v is an integer of from 1 to about 20,

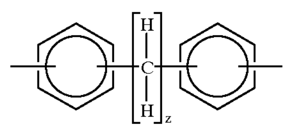

wherein z is an integer of from 2 to about 20,

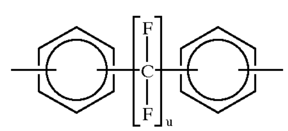

wherein u is an integer of from 1 to about 20,

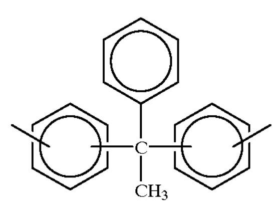

-continued

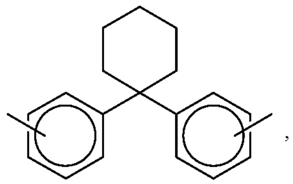

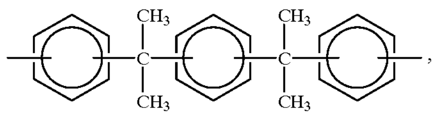

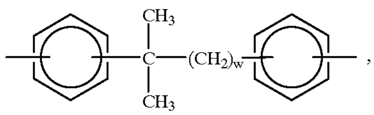

wherein w is an integer of from 1 to about 20,

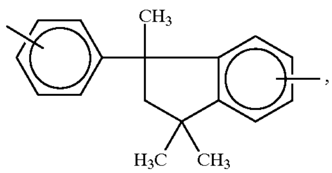

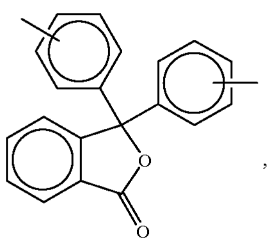

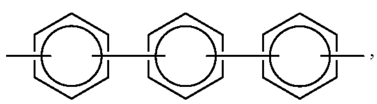

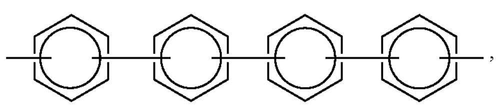

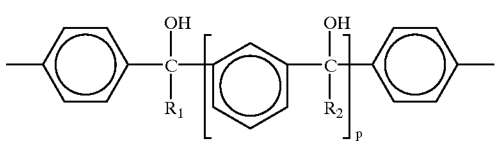

wherein $R_1$ and $R_2$ each, independently of the other, are hydrogen atoms, alkyl groups, or aryl groups, and p is an integer of 0 or 1,

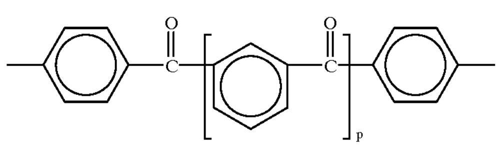

wherein p is an integer of 0 or 1,

—$(CH_2O)_t$— wherein t is an integer of from 1 to about 20,

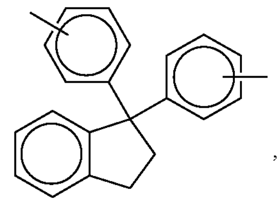

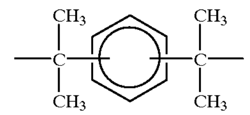

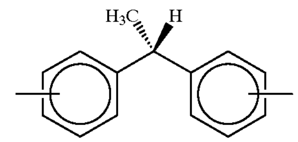

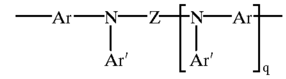

wherein (1) Z is

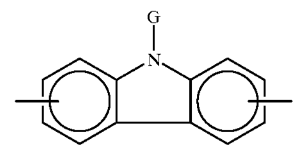

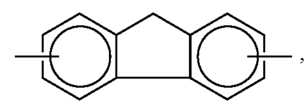

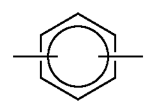

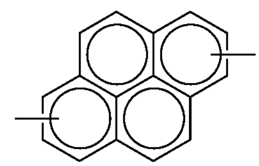

, or —Ar—$(X)_p$—Ar— wherein p is 0 or 1; (2) Ar is

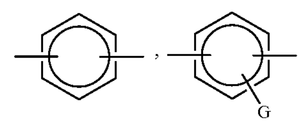

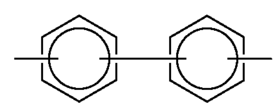

(3) G is an alkyl group selected from alkyl or isoalkyl groups containing from about 2 to about 10 carbon atoms; (4) Ar' is

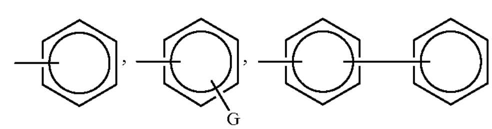

(5) X is

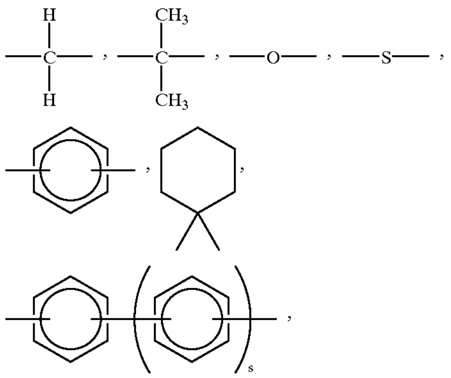

wherein s is 0, 1, or 2,

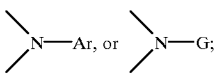

and (6) q is 0 or 1; or mixtures thereof, hydroxy-substituted, hydroxyalkyl-substituted, or hydroxyaryl-substituted derivatives thereof, or mixtures thereof, and n is an integer representing the number of repeating monomer units. Another embodiment of the present invention is directed to a polymer of the formula

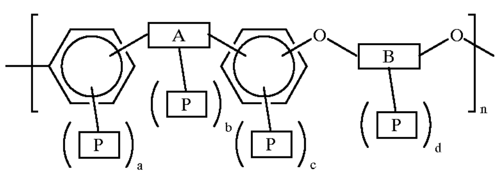

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A and B are as defined above, and n is an integer representing the number of repeating monomer units. Yet another embodiment of the present invention is directed to a crosslinked or chain extended polymer formed by crosslinking or chain extending a precursor polymer having terminal end groups and monomer repeat units, said precursor polymer being of the formula

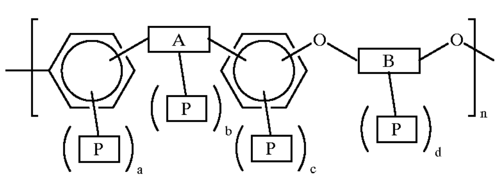

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A and B are as defined above, and n is an integer representing the number of repeating monomer units, said crosslinking or chain extension occurring through crosslinking substituents contained on at least some of the monomer repeat units of the precursor polymer. Still another embodiment of the present invention is directed to a process for preparing a polymer which comprises (1) providing a precursor polymer of the formula

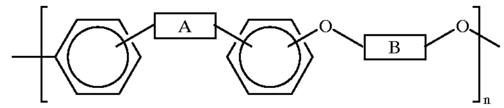

wherein A is

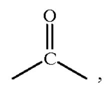

B is

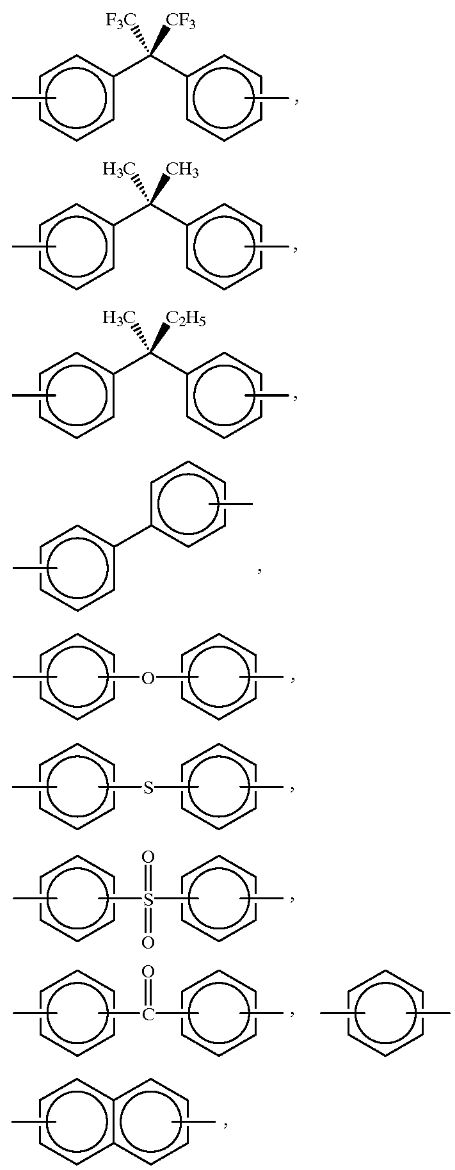

-continued

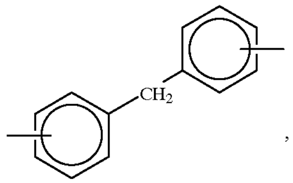

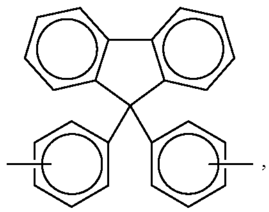

$-(CH_2)_v-$, wherein v is an integer of from 1 to about 20,

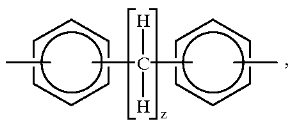

wherein z is an integer of from 2 to about 20,

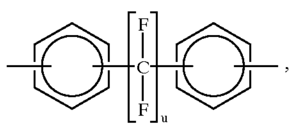

wherein u is an integer of from 1 to about 20,

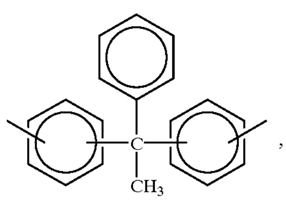

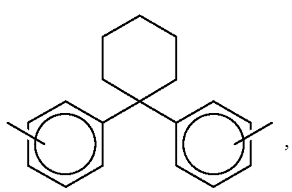

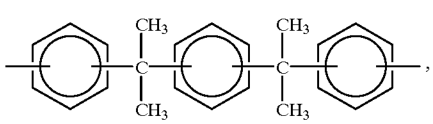

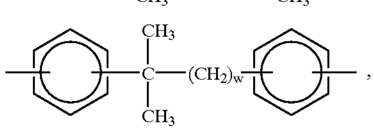

wherein w is an integer of from 1 to about 20,

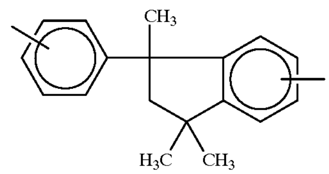

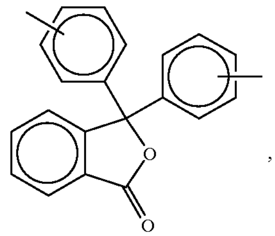

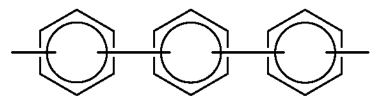

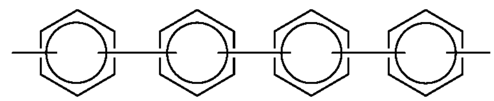

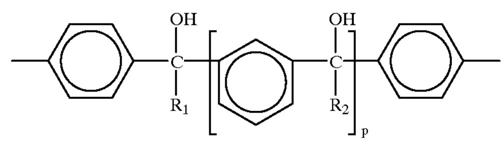

wherein $R_1$ and $R_2$ each, independently of the other, are hydrogen atoms, alkyl groups, or aryl groups, and p is an integer of 0 or 1,

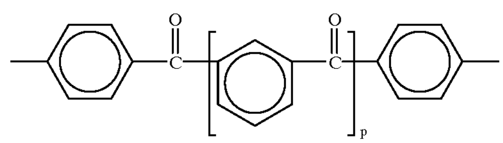

wherein p is an integer of 0 or 1, $-(CH_2O)_t-$ wherein t is an integer of from 1 to about 20,

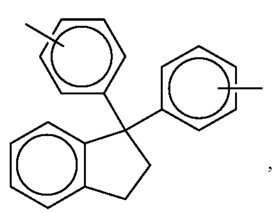

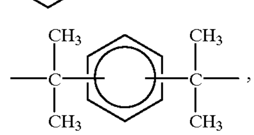

-continued

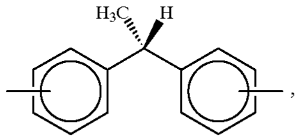

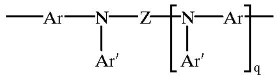

wherein (1) Z is

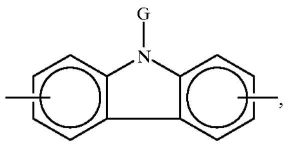

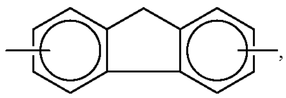

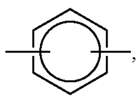

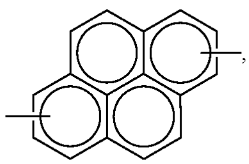

—Ar—(X)$_p$—Ar— wherein p is 0 or 1; (2) Ar is

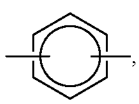

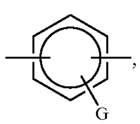

or

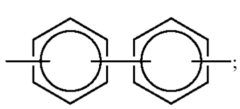

(3) G is an alkyl group selected from alkyl or isoalkyl groups containing from about 2 to about 10 carbon atoms; (4) Ar' is

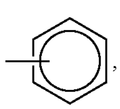

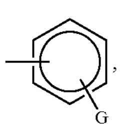

or

-continued

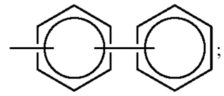

(5) X is

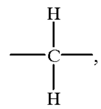

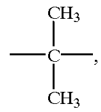

—O—,

—S—,

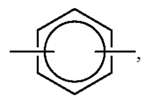

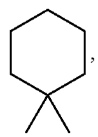

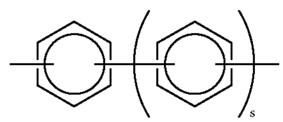

wherein s is 0, 1 or 2,

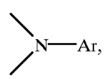

or

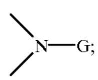

and (6) q is 0 or 1; or mixtures thereof, hydroxy-substituted, hydroxyalkyl-substituted, or hydroxyaryl-substituted derivatives thereof, or mixtures thereof, and n is an integer representing the number of repeating monomer units, and (2) reacting the precursor polymer with borane, resulting in formation of a polymer of the formula

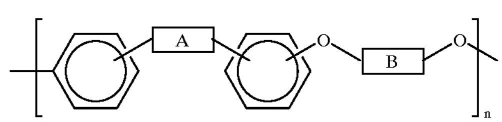

wherein A is

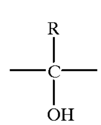

or a mixture of

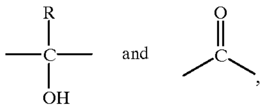

wherein R is a hydrogen atom, an alkyl group, an aryl group, or mixtures thereof. Another embodiment of the present invention is directed to a process for preparing a polymer which comprises (1) providing a precursor polymer of the formula

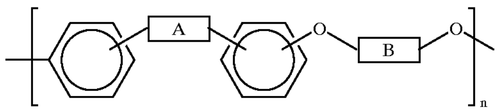

wherein A is

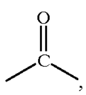

B is

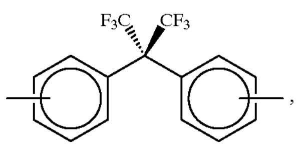

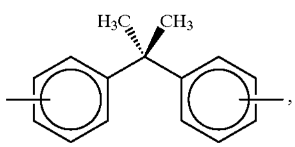

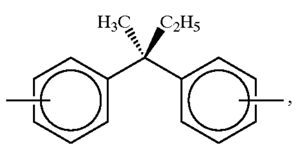

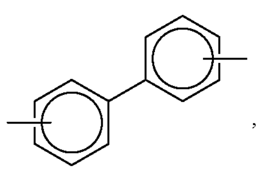

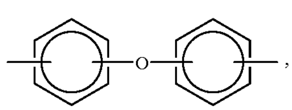

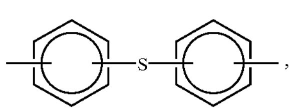

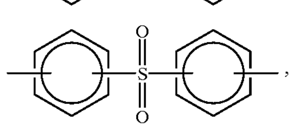

-continued

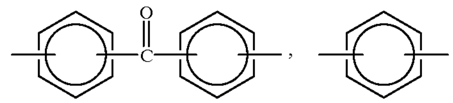

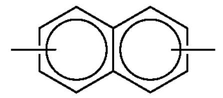

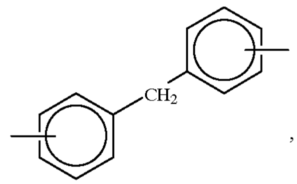

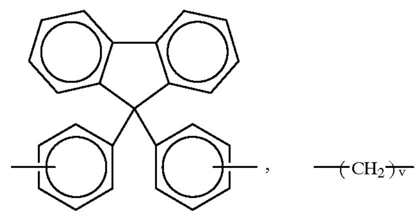

wherein V is an integer of from 2 to about 20,

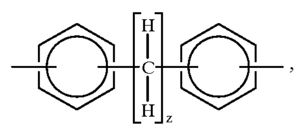

wherein v is an integer of from 2 to about 20,

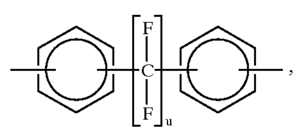

wherein u is an integer of from 1 to about 20,

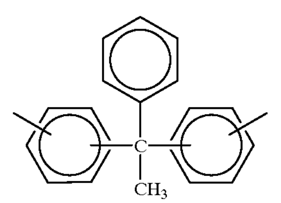

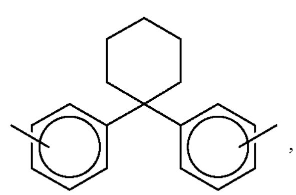

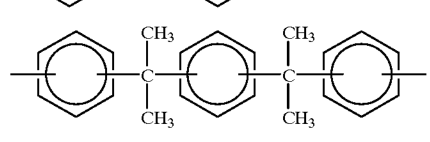

-continued

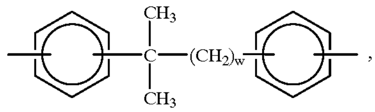

wherein w is an integer of from 1 to about 20,

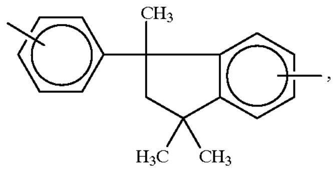

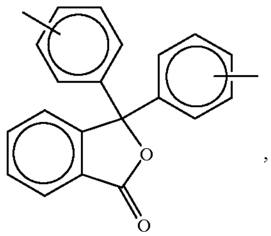

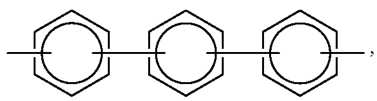

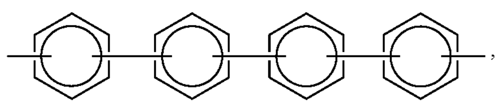

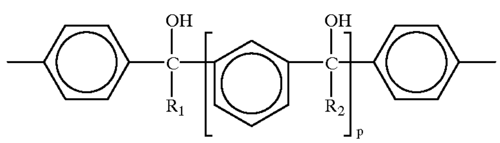

wherein $R_1$ and $R_2$ each, independently of the other, are hydrogen atoms, alkyl groups, or aryl groups, and p is an integer of 0 or 1,

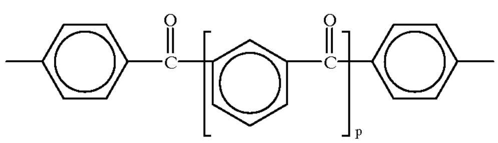

wherein p is an integer of 0 or 1, $-(CH_2O)_t-$ wherein t is an integer of from 1 to about 20,

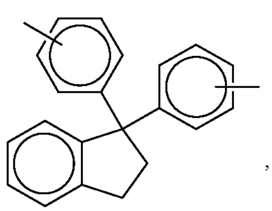

-continued

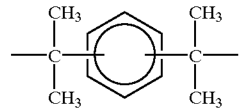

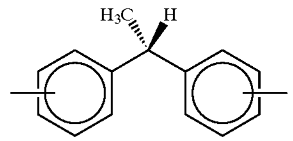

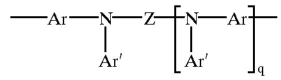

wherein (1) Z is

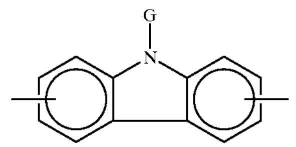

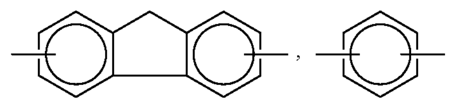

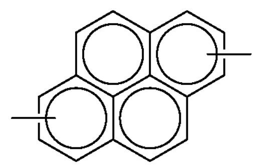

, or $-Ar-(X)_p-Ar-$ wherein p is 0 or 1; (2) Ar is

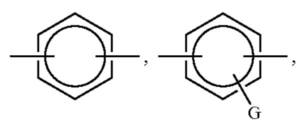

or

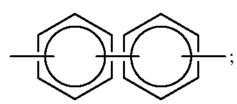

(3) G is an alkyl group selected from alkyl or isoalkyl groups containing from about 2 to about 10 carbon atoms; (4) Ar' is

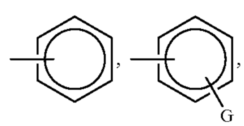

or

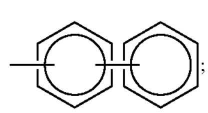

(5) X is

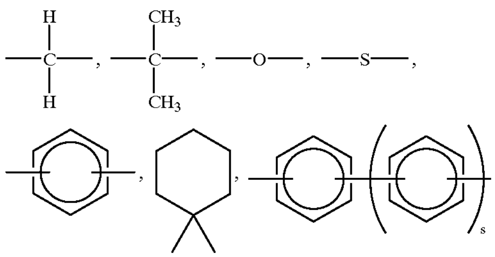

wherein s is 0, 1, or 2,

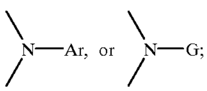

and (6) q is 0 or 1; or mixtures thereof, hydroxy-substituted, hydroxyalkyl-substituted, or hydroxyaryl-substituted derivatives thereof, or mixtures thereof, and n is an integer representing the number of repeating monomer units, (2) reacting the precursor polymer with a reagent of the formula RMgX, wherein R is a hydrogen atom, an alkyl group, an aryl group, or mixtures thereof and X is a halogen atom, and (3) subsequent to step 2, adding water or acid to the polymer, thereby resulting in formation of a polymer of the formula

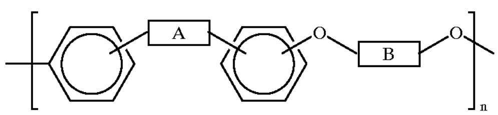

wherein A is

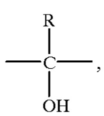

or a mixture of

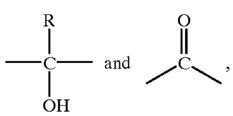

wherein R is a hydrogen atom, an alkyl group, an aryl group, or mixtures thereof.

In microelectronics applications, there is a great need for low dielectric constant, high glass transition temperature, thermally stable, photopatternable polymers for use as interlayer dielectric layers and as passivation layers which protect microelectronic circuitry. Poly(imides) are widely used to satisfy these needs; these materials, however, have disadvantageous characteristics such as relatively high water sorption and hydrolytic instability. There is thus a need for high performance polymers which can be effectively photopatterned and developed at high resolution.

One particular application for such materials is the fabrication of ink jet printheads. Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are different types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to vaporize almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses. At this point, the resistor is no longer being heated because the current pulse has passed and, concurrently with the bubble collapse, the droplet is propelled at a high rate of speed in a direction towards a recording medium. The surface of the printhead encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet equipment and processes are well known and are described in, for example, U.S. Pat. No. 4,601,777, U.S. Pat. No. 4,251,824, U.S. Pat. No. 4,410,899, U.S. Pat. No. 4,412,224, U.S. Pat. No. 4,532,530, and U.S. Pat. No. 4,774,530, the disclosures of each of which are totally incorporated herein by reference.

The present invention is suitable for ink jet printing processes, including drop-on-demand systems such as thermal ink jet printing, piezoelectric drop-on-demand printing, and the like.

In ink jet printing, a printhead is usually provided having one or more ink-filled channels communicating with an ink supply chamber at one end and having an opening at the opposite end, referred to as a nozzle. These printheads form images on a recording medium such as paper by expelling droplets of ink from the nozzles onto the recording medium. The ink forms a meniscus at each nozzle prior to being expelled in the form of a droplet. After a droplet is expelled, additional ink surges to the nozzle to reform the meniscus.

In thermal ink jet printing, a thermal energy generator, usually a resistor, is located in the channels near the nozzles a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. The rapidly expanding vapor bubble pushes the column of ink filling the channel towards the nozzle. At the end of the current pulse the heater rapidly cools and the vapor bubble begins to collapse. However, because of inertia, most of the column of ink that received an impulse from the exploding bubble continues its forward motion and is ejected from the nozzle as an ink drop. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper.

Ink jet printheads include an array of nozzles and may, for example, be formed of silicon wafers using orientation dependent etching (ODE) techniques. The use of silicon wafers is advantageous because ODE techniques can form structures, such as nozzles, on silicon wafers in a highly precise manner. Moreover, these structures can be fabricated efficiently at low cost. The resulting nozzles are generally triangular in cross-section. Thermal ink jet printheads made by using the above-mentioned ODE techniques typically comprise a channel plate which contains a plurality of nozzle-defining channels located on a lower surface thereof bonded to a heater plate having a plurality of resistive heater elements formed on an upper surface thereof and arranged so that a heater element is located in each channel. The upper surface of the heater plate typically includes an insulative layer which is patterned to form recesses exposing the individual heating elements. This insulative layer is referred to as a "pit layer" and is sandwiched between the channel plate and heater plate. For examples of printheads employing this construction, see U.S. Pat. No. 4,774,530 and U.S. Pat. No. 4,829,324, the disclosures of each of which are totally incorporated herein by reference. Additional examples of thermal ink jet printheads are disclosed in, for example, U.S. Pat. No. 4,835,553, U.S. Pat. No. 5,057,853, and U.S. Pat. No. 4,678,529, the disclosures of each of which are totally incorporated herein by reference.

The photopatternable polymers of the present invention are also suitable for other photoresist applications, including other microelectronics applications, printed circuit boards, lithographic printing processes, interlayer dielectrics, and the like.

The formation and development of images on the surface of photoconductive materials by electrostatic means is well known. The basic electrophotographic imaging process, as taught by C. F. Carlson in U.S. Pat. No. 2,297,691, entails placing a uniform electrostatic charge on a photoconductive imaging member, exposing the imaging member to a light and shadow image to dissipate the charge on the areas of the imaging member exposed to the light, and developing the resulting electrostatic latent image by depositing on the image a finely divided electroscopic material known as toner. In charge area development (CAD) systems, the toner will normally be attracted to those areas of the imaging member which retain a charge, thereby forming a toner image corresponding to the electrostatic latent image. In discharge area development (DAD) systems, the toner will normally be attracted to those areas of the imaging member which have less or no charge as a result of exposure to light, thereby forming a toner image corresponding to the electrostatic latent image. This developed image may then be transferred to a substrate such as paper. The transferred image may subsequently be permanently affixed to the substrate by heat, pressure, a combination of heat and pressure, or other suitable fixing means such as solvent or overcoating treatment.

Imaging members for electrophotographic imaging systems comprising selenium alloys vacuum deposited on substrates are known. Imaging members have also been prepared by coating substrates with photoconductive particles dispersed in an organic film forming binder. Coating of rigid drum substrates has been effected by various techniques such as spraying, dip coating, vacuum evaporation, and the like. Flexible imaging members can also be manufactured by processes that entail coating a flexible substrate with the desired photoconducting material.

Some photoresponsive imaging members consist of a homogeneous layer of a single material such as vitreous selenium, and others comprise composite layered devices containing a dispersion of a photoconductive composition. An example of a composite xerographic photoconductive member is described in U.S. Pat. No. 3,121,006, which discloses finely divided particles of a photoconductive inorganic compound dispersed in an electrically insulating organic resin binder. Imaging members prepared according to the teachings of this patent contain a binder layer with particles of zinc oxide uniformly dispersed therein coated on a paper backing. The binders disclosed in this patent include materials such as polycarbonate resins, polyester resins, polyamide resins, and the like.

Photoreceptor materials comprising inorganic or organic materials wherein the charge generating and charge transport functions are performed by discrete contiguous layers are also known. Additionally, layered photoreceptor members are disclosed in the prior art, including photoreceptors having an overcoat layer of an electrically insulating polymeric material. Other layered photoresponsive devices have been disclosed, including those comprising separate photogenerating layers and charge transport layers as described in U.S. Pat. No. 4,265,990, the disclosure of which is totally incorporated herein by reference. Photoresponsive materials containing a hole injecting layer overcoated with a hole transport layer, followed by an overcoating of a photogenerating layer, and a top coating of an insulating organic resin, are disclosed in U.S. Pat. No. 4,251,612, the disclosure of which is totally incorporated herein by reference. Examples of photogenerating layers disclosed in these patents include trigonal selenium and phthalocyanines, while examples of transport layers include certain aryl diamines as illustrated therein.

In addition, U.S. Pat. No. 3,041,167 discloses an overcoated imaging member containing a conductive substrate, a photoconductive layer, and an overcoating layer of an electrically insulating polymeric material. This member can be employed in electrophotographic imaging processes by initially charging the member with an electrostatic charge of a first polarity, followed by exposing it to form an electrostatic latent image that can subsequently be developed to form a visible image.

U.S. Pat. No. 3,914,194 (Smith), the disclosure of which is totally incorporated herein by reference, discloses a formaldehyde copolymer resin having dependent unsaturated groups with the repeating unit

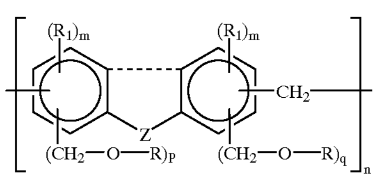

wherein R is an aliphatic acyl group derived from saturated acids having 2 to 6 carbons, olefinically unsaturated acids having 3 to 20 carbons, or an omega-carboxy-aliphatic acyl group derived from olefinically unsaturated dicarboxylic acids having 4 to 12 carbons or mixtures thereof, $R_1$ is independently hydrogen, an alkyl group of 1 to 10 carbon atoms, or halogen, Z is selected from oxygen, sulfur, the group represented by Z taken with the dotted line represents dibenzofuran and dibenzothiophene moieties, or mixtures thereof, n is a whole number sufficient to give a weight average molecular weight greater than about 500, m is 0 to 2, p and q have an average value of 0 to 1 with the proviso that the total number of p and q groups are sufficient to give greater than one unsaturated group per resin molecule. These resins are useful to prepare coatings on various substrates or for potting electrical components by mixing with reactive diluents and curing agents and curing.

"Chloromethylation of Condensation Polymers Containing an oxy-1,4-phenylene Backbone," W. H. Daly et al., *Polymer Preprints*, Vol. 20,No. 1, 835 (1979), the disclosure of which is totally incorporated herein by reference, discloses the chloromethylation of polymers containing oxyphenylene repeat units to produce film forming resins with high chemical reactivity. The utility of 1,4-bis (chloromethoxy) butane and 1-chloromethoxy-4-chlorobutane as chloromethylating agents are also described.

European Patent Application EP-0,698,823-A1 (Fahey et al.), the disclosure of which is totally incorporated herein by reference, discloses a copolymer of benzophenone and bisphenol A which was shown to have deep ultraviolet absorption properties. The copolymer was found useful as an antireflective coating in microlithography applications. Incorporating anthracene into the copolymer backbone enhanced absorption at 248 nm. The encapper used for the copolymer varied depending on the needs of the user and was selectable to promote adhesion, stability, and absorption of different wavelengths.

M. Camps, M. Chatzopoulos, and J. Montheard, "Chloromethyl Styrene: Synthesis, Polymerization, Transformations, Applications," *JMS—Rev. Macromol. Chem. Phys.*, C22(3), 343–407 (1982–3), the disclosure of which is totally incorporated herein by reference, discloses processes for the preparation of chloromethyl-substituted polystyrenes, as well as applications thereof.

Y. Tabata, S. Tagawa, and M. Washio, "Pulse Radiolysis Studies on the Mechanism of the High Sensitivity of Chloromethylated Polystyrene as an Electron Negative Resist," *Lithography,* 25(1), 287 (1984), the disclosure of which is totally incorporated herein by reference, discloses the use of chloromethylated polystyrene in resist applications.

M. J. Jurek, A. E. Novembre, I. P. Heyward, R. Gooden, and E. Reichmanis, "Deep UV Photochemistry of Copolymers of Trimethyl-Silylmethyl Methacrylate and Chloromethylstyrene," *Polymer Preprints,* 29(1) (1988), the disclosure of which is totally incorporated herein by reference, discloses the use of an organosilicon polymer of chloromethylstyrene for resist applications.

P. M. Hergenrother, B. J. Jensen, and S. J. Havens, "Poly(arylene ethers)," *Polymer,* 29, 358 (1988), the disclosure of which is totally incorporated herein by reference, discloses several arylene ether homopolymers and copolymers prepared by the nucleophilic displacement of aromatic dihalides with aromatic potassium bisphenates. Polymer glass transition temperatures ranged from 114 to 310° C. and some were semicrystalline. Two ethynyl-terminated polyarylene ethers) were synthesized by reacting hydroxy-terminated oligomers with 4-ethynylbenzoyl chloride. Heat induced reaction of the acetylenic groups provided materials with good solvent resistance. The chemistry, physical, and mechanical properties of the polymers are also disclosed.

S. J. Havens, "Ethynyl-Terminated Polyarylates: Synthesis and Characterization," *Journal of Polymer Science: Polymer Chemistry Edition*, vol. 22, 3011–3025 (1984), the disclosure of which is totally incorporated herein by reference, discloses hydroxy-terminated polyarylates with number average molecular weights of about 2500, 5000, 7500, and 10,000 which were synthesized and converted to corresponding 4-ethynylbenzoyloxy-terminated polyarylates by reaction with 4-ethynylbenzoyl chloride. The terminal ethynyl groups were thermally reacted to provide chain extension and crosslinking. The cured polymer exhibited higher glass transition temperatures and better solvent resistance than a high molecular weight linear polyarylate. Solvent resistance was further improved by curing 2,2-bis (4-ethynylbenzoyloxy-4'-phenyl)propane, a coreactant, with the ethynyl-terminated polymer at concentrations of about 10 percent by weight.

N. H. Hendricks and K. S. Y. Lau, "Flare, a Low Dielectric Constant, High Tg, Thermally Stable Poly(arylene ether) Dielectric for Microelectronic Circuit Interconnect Process Integration: Synthesis, Characterization, Thermomechanical Properties, and Thin-Film Processing Studies," Polymer Preprints, 37(1), 150 (1996), the disclosure of which is totally incorporated herein by reference, discloses non-carbonyl containing aromatic polyethers such as fluorinated poly(arylene ethers) based on decafluorobiphenyl as a class of intermetal dielectrics for applications in sub-half micron multilevel interconnects.

J. J. Zupancic, D. C. Blazej, T. C. Baker, and E. A. Dinkel, "Styrene Terminated Resins as Interlevel Dielectrics for Multichip Models," *Polymer Preprints,* 32, (2), 178 (1991), the disclosure of which is totally incorporated herein by reference, discloses vinylbenzyl ethers of polyphenols (styrene terminated resins) which were found to be photochemically and thermally labile, generating highly crosslinked networks. The resins were found to yield no volatile by-products during the curing process and high glass transition, low dielectric constant coatings. One of the resins was found to be spin coatable to varying thickness coatings which could be photodefined, solvent developed, and then hard baked to yield an interlevel dielectric.

Japanese Patent Kokai JP 04294148-A, the disclosure of which is totally incorporated herein by reference, discloses a liquid injecting recording head containing the cured matter of a photopolymerizable composition comprising (1) a graft polymer comprising (A) alkyl methacrylate, acrylonitrile, and/or styrene as the trunk chain and an —OH group-containing acryl monomer, (B) amino or alkylamino group-containing acryl monomer, (C) carboxyl group-containing acryl or vinyl monomers, (D) N-vinyl pyrrolidone, vinyl pyridine or its derivatives, and/or (F) an acrylamide as the side chain; (2) a linear polymer containing constitutional units derived from methyl methacrylate, ethyl methacrylate, isobutyl methacrylate, t-butyl methacrylate, benzyl methacrylate, acrylonitrile, isobornyl methacrylate, tricyclodecane acrylate, tricyclodecane oxyethyl methacrylate, styrene, dimethylaminoethyl methacrylate, and/or cyclohexyl methacrylate, and constitutional unit derived from the above compounds (A), (B), (C), (D), (E), or (F) above; (3) an ethylenic unsaturated bond containing monomer; and (4) a photopolymerization initiator which contains (a) an organic peroxide, s-triazine derivative, benzophenone or its derivatives, quinones, N-phenylglycine, and/or alkylarylketones as a radical generator and (b) coumarin dyes, ketocoumarin dyes, cyanine dyes, merocyanine dyes, and/or xanthene dyes as a sensitizer.

"Functional Polymers and Sequential Copolymers by Phase Transfer Catalysis, 2a: Synthesis and Characterization of Aromatic Poly(ether sulfone)s Containing Vinylbenzyl and Ethynylbenzyl Chain Ends," V. Percec and B. C. Auman, *Makromol. Chem.,* 185, 1867–1880 (1984), the disclosure of which is totally incorporated herein by reference, discloses a method for the synthesis of α,ω-bis (vinylbenzyl) aromatic poly(ether sulfone)s and their transformation into α,ω-bis(ethynylbenzyl) aromatic poly(ether sulfone)s. The method entails a fast and quantitative Williamson etherification of the α,ω-bis(hydroxyphenyl) polysulfone with a mixture of p- and m-chloromethylstyrenes in the presence of tetrabutylammonium hydrogen sulfate as phase transfer catalyst, a subsequent bromination, and then a dehydrobromination with potassium tert-butoxide. The DSC study of the thermal curing of the α,ω-bis(vinylbenzyl) aromatic poly(ether sulfone)s and α,ω-bis(ethynylbenzyl) aromatic poly(ether sulfone)s demonstrates high thermal reactivity for the styrene-terminated oligomers.

"Functional Polymers and Sequential Copolymers by Phase Transfer Catalysis, 3a: Synthesis and Characterization of Aromatic Poly(ether sulfone)s and Poly(oxy-2,6-dimethyl-1,4-phenylene) Containing Pendent Vinyl Groups," V. Percec and B. C. Auman, *Makromol. Chem.,* 185, 2319–2336 (1984), the disclosure of which is totally incorporated herein by reference, discloses a method for the syntheses of α, ω-benzyl aromatic poly(ether sulfone)s (PSU) and poly(oxy-2,6-dimethyl-1,4-phenylene) (POP) containing pendant vinyl groups. The first step of the synthetic procedure entails the chloromethylation of PSU and POP to provide polymers with chloromethyl groups. POP, containing bromomethyl groups, was obtained by radical bromination of the methyl groups. Both chloromethylated and bromomethylated starting materials were transformed into their phosphonium salts, and then subjected to a phase transfer catalyzed Wittig reaction to provide polymers with pendant vinyl groups. A PSU with pendant ethynyl groups was prepared by bromination of the PSU containing vinyl groups, followed by a phase transfer catalyzed dehydrobromination. DSC of the thermal curing of the polymers containing pendant vinyl and ethynyl groups showed that the curing reaction is much faster for the polymers containing vinyl groups. The resulting network polymers are flexible when the starting polymer contains vinyl groups, and very rigid when the starting polymer contains ethynyl groups.

"Functional Polymers and Sequential Copolymers by Phase Transfer Catalysis," V. Percec and P. L. Rinaldi, *Polymer Bulletin,* 10, 223 (1983), the disclosure of which is totally incorporated herein by reference, discloses the preparation of p- and m-hydroxymethylphenylacetylenes by a two step sequence starting from a commercial mixture of p- and m-chloromethylstyrene, i.e., by the bromination of the vinylic monomer mixture followed by separation of m- and p-brominated derivatives by fractional crystallization, and simultaneous dehydrobromination and nucleophilic substitution of the —Cl with —OH.

U.S. Pat. No. 4,110,279 (Nelson et al.), the disclosure of which is totally incorporated herein by reference, discloses a polymer derived by heating in the presence of an acid catalyst at between about 65° C. and about 250° C.: I. a reaction product, a cogeneric mixture of alkoxy functional compounds, having average equivalent weights in the range of from about 220 to about 1200, obtained by heating in the presence of a strong acid at about 50° C. to about 250° C: (A) a diaryl compound selected from naphthalene, diphenyl oxide, diphenyl sulfide, their alkylated or halogenated derivatives, or mixtures thereof, (B) formaldehyde or formaldehyde yielding derivative, (C) water, and (D) a hydroxy aliphatic hydrocarbon compound having at least one free hydroxyl group and from 1 to 4 carbon atoms, which mixture contains up to 50 percent unreacted (A); with II. at least one monomeric phenolic reactant selected from the group

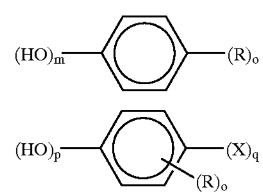

wherein R is selected from the group consisting of hydrogen, alkyl radical of 1 to 20 carbon atoms, aryl radical of 6 to 20 carbon atoms, wherein $R_1$ represents hydrogen, alkyl, or aryl, m represents an integer from 1 to 3, o represents an integer from 1 to 5, p represents an integer from 0 to 3, X represents oxygen, sulfur, or alkylidene, and q represents an integer from 0 to 1; and III. optionally an aldehyde or aldehyde-yielding derivative or ketone, for from several minutes to several hours. The polymeric materials are liquids or low melting solids which are capable of further modification to thermoset resins. These polymers are capable of being thermoset by heating at a temperature of from about 130° C. to about 260° C. for from several minutes to several hours in the presence of a formaldehyde-yielding compound. These polymers are also capable of further modification by reacting under basic conditions with formaldehyde with or without a phenolic compound. The polymers, both base catalyzed resoles and acid catalyzed novolacs, are useful as laminating, molding, film-forming, and adhesive materials. The polymers, both resoles and novolacs, can be epoxidized as well as reacted with a drying oil to produce a varnish resin.

U.S. Pat. No. 3,367,914 (Herbert), the disclosure of which is totally incorporated herein by reference, discloses thermosetting resinous materials having melting points in the range of from 150° C. to 350° C. which are made heating at a temperature of from −10° C. to 100° C. for 5 to 30 minutes an aldehyde such as formaldehyde or acetaldehyde with a mixture of poly(aminomethyl) diphenyl ethers having an average of from about 1.5 to 4.0 aminomethyl groups. After the resins are cured under pressure at or above the melting point, they form adherent tough films on metal substrates and thus are useful as wire coatings for electrical magnet wire for high temperature service at 180° C. or higher.

J. S. Amato, S. Karady, M. Sletzinger, and L. M. Weinstock, "A New Preparation of Chloromethyl Methyl Ether Free of Bis(chloromethyl) Ether," *Synthesis,* 970 (1979), the disclosure of which is totally incorporated herein by reference, discloses the synthesis of chloromethyl methyl ether by the addition of acetyl chloride to a slight excess of anhydrous dimethoxymethane containing a catalytic amount of methanol at room temperature. The methanol triggers a series of reactions commencing with formation of hydrogen chloride and the reaction of hydrogen chloride with dimethoxymethane to form chloromethyl methyl ether and methanol in an equilibrium process. After 36 hours, a near-quantitative conversion to an equimolar mixture of chloromethyl methyl ether and methyl acetate is obtained.

A. McKillop, F. A. Madjdabadi, and D. A. Long, "A Simple and Inexpensive Procedure for Chloromethylation of Certain Aromatic Compounds," *Tetrahedron Letters*, Vol. 24, No. 18, pp. 1933–1936 (1983), the disclosure of which is totally incorporated herein by reference, discloses the reaction of a range of aromatic compounds with methoxyacetyl chloride and aluminum chloride in either nitromethane or carbon disulfide to result in chloromethylation in good to excellent yield.

E. P. Tepenitsyna, M. I. Farberov, and A. P. Ivanovskii, "Synthesis of Intermediates for Production of Heat Resistant Polymers (Chloromethylation of Diphenyl Oxide)," *Zhumal Prikladnoi Khimii*, Vol. 40, No. 11, pp. 2540–2546 (1967), the disclosure of which is totally incorporated herein by reference, discloses the chloromethylation of diphenyl oxide by (1) the action of paraformaldehyde solution in glacial acetic acid saturated with hydrogen chloride, and by (2) the action of paraformaldehyde solution in concentrated hydrochloric acid.

U.S. Pat. No. 2,125,968 (Theimer), the disclosure of which is totally incorporated herein by reference, discloses the manufacture of aromatic alcohols by the Friedel-Crafts reaction, in which an alkylene oxide is condensed with a Friedel-Crafts reactant in the presence of an anhydrous metal halide.

Copending Application U.S. Ser. No. 08/705,375, filed Aug. 29, 1996 now U.S. Pat. No. 5,994,425, entitled "Curable Compositions Containing Photosensitive High Performance Aromatic Ether Polymers," and Copending Application U.S. Ser. No. 09/221,024, filed Dec. 23, 1998 now U.S. Pat. No. 6,022,095 entitled "Curable Compositions," with the named inventors Timothy J. Fuller, Ram S. Narang, Thomas W. Smith, David J. Luca, and Ralph A. Mosher, the disclosures of each of which are totally incorporated herein by reference, disclose an improved composition comprising a photopatternable polymer containing at least some monomer repeat units with photosensitivity-imparting substituents, said photopatternable polymer being of the general formula

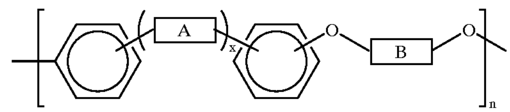

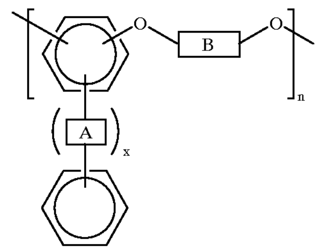

wherein x is an integer of 0 or 1, A is one of several specified groups, such as

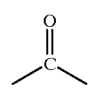

B is one of several specified groups, such as

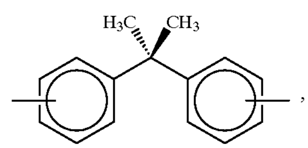

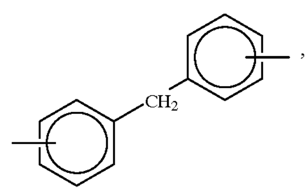

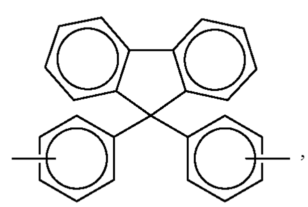

or mixtures thereof, and n is an integer representing the number of repeating monomer units. Also disclosed is a process for preparing a thermal ink jet printhead with the aforementioned polymer and a thermal ink jet printhead containing therein a layer of a crosslinked or chain extended polymer of the above formula.

U.S. Pat. No. 5,849,809, filed Aug. 29, 1996, and Copending Application U.S. Ser. No. 09/159,426, filed Sep. 23, 1998, entitled "Hydroxyalkylated High Performance Curable Polymers," with the named inventors Ram S. Narang and Timothy J. Fuller, the disclosures of each of which are totally incorporated herein by reference, disclose a composition which comprises (a) a polymer containing at least some monomer repeat units with photosensitivity-imparting substituents which enable crosslinking or chain extension of the polymer upon exposure to actinic radiation, said polymer being of the formula

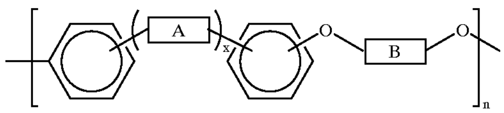

or

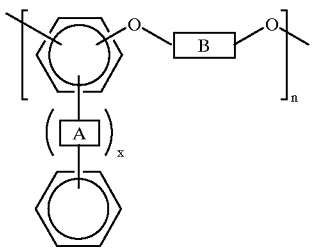

wherein x is an integer of 0 or 1, A is one of several specified groups, such as

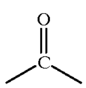

B is one of several specified groups, such as

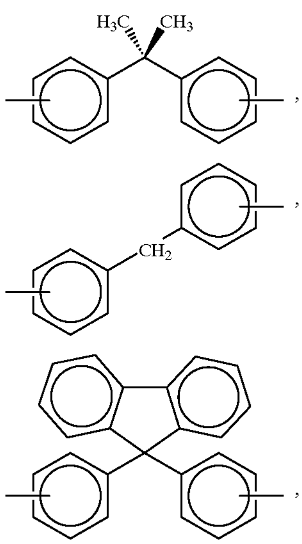

or mixtures thereof, and n is an integer representing the number of repeating monomer units, wherein said photosensitivity-imparting substituents are hydroxyalkyl groups; (b) at least one member selected from the group consisting of photoinitiators and sensitizers; and (c) an optional solvent. Also disclosed are processes for preparing the above polymers and methods of preparing thermal ink jet printheads containing the above polymers.

Copending Application U.S. Ser. No. 08/705,488, filed Aug. 29, 1996 now allowed, entitled “High Performance Polymer Compositions Having Photosensitivity-Imparting Substituents and Thermal Sensitivity-Imparting Substituents,” and Copending Application U.S. Ser. No. 09/221,690, filed December 23, 1998 now pending, entitled “High Performance Polymer Compositions,” with the named inventors Thomas W. Smith, Timothy J. Fuller, Ram S. Narang, and David J. Luca, the disclosures of each of which are totally incorporated herein by reference, disclose a composition comprising a polymer with a weight average molecular weight of from about 1,000 to about 65,000, said polymer containing at least some monomer repeat units with a first, photosensitivity-imparting substituent which enables crosslinking or chain extension of the polymer upon exposure to actinic radiation, said polymer also containing a second, thermal sensitivity-imparting substituent which enables further polymerization of the polymer upon exposure to temperatures of about 140° C. and higher, wherein the first substituent is not the same as the second substituent, said polymer being selected from the group consisting of polysulfones, polyphenylenes, polyether sulfones, polyimides, polyamide imides, polyarylene ethers, polyphenylene sulfides, polyarylene ether ketones, phenoxy resins, polycarbonates, polyether imides, polyquinoxalines, polyquinolines, polybenzimidazoles, polybenzoxazoles, polybenzothiazoles, polyoxadiazoles, copolymers thereof, and mixtures thereof.

U.S. Pat. No. 5,889,077, filed Aug. 29, 1996, and Copending Application U.S. Ser. No. 09/221,278, filed Dec. 23, 1998 now allowed, entitled “Process for Direct Substitution of High Performance Polymers with Unsaturated Ester Groups,” with the named inventors Timothy J. Fuller, Ram S. Narang, Thomas W. Smith, David J. Luca, and Raymond K. Crandall, the disclosures of each of which are totally incorporated herein by reference, disclose a process which comprises reacting a polymer of the general formula

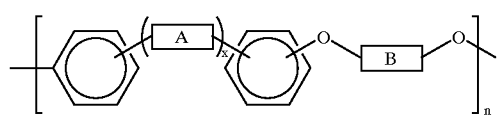

or

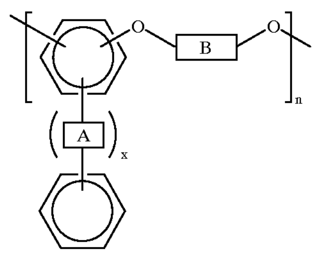

wherein x is an integer of 0 or 1, A is one of several specified groups, such as

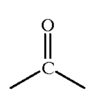

B is one of several specified groups, such as

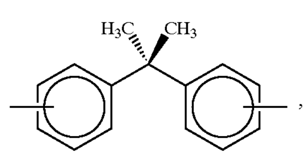

-continued

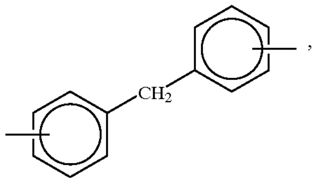

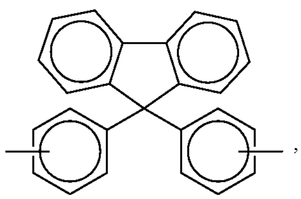

or mixtures thereof, and n is an integer representing the number of repeating monomer units, with (i) a formaldehyde source, and (ii) an unsaturated acid in the presence of an acid catalyst, thereby forming a curable polymer with unsaturated ester groups. Also disclosed is a process for preparing an ink jet printhead with the above polymer.

U.S. Pat. No. 5,739,254, filed Aug. 29, 1996, and U.S. Pat. No. 5,753,783, filed Aug. 28, 1997, entitled "Process for Haloalkylation of High Performance Polymers," with the named inventors Timothy J. Fuller, Ram S. Narang, Thomas W. Smith, David J. Luca, and Raymond K. Crandall, the disclosures of each of which are totally incorporated herein by reference, disclose a process which comprises reacting a polymer of the general formula

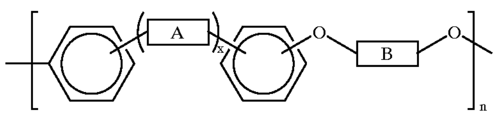

or

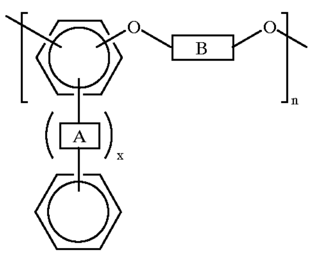

wherein x is an integer of 0 or 1, A is one of several specified groups, such as

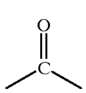

B is one of several specified groups, such as

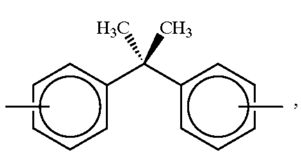

-continued

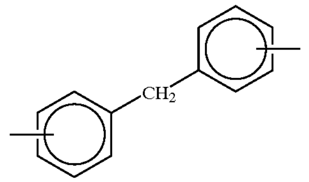

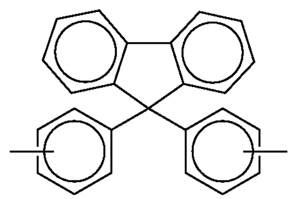

or mixtures thereof, and n is an integer representing the number of repeating monomer units, with an acetyl halide and dimethoxymethane in the presence of a halogen-containing Lewis acid catalyst and methanol, thereby forming a haloalkylated polymer. In a specific embodiment, the haloalkylated polymer is then reacted further to replace at least some of the haloalkyl groups with photosensitivity-imparting groups. Also disclosed is a process for preparing a thermal ink jet printhead with the aforementioned polymer.

U.S. Pat. No. 5,761,809, filed Aug. 29, 1996, entitled "Processes for Substituting Haloalkylated Polymers With Unsaturated Ester, Ether, and Alkylcarboxymethylene Groups," with the named inventors Timothy J. Fuller, Ram S. Narang, Thomas W. Smith, David J. Luca, and Raymond K. Crandall, the disclosure of which is totally incorporated herein by reference, discloses a process which comprises reacting a haloalkylated aromatic polymer with a material selected from the group consisting of unsaturated ester salts, alkoxide salts, alkylcarboxylate salts, and mixtures thereof, thereby forming a curable polymer having functional groups corresponding to the selected salt. Another embodiment of the invention is directed to a process for preparing an ink jet printhead with the curable polymer thus prepared.

Copending Application U.S. Ser. No. 08/705,376, filed Aug. 29, 1996, now U.S. Pat. No. 5,958,995 entitled "Blends Containing Photosensitive High Performance Aromatic Ether Curable Polymers," and Copending Application U.S. Ser. No. 09/220,273, filed Dec. 23, 1998 now pending, entitled "Blends Containing Curable Polymers," with the named inventors Ram S. Narang and Timothy J. Fuller, the disclosures of each of which are totally incorporated herein by reference, disclose a composition which comprises a mixture of (A) a first component comprising a polymer, at least some of the monomer repeat units of which have at least one photosensitivity-imparting group thereon, said polymer having a first degree of photosensitivity-imparting group substitution measured in milliequivalents of photosensitivity-imparting group per gram and being of the general formula

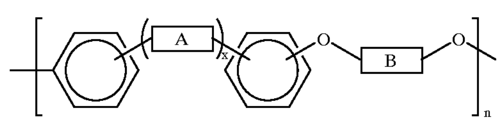

or

-continued

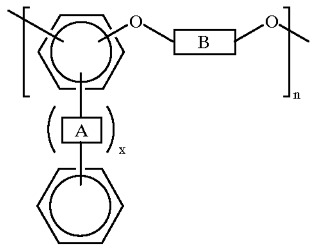

wherein x is an integer of 0 or 1, A is one of several specified groups, such as

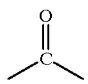

B is one of several specified groups, such as

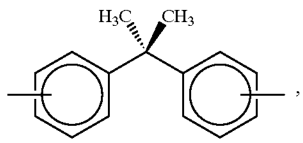

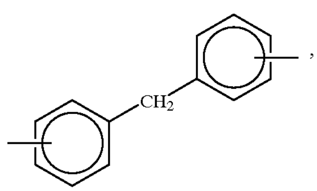

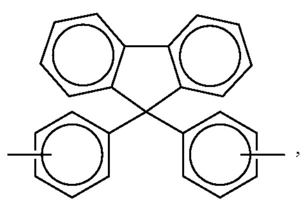

or mixtures thereof, and n is an integer representing the number of repeating monomer units, and (B) a second component which comprises either (1) a polymer having a second degree of photosensitivity-imparting group substitution measured in milliequivalents of photosensitivity-imparting group per gram lower than the first degree of photosensitivity-imparting group substitution, wherein said second degree of photosensitivity-imparting group substitution may be zero, wherein the mixture of the first component and the second component has a third degree of photosensitivity-imparting group substitution measured in milliequivalents of photosensitivity-imparting group per gram which is lower than the first degree of photosensitivity-imparting group substitution and higher than the second degree of photosensitivity-imparting group substitution, or (2) a reactive diluent having at least one photosensitivity-imparting group per molecule and having a fourth degree of photosensitivity-imparting group substitution measured in milliequivalents of photosensitivity-imparting group per gram, wherein the mixture of the first component and the second component has a fifth degree of photosensitivity-imparting group substitution measured in milliequivalents of photosensitivity-imparting group per gram which is higher than the first degree of photosensitivity-imparting group substitution and lower than the fourth degree of photosensitivity-imparting group substitution; wherein the weight average molecular weight of the mixture is from about 10,000 to about 50,000; and wherein the third or fifth degree of photosensitivity-imparting group substitution is from about 0.25 to about 2 milliequivalents of photosensitivity-imparting groups per gram of mixture. Also disclosed is a process for preparing a thermal ink jet printhead with the aforementioned composition.

Copending Application U.S. Ser. No. 08/705,372, filed Aug. 29, 1996 now U.S. Pat. No. 5,945,253 and Copending Application U.S. Ser. No. 09/246,167, filed Feb. 8, 1999 now abandoned, entitled "High Performance Curable Polymers and Processes for the Preparation Thereof," with the named inventors Ram S. Narang and Timothy J. Fuller, the disclosures of each of which are totally incorporated herein by reference, disclose a composition which comprises a polymer containing at least some monomer repeat units with photosensitivity-imparting substituents which enable crosslinking or chain extension of the polymer upon exposure to actinic radiation, said polymer being of the formula

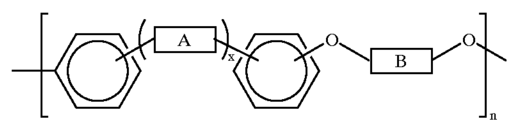

or

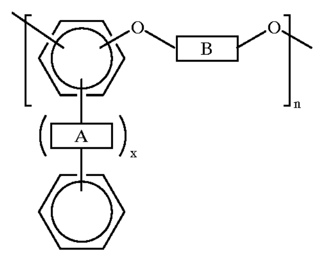

wherein x is an integer of 0 or 1, A is one of several specified groups, such as

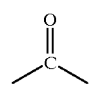

B is one of several specified groups, such as

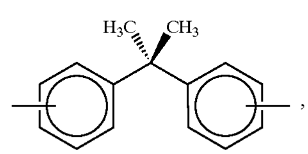

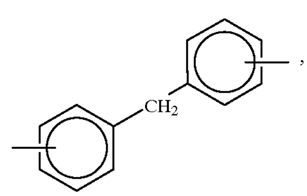

-continued

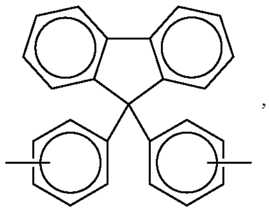

or mixtures thereof, and n is an integer representing the number of repeating monomer units, wherein said photosensitivity-imparting substituents are allyl ether groups, epoxy groups, or mixtures thereof. Also disclosed are a process for preparing a thermal ink jet printhead containing the aforementioned polymers and processes for preparing the aforementioned polymers.

U.S. Pat. No. 5,863,963, filed Aug. 29, 1996, and Copending Application U.S. Ser. No. 09/163,672, filed Sep. 30, 1998 now allowed, entitled "Halomethylated High Performance Curable Polymers," with the named inventors Ram S. Narang and Timothy J. Fuller, the disclosures of each of which are totally incorporated herein by reference, disclose a process which comprises the steps of (a) providing a polymer containing at least some monomer repeat units with halomethyl group substituents which enable crosslinking or chain extension of the polymer upon exposure to a radiation source which is electron beam radiation, x-ray radiation, or deep ultraviolet radiation, said polymer being of the formula

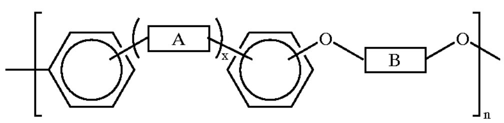

or

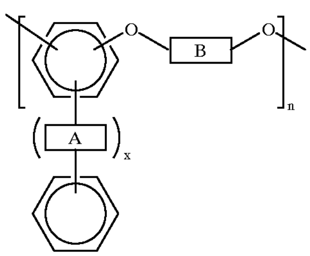

wherein x is an integer of 0 or 1, A is one of several specified groups, such as

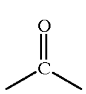

B is one of several specified groups, such as

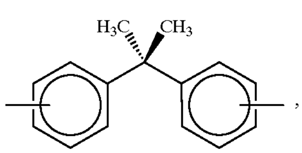

-continued

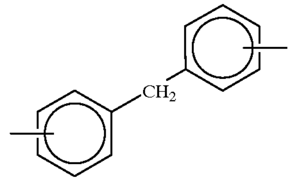

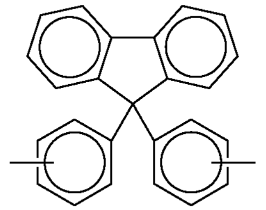

or mixtures thereof, and n is an integer representing the number of repeating monomer units, and (b) causing the polymer to become crosslinked or chain extended through the photosensitivity-imparting groups. Also disclosed is a process for preparing a thermal ink jet printhead by the aforementioned curing process.

Copending Application U.S. Ser. No. 08/697,760, filed Aug. 29, 1996 now U.S. Pat No. 6,007,877, entitled "Aqueous Developable High Performance Curable Aromatic Ether Polymers," and Copending Application U.S. Ser. No. 09/247,104, filed Feb. 9, 1999, entitled "Aqueous Developable High Performance Curable Polymers," with the named inventors Ram S. Narang and Timothy J. Fuller, the disclosures of each of which are totally incorporated herein by reference, disclose a composition which comprises a polymer containing at least some monomer repeat units with water-solubility-imparting substituents and at least some monomer repeat units with photosensitivity-imparting substituents which enable crosslinking or chain extension of the polymer upon exposure to actinic radiation, said polymer being of the formula

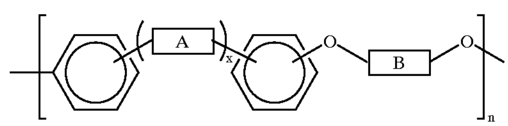

or

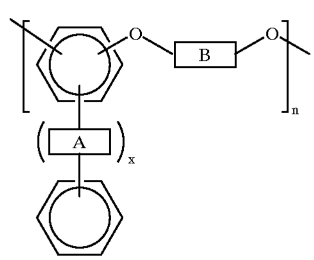

wherein x is an integer of 0 or 1, A is one of several specified groups, such as

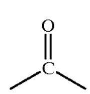

B is one of several specified groups, such as

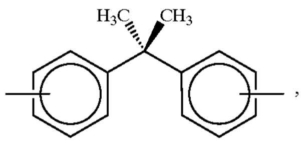

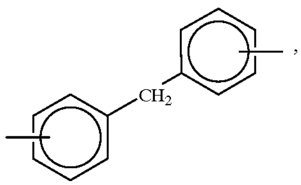

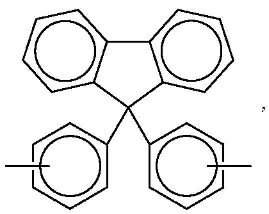

or mixtures thereof, and n is an integer representing the number of repeating monomer units. In one embodiment, a single functional group imparts both photosensitivity and water solubility to the polymer. In another embodiment, a first functional group imparts photosensitivity to the polymer and a second functional group imparts water solubility to the polymer. Also disclosed is a process for preparing a thermal ink jet printhead with the aforementioned polymers.

U.S. Pat. No. 5,814,426, filed Nov. 21, 1997, entitled "Imaging Members Containing High Performance Polymers," with the named inventors Kathleen M. Carmichael, Timothy J. Fuller, Edward F. Grabowski, Damodar M. Pai, Leon A. Teuscher, John F. Yanus, and Paul F. Zukoski, the disclosure of which is totally incorporated herein by reference, discloses an imaging member which comprises a conductive substrate, a photogenerating material, and a binder which comprises a polymer of the formulae I, II, III, IV, V, VI, VII, VIII, IX, or X:

I

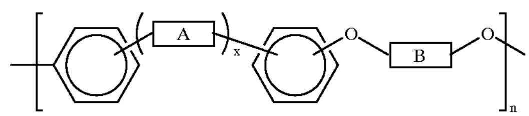

II

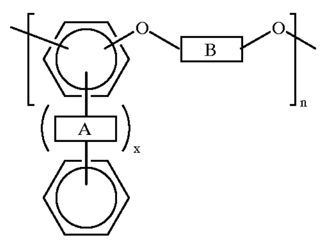

III

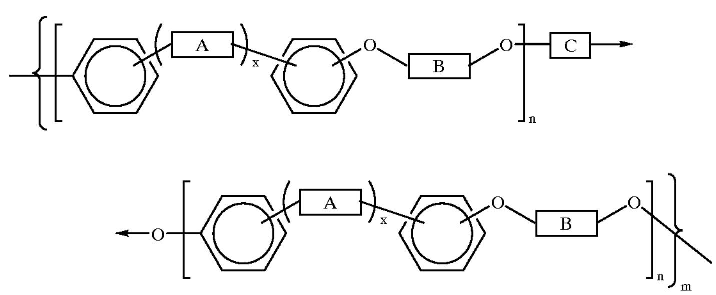

IV

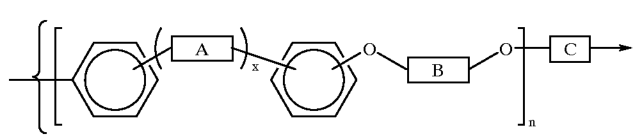

-continued
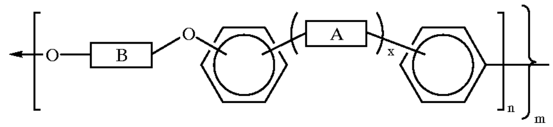
V
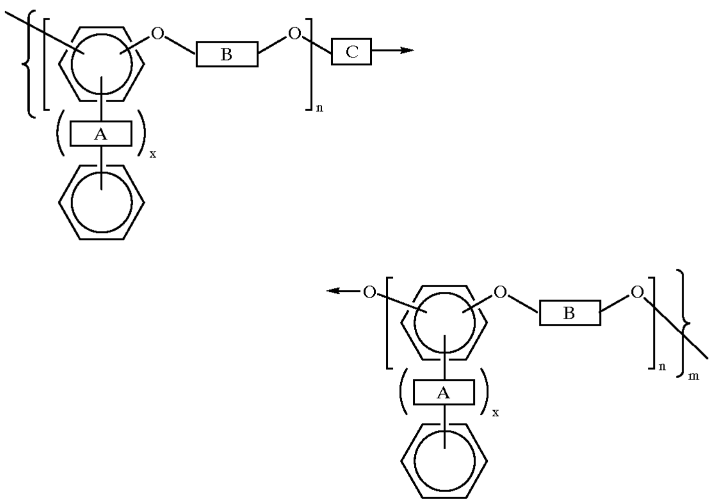
VI
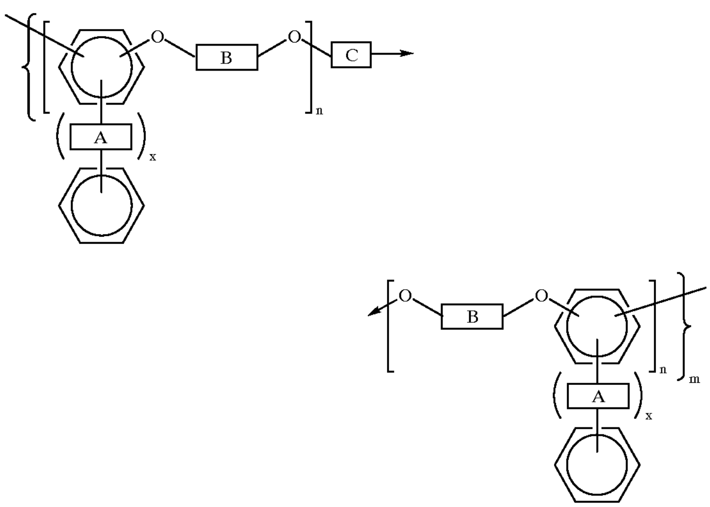
VII
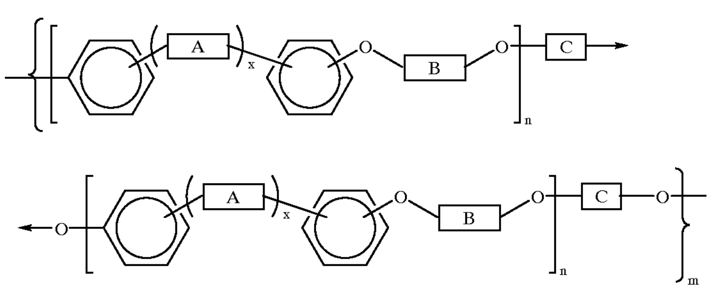
VIII
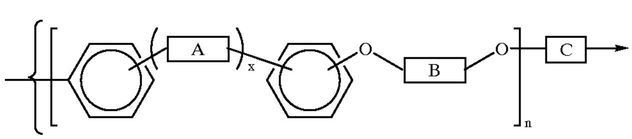

-continued
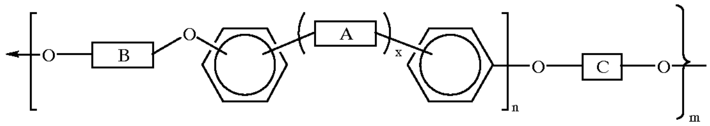
IX
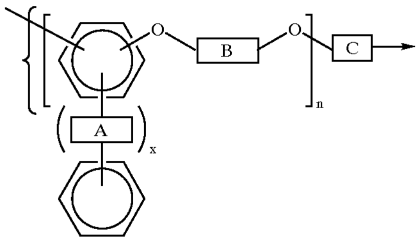
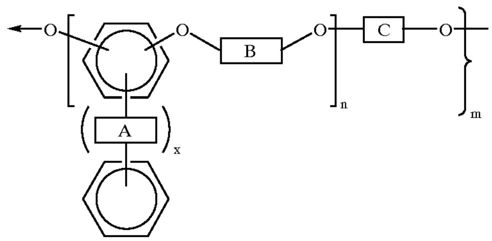
X
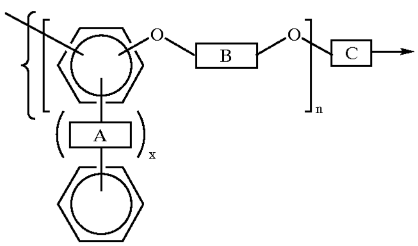
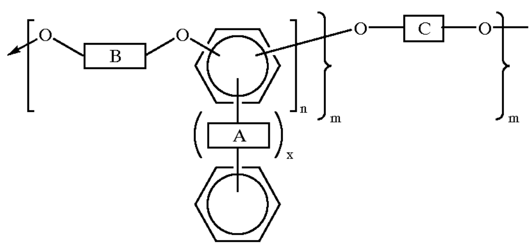
wherein x is an integer of 0 or 1, A is
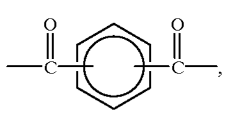
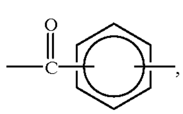
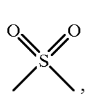
-continued
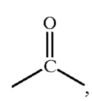
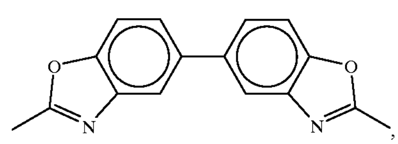

-continued
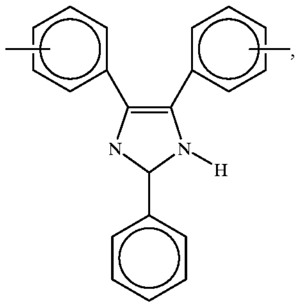
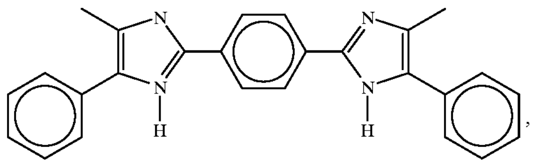
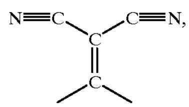
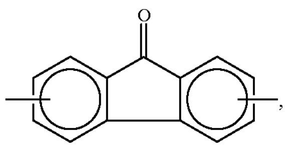
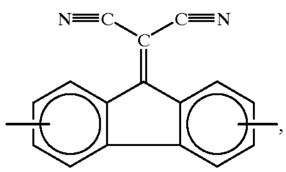
or mixtures thereof, B is
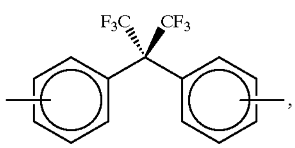
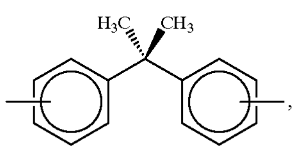
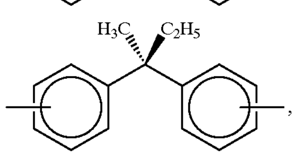
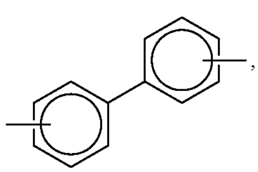
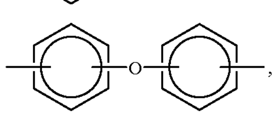
-continued
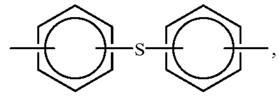
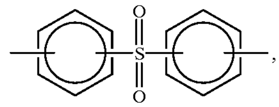
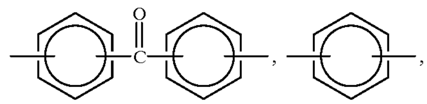
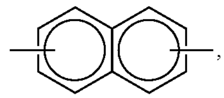
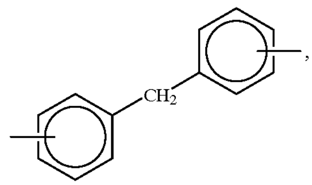
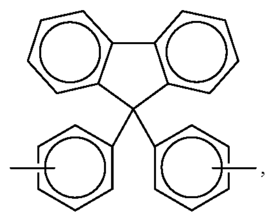
, $-(CH_2)_v-$,
wherein v is an integer of from 1 to about 20,
$$-(CH_2O)_t-$$
wherein t is an integer of from 1 to about 20,
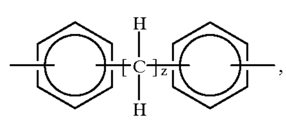
wherein z is an integer of from 2 to about 20,
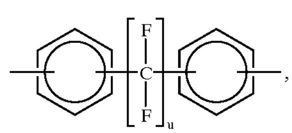
wherein u is an integer of from 1 to about 20,
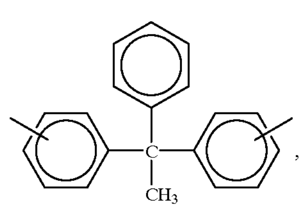

-continued

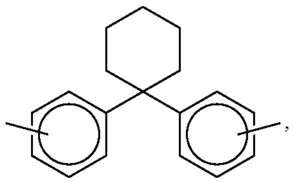

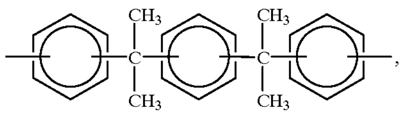

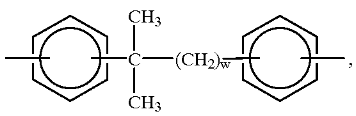

wherein w is an integer of from 1 to about 20,

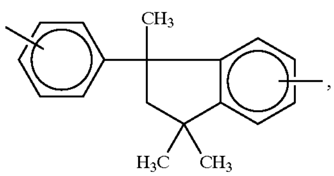

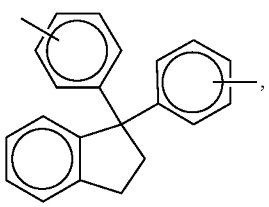

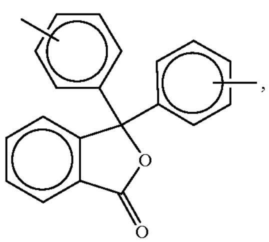

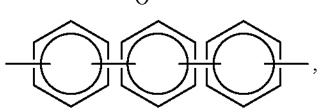

-continued

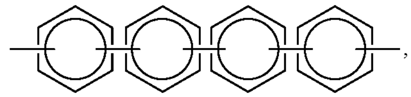

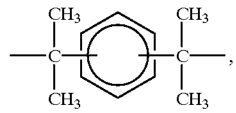

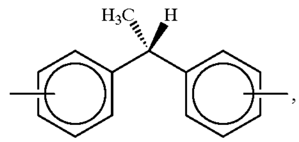

or mixtures thereof, C is

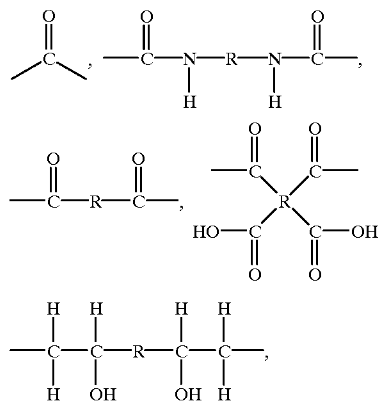

or mixtures thereof, wherein R is an alkyl group, an aryl group, an arylalkyl group, or mixtures thereof, and m and n are integers representing the number of repeating units.

U.S. Pat. No. 5,882,814, filed Nov. 21, 1997, entitled "Imaging Members Containing High Performance Charge Transporting Polymers," with the named inventors Timothy J. Fuller, Damodar M. Pai, Leon A. Teuscher, and John F. Yanus, the disclosure of which is totally incorporated herein by reference, discloses an imaging member which comprises a conductive substrate, a photogenerating layer, and a charge transport layer comprising a polymer of the formulae I, II, III, IV, V, VI, VII, VIII, IX, or X:

I

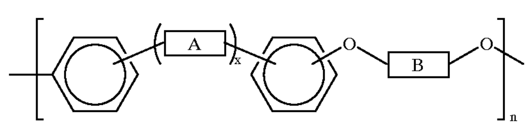

-continued
II
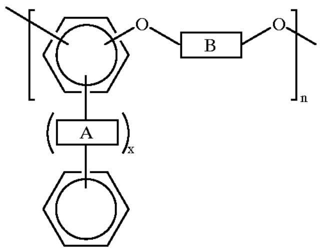
III
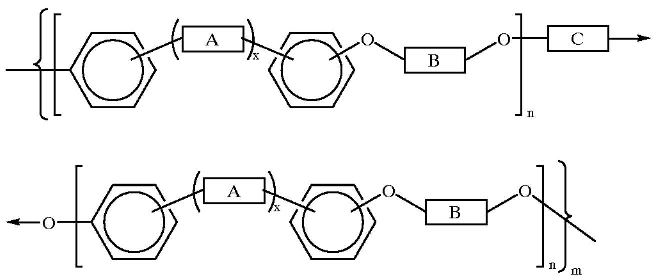
IV
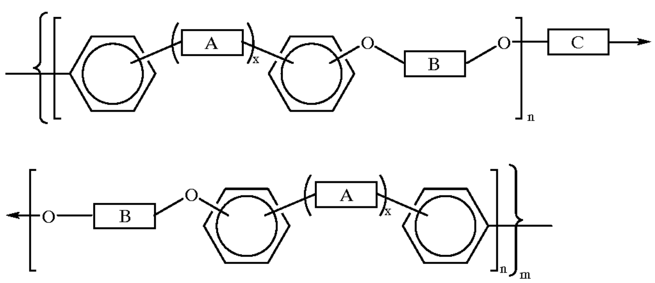
V
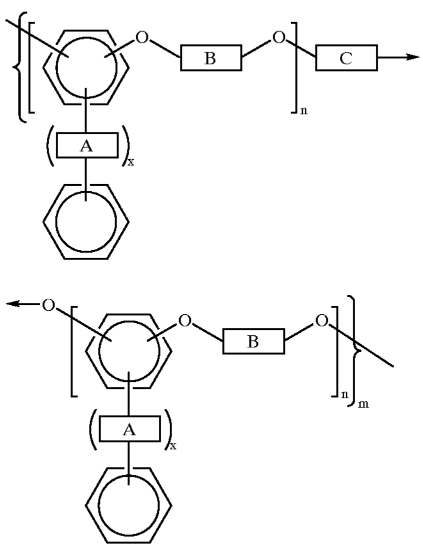

-continued
VI
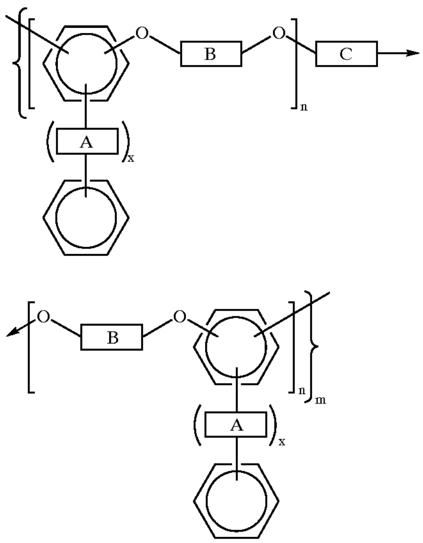
VII
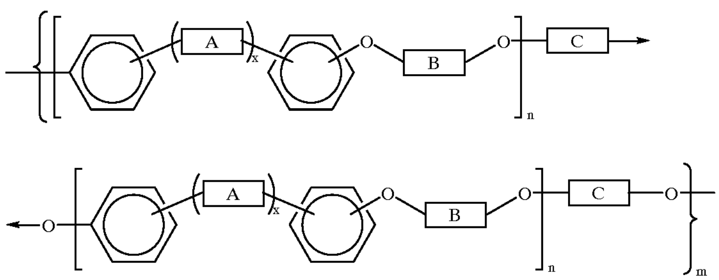
VIII
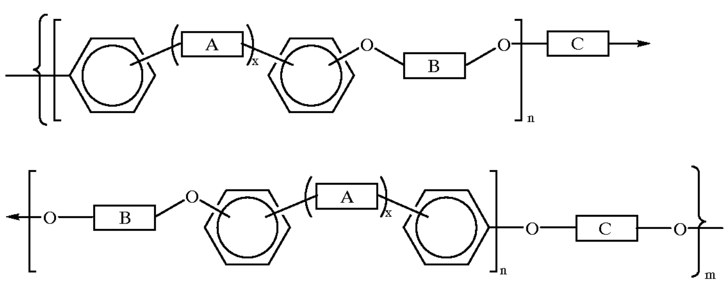
IX
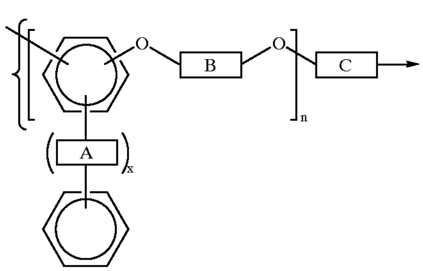

-continued
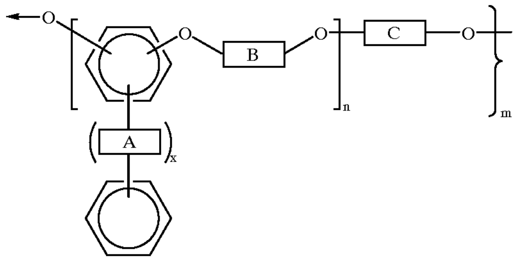
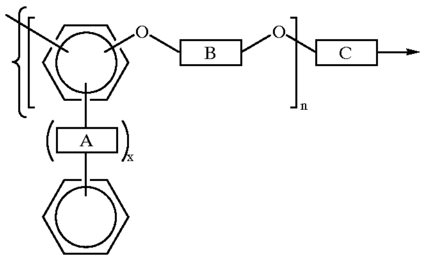
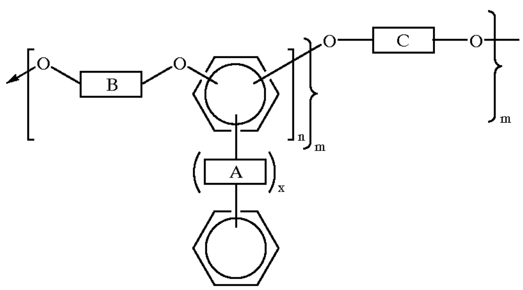
X
wherein x is an integer of 0 or 1, A is
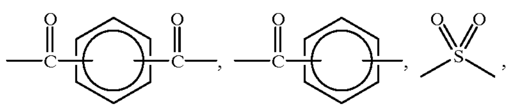
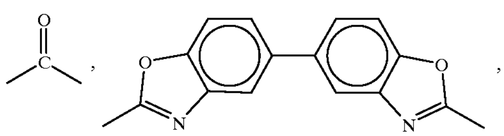
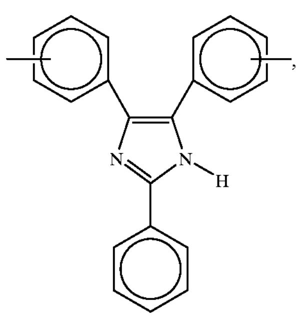
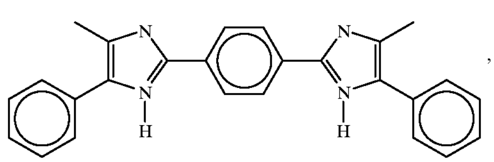
-continued
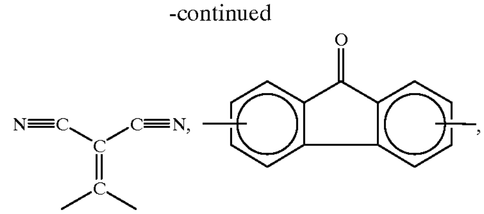
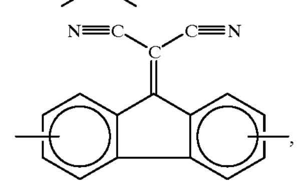
or mixtures thereof, B is
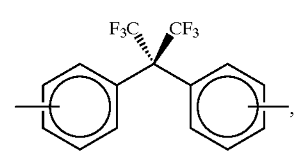
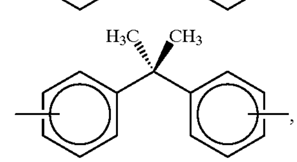

-continued
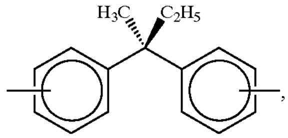
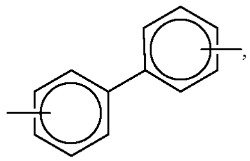
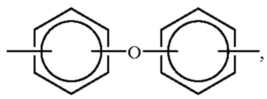
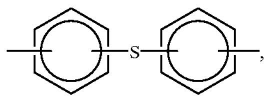
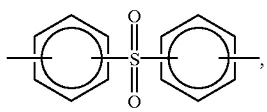
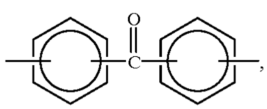
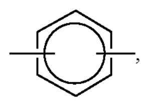
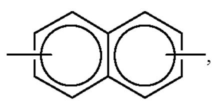
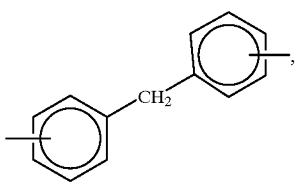
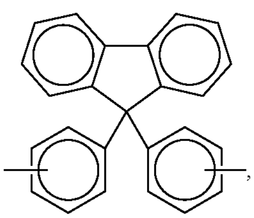, $-(CH_2)_v-$,
wherein v is an integer of from Ito about 20,
$-(CH_2O)_t-$
wherein t is an integer of from 1 to about 20,
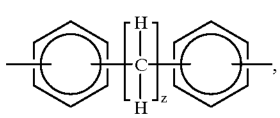
wherein z is an integer of from 2 to about 20,
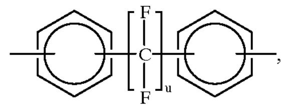
wherein u is an integer of from 1 to about 20,
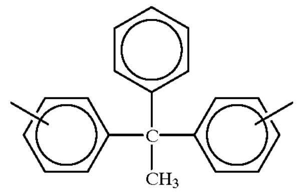
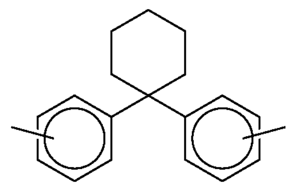
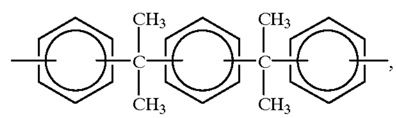
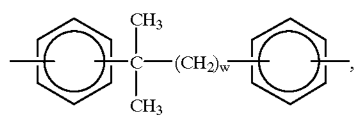
wherein w is an integer of from 1 to about 20,
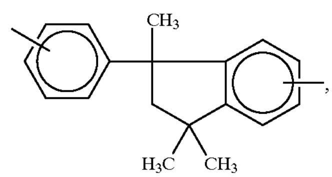
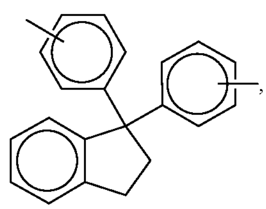
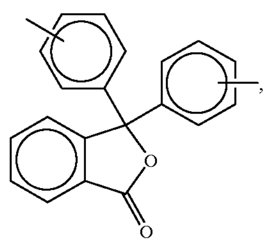
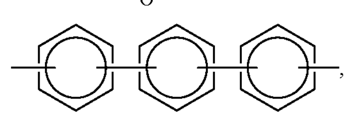

-continued

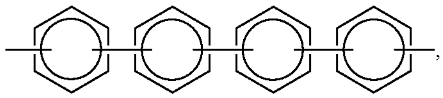

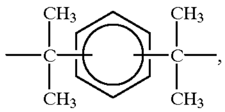

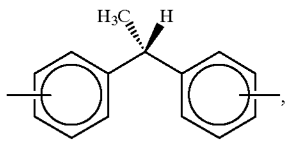

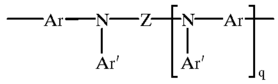

wherein (1) Z is

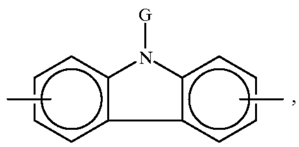

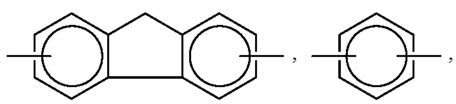

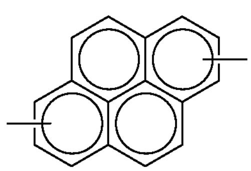

, or —Ar—$(X)_p$—Ar— wherein p is 0or 1; (2) Ar is

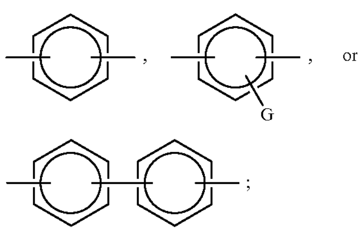

(3) G is an alkyl group selected from alkyl or isoalkyl groups containing from about 2 to about 10 carbon atoms; (4) Ar' is

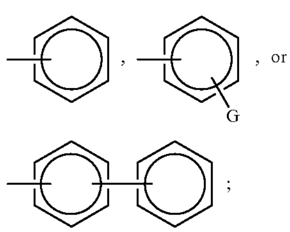

(5) X is

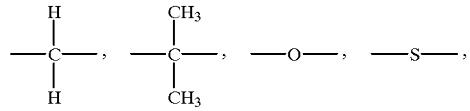

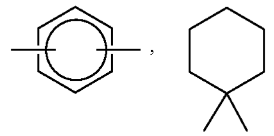

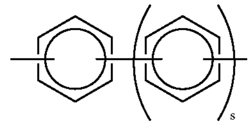

wherein s is 0, 1, or 2,

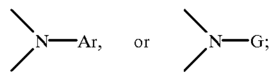

and (6) q is 0 or 1; or mixtures thereof, wherein at least some of the "B" groups are of the formula

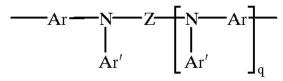

C is

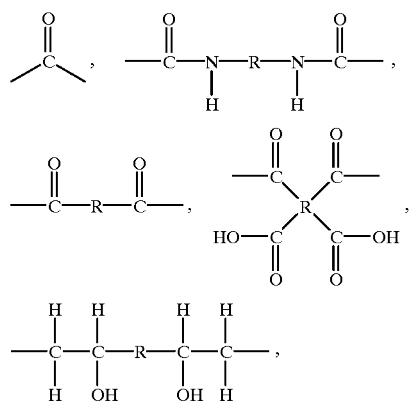

or mixtures thereof, wherein R is an alkyl group, an aryl group, an arylalkyl group, or mixtures thereof, and m and n are integers representing the number of repeating units.

U.S. Pat. No. 5,874,192, filed Nov. 21, 1997, entitled "Imaging Members with Charge Transport Layers Containing High Performance Polymer Blends," with the named inventors Kathleen M. Carmichael, Timothy J. Fuller, Edward F. Grabowski, Damodar M. Pai, Leon A. Teuscher, John F. Yanus, and Paul F. Zukoski, the disclosure of which is totally incorporated herein by reference, discloses an imaging member which comprises a conductive substrate, a photogenerating material, a charge transport material, and a polymeric binder comprising (a) a first polymer comprising a polycarbonate, and (b) a second polymer of the formulae I, II, III, IV, V, VI, VII, VIII, IX, or X:

I
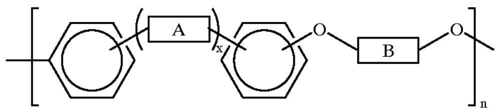
II
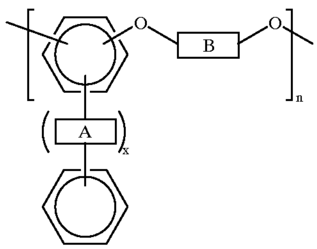
III
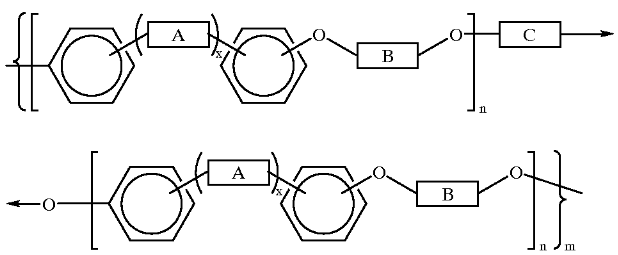
IV
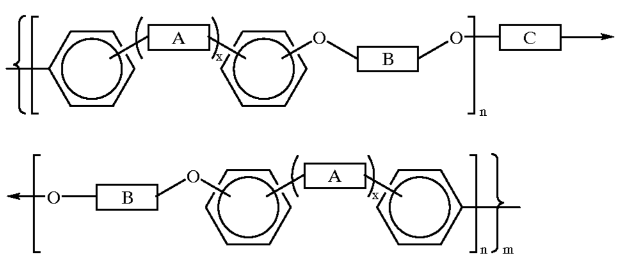
V
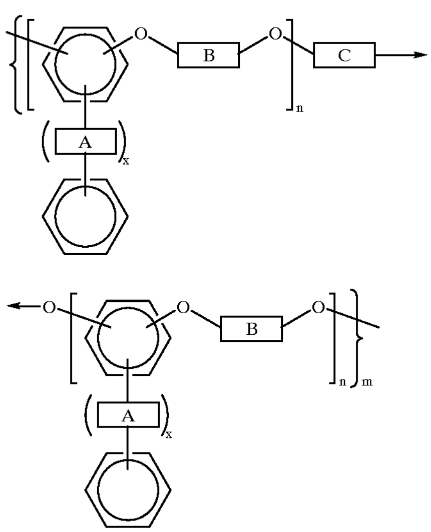

-continued
VI
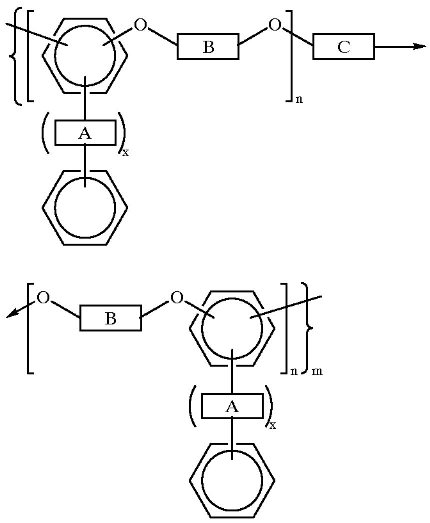
VII
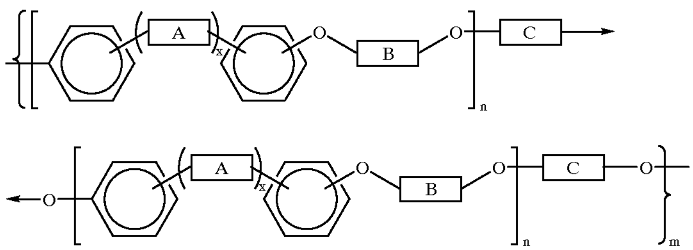
VIII
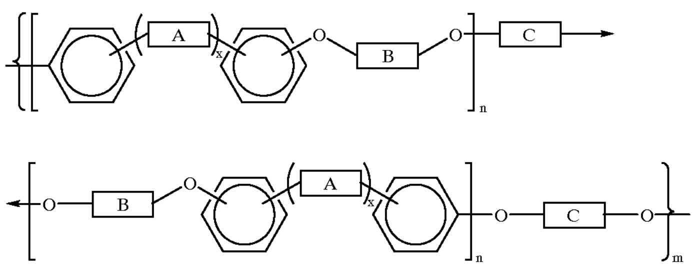
IX
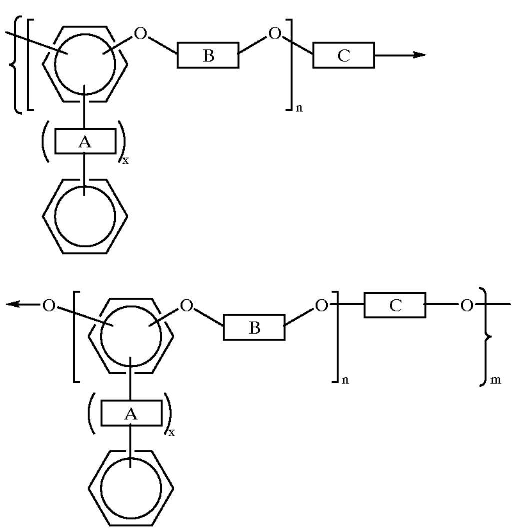

-continued
X
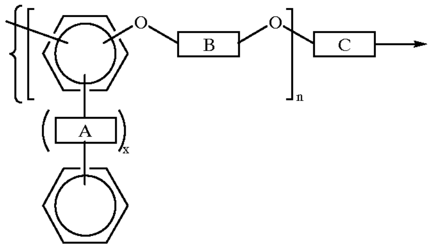
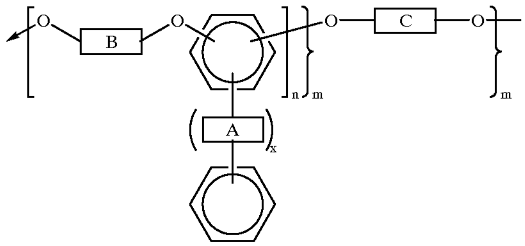
wherein x is an integer of 0 or 1, A is
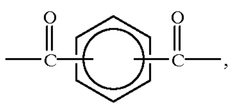
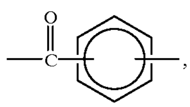
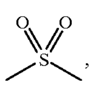
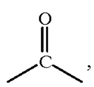
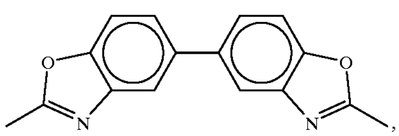
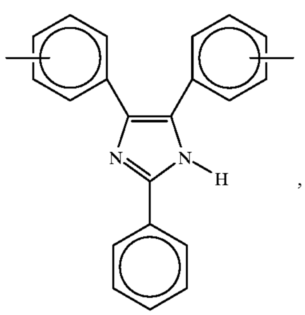
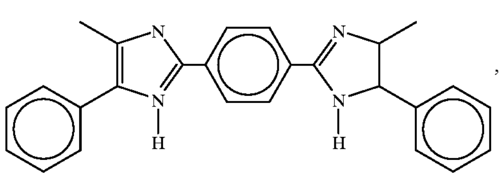
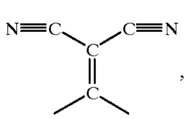
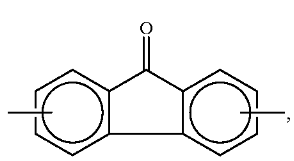
-continued
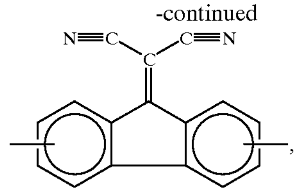
or mixtures thereof, B is
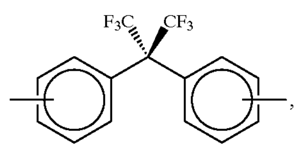
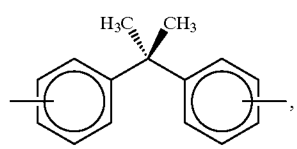
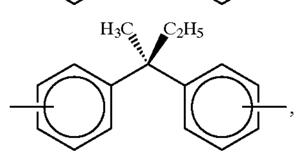
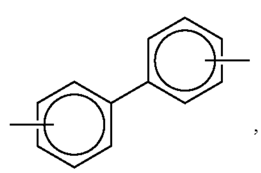
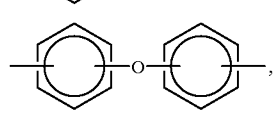
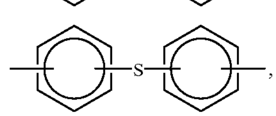

-continued
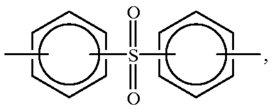
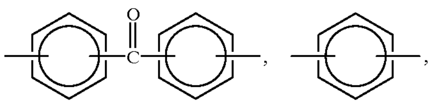
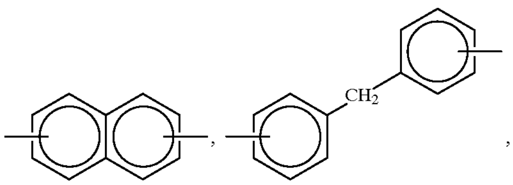
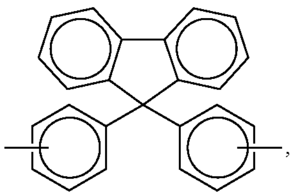
$-(CH_2)_v-$,
wherein v is an integer of from 1 to about 20,
$-(CH_2O)_t-$
wherein t is an integer of from 1 to about 20,
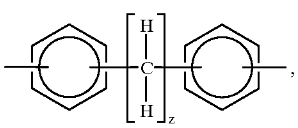
wherein z is an integer of from 2 to about 20,
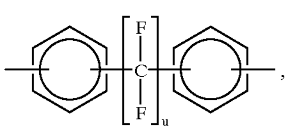
wherein u is an integer of from 1 to about 20,
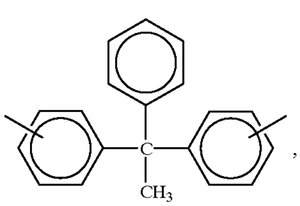
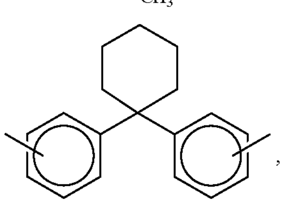
-continued
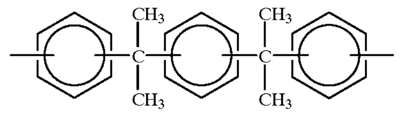
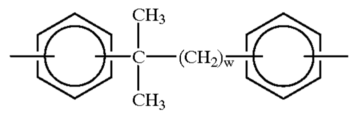
wherein w is an integer of from 1 about 20,
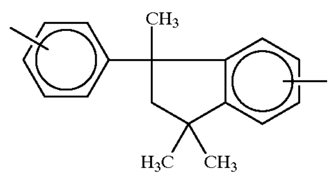
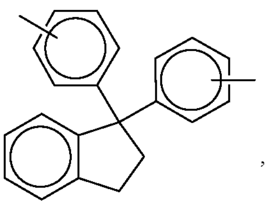
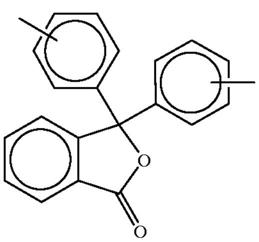
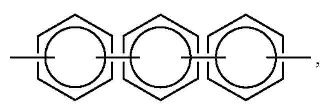
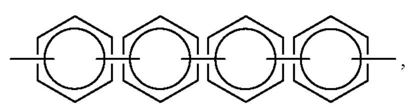
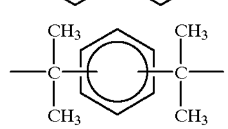
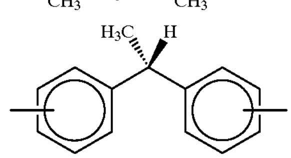
or mixtures thereof, C is
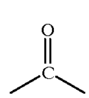
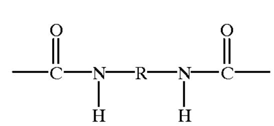

-continued

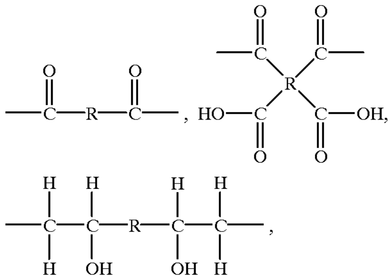

or mixtures thereof, wherein R is an alkyl group, an aryl group, an arylalkyl group, or mixtures thereof, and m and n are integers representing the numbers of repeating units.

Copending Application U.S. Ser. No. 09/105,501, filed Jun. 26, 1998, entitled "Bonding Process," with the named inventors Lisa A. DeLouise and David J. Luca, the disclosure of which is totally incorporated herein by reference, discloses a process for bonding a first article to a second article which comprises (a) providing a first article comprising a polymer having photosensitivity-imparting substituents; (b) providing a second article comprising metal, plasma nitride, silicon, or glass; (c) applying to at least one of the first article and the second article an adhesion promoter selected from silanes, titanates, or zirconates having (i) alkoxy, aryloxy, or arylalkyloxy functional groups and (ii) functional groups including at least one photosensitive aliphatic >C=C< linkage; (d) placing the first article in contact with the second article; and (e) exposing the first article, second article, and adhesion promoter to radiation, thereby bonding the first article to the second article with the adhesion promoter. In one embodiment of the present invention, the adhesion promoter is employed in microelectrical mechanical systems such as thermal ink jet printheads.

Copending Application U. S. Ser. No. 09/120,746, filed Jul. 23, 1998, entitled "Improved Thermal Ink Jet Printhead and Process for the Preparation Thereof," with the named inventors Ram S. Narang, Gary A. Kneezel, Bidan Zhang, Almon P. Fisher, and Timothy J. Fuller, the disclosure of which is totally incorporated herein by reference, discloses an ink jet printhead which comprises (i) an upper substrate with a set of parallel grooves for subsequent use as ink channels and a recess for subsequent use as a manifold, the grooves being open at one end for serving as droplet emitting nozzles, and (ii) a lower substrate in which one surface thereof has an array of heating elements and addressing electrodes formed thereon, said lower substrate having an insulative layer deposited on the surface thereof and over the heating elements and addressing electrodes and patterned to form recesses therethrough to expose the heating elements and terminal ends of the addressing electrodes, the upper and lower substrates being aligned, mated, and bonded together to form the printhead with the grooves in the upper substrate being aligned with the heating elements in the lower substrate to form droplet emitting nozzles, said upper substrate comprising a material formed by crosslinking or chain extending a polymer of formula I

I

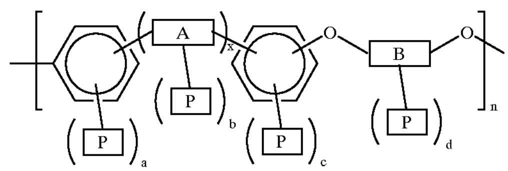

or

II

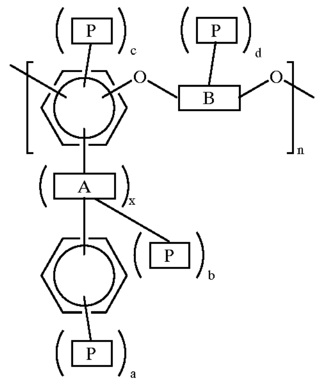

wherein x is an integer of 0 or 1, P is a substituent which imparts photosensitivity to the polymer, a, b, c, and d are each integers of 0, 1, 2, 3, or 4, provided that at least one of a, b, c, and d is equal to or greater than 1 in at least some of the monomer repeat units of the polymer, A is

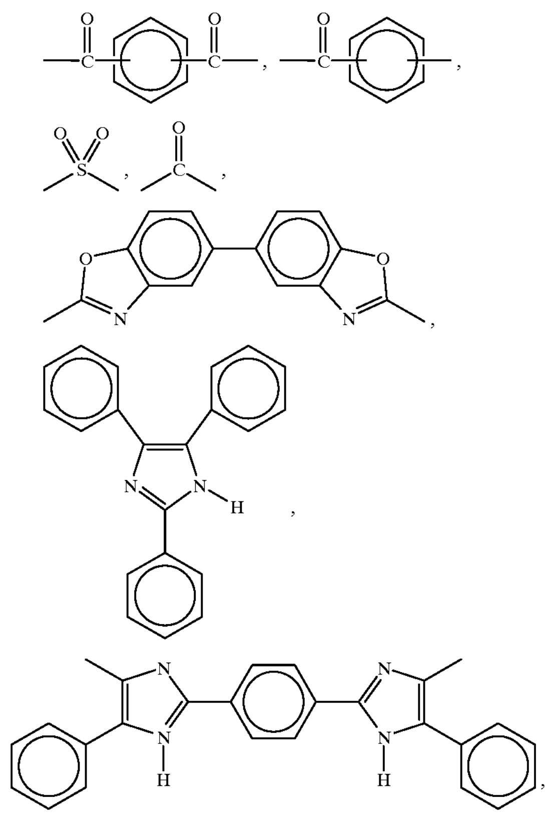

-continued
—O—,
or mixtures thereof, B is
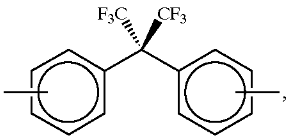
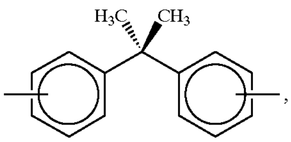
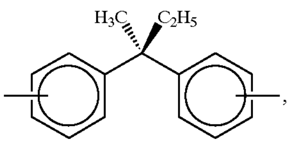
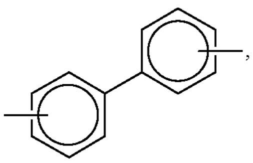
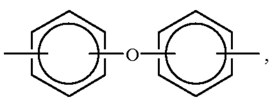
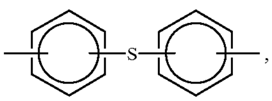
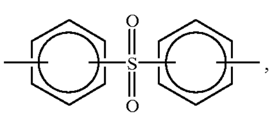
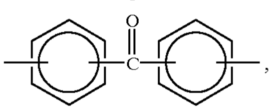
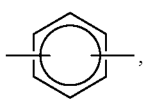
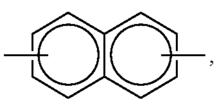
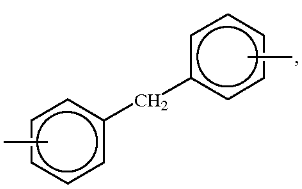
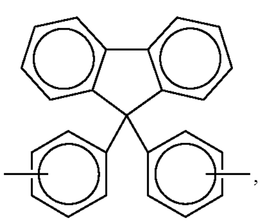
$-(CH_2)_v-$,
wherein v is an integer of from 1 to about 20, and preferably from 1 to about 10,
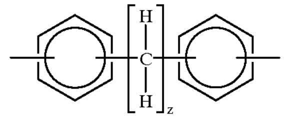
wherein z is an integer of from 2 to about 20, and preferably from 2 to bout 10,
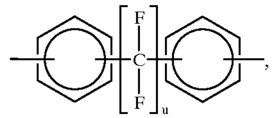
wherein u is an integer of from 1 to about 20, and preferably from 1 to about 10,
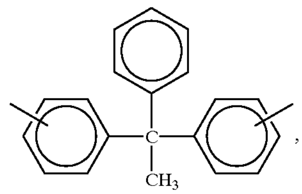
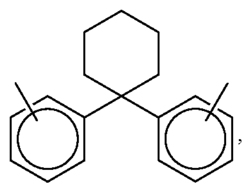
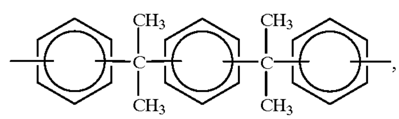
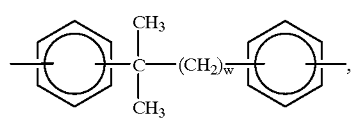
wherein w is an integer of from 1 to about 20, and preferably from 1 to about 10,
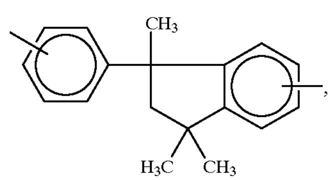
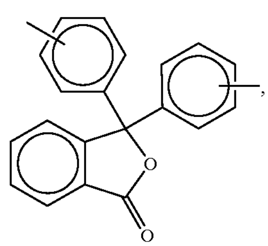

-continued

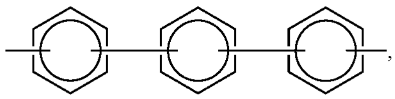

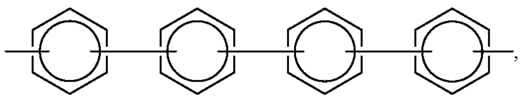

or mixtures thereof, and n is an integer representing the number of repeating monomer units.

Copending Application U.S. Ser. No. 09/217,330, filed Dec. 21, 1998, now pending entitled "Improved Photoresist Compositions," with the named inventors Thomas W. Smith, David J. Luca, and Kathleen M. McGrane, the disclosure of which is totally incorporated herein by reference, discloses a composition comprising a blend of (a) a thermally reactive polymer selected from the group consisting of resoles, novolacs, thermally reactive polyarylene ethers, and mixtures thereof; and (b) a photoreactive epoxy resin that is photoreactive in the absence of a photocationic initiator.

U.S. Pat. No. 5,738,799, filed Sep. 12, 1996, the disclosure of which is totally incorporated herein by reference, discloses an inkjet printhead fabrication technique which enables capillary channels for liquid ink to be formed with square or rectangular cross-sections. A sacrificial layer is placed over the main surface of a silicon chip, the sacrificial layer being patterned in the form of the void formed by the desired ink channels. A permanent layer, comprising permanent material, is applied over the sacrificial layer, and, after polishing the two layers to form a uniform surface, the sacrificial layer is removed. Preferred materials for the sacrificial layer include polyimide while preferred materials for the permanent layer include polyarylene ether, although a variety of material combinations are possible.

Copending application U.S. Ser. No. 08/705,914, filed Aug. 29, 1996, now pending entitled "Thermal Ink Jet Printhead With Ink Resistant Heat Sink Coating," with the named inventors Ram S. Narang and Timothy J. Fuller, the disclosure of which is totally incorporated herein by reference, discloses a heat sink for a thermal ink jet printhead having improved resistance to the corrosive effects of ink by coating the surface of the heat sink with an ink resistant film formed by electrophoretically depositing a polymeric material on the heat sink surface. In one described embodiment, a thermal ink jet printer is formed by bonding together a channel plate and a heater plate. Resistors and electrical connections are formed in the surface of the heater plate. The heater plate is bonded to a heat sink comprising a zinc substrate having an electrophoretically deposited polymeric film coating. The film coating provides resistance to the corrosion of higher pH inks. In another embodiment, the coating has conductive fillers dispersed therethrough to enhance the thermal conductivity of the heat sink. In one embodiment, the polymeric material is selected from the group consisting of polyethersulfones, polysulfones, polyamides, polyimides, polyamide-imides, epoxy resins, polyetherimides, polyarylene ether ketones, chloromethylated polyarylene ether ketones, acryloylated polyarylene ether ketones, polystyrene and mixtures thereof.

U.S. Pat. No. 5,843,259, filed Aug. 29, 1996, entitled "Method for Applying an Adhesive Layer to a Substrate Surface," with the named inventors Ram S. Narang, Stephen F. Pond, and Timothy J. Fuller, the disclosure of which is totally incorporated herein by reference, discloses a method for uniformly coating portions of the surface of a substrate which is to be bonded to another substrate. In a described embodiment, the two substrates are channel plates and heater plates which, when bonded together, form a thermal ink jet printhead. The adhesive layer is electrophoretically deposited over a conductive pattern which has been formed on the binding substrate surface. The conductive pattern forms an electrode and is placed in an electrophoretic bath comprising a colloidal emulsion of a preselected polymer adhesive. The other electrode is a metal container in which the solution is placed or a conductive mesh placed within the container. The electrodes are connected across a voltage source and a field is applied. The substrate is placed in contact with the solution, and a small current flow is carefully controlled to create an extremely uniform thin deposition of charged adhesive micelles on the surface of the conductive pattern. The substrate is then removed and can be bonded to a second substrate and cured. In one embodiment, the polymer adhesive is selected from the group consisting of polyamides, polyimides, polyamide-imides, epoxy resins, polyetherimides, polysulfones, polyether sulfones, polyarylene ether ketones, polystyrenes, chloromethylated polyarylene ether ketones, acryloylated polyarylene ether ketones, and mixtures thereof.

Copending application U.S. Ser. No. 08/697,750, filed Aug. 29, 1996, entitled "Electrophoretically Deposited Coating For the Front Face of an Ink Jet Printhead," with the named inventors Ram S. Narang, Stephen F. Pond, and Timothy J. Fuller, the disclosure of which is totally incorporated herein by reference, discloses an electrophoretic deposition technique for improving the hydrophobicity of a metal surface, in one embodiment, the front face of a thermal ink jet printhead. For this example, a thin metal layer is first deposited on the front face. The front face is then lowered into a colloidal bath formed by a fluorocarbon-doped organic system dissolved in a solvent and then dispersed in a non-solvent. An electric field is created and a small amount of current through the bath causes negatively charged particles to be deposited on the surface of the metal coating. By controlling the deposition time and current strength, a very uniform coating of the fluorocarbon compound is formed on the metal coating. The electrophoretic coating process is conducted at room temperature and enables a precisely controlled deposition which is limited only to the front face without intrusion into the front face orifices. In one embodiment, the organic compound is selected from the group consisting of polyimides, polyamides, polyamide-imides, polysulfones, polyarylene ether ketones, polyethersulfones, polytetrafluoroethylenes, polyvinylidene fluorides, polyhexafluoro-propylenes, epoxies, polypentafluorostyrenes, polystyrenes, copolymers thereof, terpolymers thereof, and mixtures thereof.

Copending application U.S. Ser. No. 08/705,916, filed Aug. 29, 1996, now U.S. Pat. No. 5,939,206, entitled "Stabilized Graphite Substrates," with the named inventors Gary A. Kneezel, Ram S. Narang, Timothy J. Fuller, and Peter J. John, the disclosure of which is totally incorporated herein by reference, discloses an apparatus which comprises at least one semiconductor chip mounted on a substrate, said substrate comprising a graphite member having electrophoretically deposited thereon a coating of a polymeric material. In one embodiment, the semiconductor chips are thermal ink jet printhead subunits. In one embodiment, the polymeric material is of the general formula

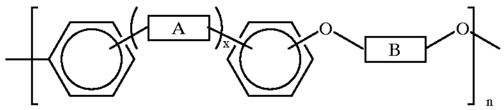

or

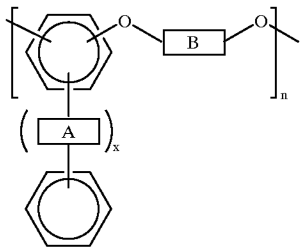

wherein x is an integer of 0 or 1, A is one of several specified groups, such as

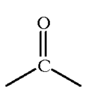

B is one of several specified groups, such as

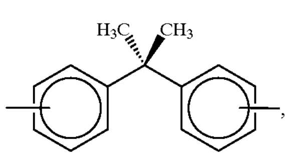

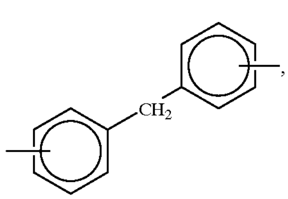

-continued

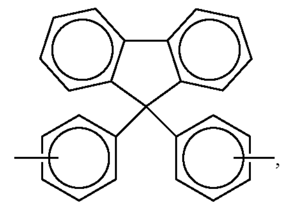

or mixtures thereof, and n is an integer representing the number of repeating monomer units.

Japanese Patent Publication 63-247757 A2, the disclosure of which is totally incorporated herein by reference, discloses an electrophotographic photosensitive body consisting of a body in which a photoconductive layer laminated on a conductive support contains a charge generating substance and/or a charge transporting substance, and at least one polyether ketone polymer consisting of structural units which can be expressed by the following general formulae (I) and (II)

(I)

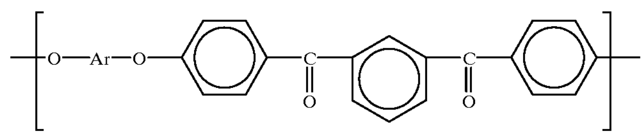

(II)

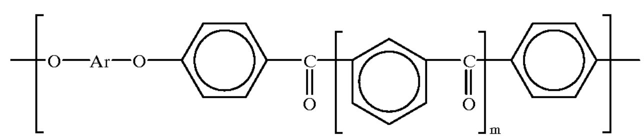

wherein m is 0 or 1 and Ar indicates

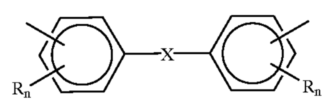

wherein R is an alkyl group, n is 0, 1, or 2, and X indicates

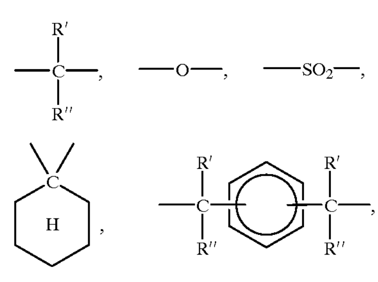

with R' and R" each independently indicating —H, $—CH_3$, $—C_2H_5$,

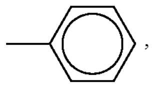

wherein the proportion of structural units in the polymer expressed by the general formula (I) is from 0.1 to 1.0 and the proportion of structural units in the polymer expressed by the general formula (II) is 0 to 0.9.

U.S. Pat. No. 5,336,577 (Spiewak et al.), the disclosure of which is totally incorporated herein by reference, discloses a thick organic ambipolar layer on a photoresponsive device which is simultaneously capable of charge generation and charge transport. In particular, the organic photoresponsive layer contains an electron transport material such as a fluorenylidene malonitrile derivative and a hole transport material such as a dihydroxy tetraphenyl benzadine containing polymer. These may be complexed to provide photoresponsivity, and/or a photoresponsive pigment or dye may also be included.

U.S. Pat. No. 4,801,517 (Frechet et al.), the disclosure of which is totally incorporated herein by reference, discloses an electrostatographic imaging member and an electrophotographic imaging process for using the imaging member in which the imaging member comprises a substrate and at least one electroconductive layer, the imaging member comprising a polymeric arylamine compound resented by the formula

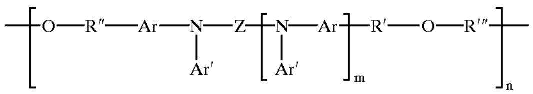

wherein n is between about 5 and 5,000, m is 0 or 1, Z is selected from certain specified aromatic and fused ring groups, Ar is selected from certain specified aromatic groups, R is selected from certain specified alkyl groups, Ar' is selected from certain specified aromatic groups, and R' and R" are independently selected from certain specified alkylene groups.

U.S. Pat. No. 4,806,443 (Yanus et al.), the disclosure of which is totally incorporated herein by reference, discloses an electrostatographic imaging member and an electrophotographic imaging process for using the imaging member in which the imaging member comprises a substrate and an electroconductive layer, the imaging member comprising a polymeric arylamine compound represented by the formula

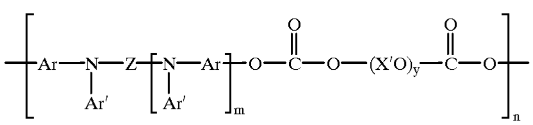

wherein n is between 5 and about 5,000, m is 0 or 1, y is 1, 2, or 3, Z is selected from certain specified aromatic and fused ring groups, Ar is selected from certain specified aromatic groups, Ar' is selected from certain specified aromatic groups, and X' is an alkylene radical selected from the group consisting of alkylene and isoalkylene groups containing 2 to 10 carbon atoms. The imaging member may comprise a substrate, charge generation layer, and a charge transport layer.

U.S. Pat. No. 4,806,444 (Yanus et al.) and U.S. Pat. No. 4,935,487 (Yanus et al.), the disclosures of each of which are totally incorporated herein by reference, disclose an electrostatographic imaging member and an electrophotographic imaging process for using the imaging member in which the imaging member comprises a substrate and an electroconductive layer, the imaging member comprising a polymeric arylamine compound represented by the formula

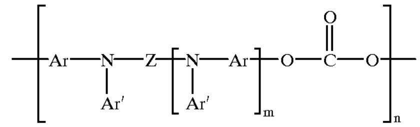

wherein n is between about 5 and about 5,000, m is 0 or 1, Z is selected from certain specified aromatic and fused ring groups, Ar is selected from certain specified aromatic groups, and Ar' is selected from certain specified aromatic groups. The imaging member may comprise a substrate, charge generation layer, and a charge transport layer.

U.S. Pat. No. 4,818,650 (Limburg et al.) and U.S. Pat. No. 4,956,440 (Limburg et al.), the disclosures of each of which are totally incorporated herein by reference, disclose an electrostatographic imaging member and an electrophotographic imaging process for using the imaging member in which the imaging member comprises a substrate and at least one electroconductive layer, the imaging member comprising a polymeric arylamine compound represented by the formula

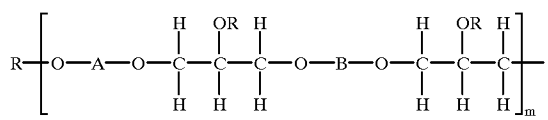

wherein R is selected from the group consisting of —H, —$CH_3$, and —$C_2H_5$, m is between about 4 and about 1,000, A is selected from the group consisting of an arylamine group represented by the formula

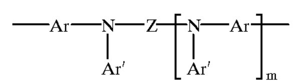

wherein m is 0 or 1, Z is selected from certain specified aromatic and fused ring groups that also contain an oxygen or sulfur atom, certain linear or cyclic hydrocarbon groups, and certain amine groups, Ar is selected from certain specified aromatic groups, Ar' is selected from certain specified aromatic groups, and B is selected from the group consisting of the arylamine group as defined for A and —Ar—V)$_n$Ar— wherein Ar is as defined above and V is selected from an oxygen or sulfur atom, certain linear or cyclic hydrocarbon groups, or a phenylene group, and at least A or B contains the arylamine group. The imaging member may comprise a substrate, charge generation layer, and a charge transport layer.

U.S. Pat. No. 5,030,532 (Limburg et al.), the disclosure of which is totally incorporated herein by reference, discloses an electrostatographic imaging member comprising a support layer and at least one electrophotoconductive layer, said imaging member comprising a polyarylamine polymer represented by the formula

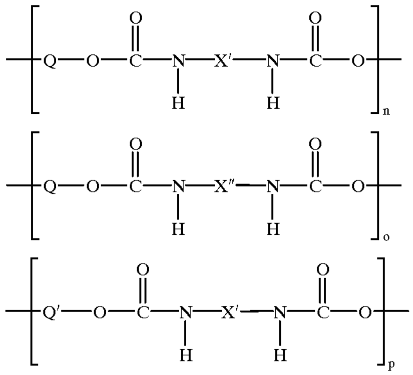

wherein n is between about 5 and about 5,000, or 0 if p>0, o is between about 9 and about 5,000, or is 0 if p>0 or n=0, p is between about 2 and about 100, or is 0 if n>0, X' and X" are independently selected from a group having bifunctional linkages, Q is a divalent group derived from certain hydroxy terminated arylamine reactants, Q' is a divalent group derived from a hydroxy terminated polyarylamine containing the group defined for Q and having a weight average molecular weight between about 1,000 and about 80,000, and the weight average molecular weight of the polyarylamine polymer is between about 10,000 and about 1,000,000.

U.S. Pat. No. 5,438,082 (Helmer-Metzmann et al.) and U.S. Pat. No. 5,561,202 (Helmer-Metzmann et al.), the disclosures of each of which are totally incorporated herein by reference, disclose the production of a polymer electrolyte membrane from sulfonated aromatic polyether ketones. An aromatic polyether ketone of the formula $$-[-[Ar-O]_P Ar-[-[CO-Ar']_X O-Ar]_M [CO-Ar']_Y [O-Ar]_N CO]-$$

in which Ar is a phenylene ring having p- and/or m-bonds, Ar' is a phenylene, naphthylene, biphenylene, anthrylene, or other divalent aromatic unit, X, N, and M, independently of one another, are 0 or 1, Y is 0, 1, 2, or 3, and P is 1, 2, 3, or 4, is sulfonated and the sulfonic acid is isolated. At least 5 percent of the sulfonic groups in the sulfonic acid are converted into sulfonyl chloride groups, and these groups are reacted with an amine containing at least one crosslinkable substituent or a further functional group, and unreacted sulfonyl chloride groups are subsequently hydrolyzed. The resultant aromatic sulfonamide is isolated and dissolved in an organic solvent, the solution is converted into a film, and the crosslinkable substituents in the film are then crosslinked. In specific cases, the crosslinkable substituents can be omitted, in which case, sulfonated polyether ketone is converted into a film from solution. In another embodiment of the disclosed invention, the polymer may contain, in addition to units of the above formula, non-sulfonatable units such as those of the formula

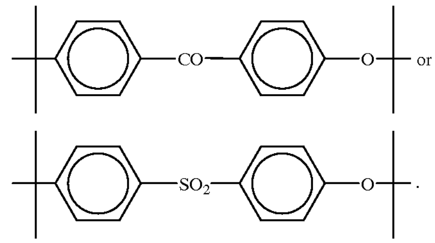

In yet another embodiment of the disclosed invention, as disclosed in columns 8 and 9, mixtures of polymeric, crosslinkable sulfonamides and polymeric, non-crosslinkable, aromatic sulfonic acids can be converted jointly into membranes.

U.S. Pat. No. 4,623,558 (Lin), the disclosure of which is totally incorporated herein by reference, discloses a thermosetting plastisol dispersion composition comprising (1) poly (phenylene oxide) in powder form, which is insoluble in the reactive plasticizer at room temperature and plasticizable at a temperature at or above the fluxing temperature; (2) a liquid reactive- plasticizer member of the group consisting of (a) at least one epoxide resin having an average of more than one epoxide group in the molecule, (b) at least one liquid monomer, oligomer, or prepolymer containing at least one ethylenically unsaturated group, and (c) a mixture of (a) and (b), said reactive plasticizer being capable of solvating the poly(phenylene oxide) at the fluxing temperature and being present in an amount ranging from 5 to 2,000 parts per 100 parts by weight of (1); and (3) 0.01 to 10 percent by weight of (2) of either a thermal initiator or photoinitiator for plasticizers present in the composition. The plastisol dispersion after fluxing can form a thermoset after the crosslinking reaction.

U.S. Pat. No. 4,667,010 (Eldin), the disclosure of which is totally incorporated herein by reference, discloses linear polyether resins containing 100 to 10 mol % of the repeating structural unit of formula I

I

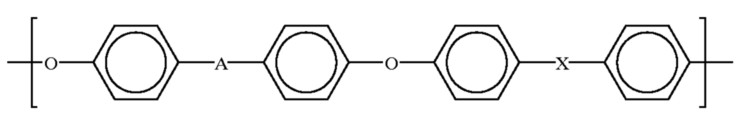

and 90 to 0 mol % of the repeating structural unit of formula II

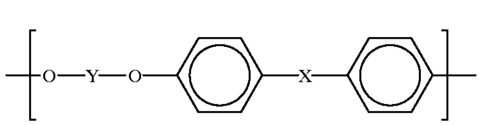

II wherein A is a linear unsubstituted or methyl-substituted alkylene group containing 4 to 100 carbon atoms in the linear alkylene chain, X is $—SO_2—$,

—CO—,

—SO—,

—N=N—,

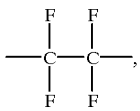

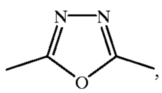

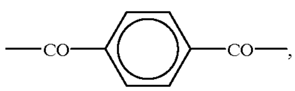

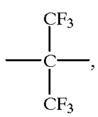

—CH=CH—, or

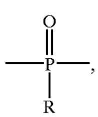

wherein R is $C_1$–$C_8$ alkyl or

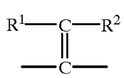

wherein each of $R^1$ and $R^2$ is a hydrogen or a halogen atom, and Y is

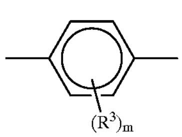

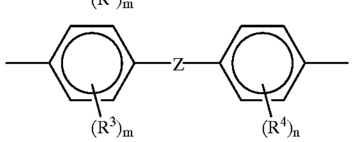

wherein $R^3$ and $R^4$ are the same or different and each is a halogen atom, $C_1$–$C_4$ alkyl, or $C_1$–$C_4$ alkoxy, m and n are 0 or an integer from 1 to 4, and Z is a direct bond or a radical selected from the group consisting of

—O—,

—SO—, $—SO_2—$,

—S—,

—S—S—,

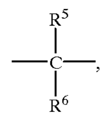

wherein each of $R^5$ and $R^6$ independently of the other is a hydrogen tom, $C_1$–$C_4$ alkyl, or phenyl,

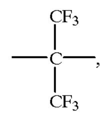

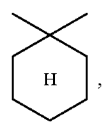

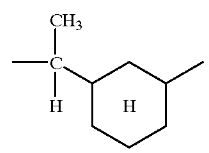

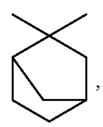

The resins are self-crosslinkable and can be crosslinked by heating to a temperature of not less than 250° C. or by irradiation with energy-rich electromagnetic rays, affording products which are insoluble in organic solvents and which have high glass transition temperatures. The heat crosslinking can, if desired, be carried out in the presence of radical formers such as inorganic or organic peroxides, including potassium peroxide sulfate or benzoyl peroxide, azo compounds such as azoisobutyronitrile, organic hydroperoxides, α-haloacetophenones, benzoin or ethers thereof, benzophenones, benzil acetals, anthraquinones, arsines, phosphines, or thioureas. Crosslinking can also be carried out with energy-rich rays such as X-rays, accelerated electrons, or γ-rays emitted from a $^{60}Co$ source.

U.S. Pat. No. 5,268,444 (Jensen et al.), the disclosure of which is totally incorporated herein by reference, discloses phenylethynyl-terminated poly(arylene ethers) which are prepared in a wide range of molecular weights by adjusting the monomer ratio and adding an appropriate amount of 4-fluoro-4'-phenylethynylbenzophenone during polymer synthesis. The resulting phenylethynyl-terminated poly (arylene ethers) react and crosslink upon curing for one hour at 350° C. to provide materials with improved solvent resistance, higher modulus, and better high temperature properties than the linear, uncrosslinked polymers.

U.S. Pat. No. 4,435,496 (Walls et al.), the disclosure of which is totally incorporated herein by reference, discloses novel photosensitive compositions containing a compound consisting essentially of repeating structural units of an alkyl aryl ether, which are endcapped with a substituent functional group containing an ethylenically unsaturated moiety, and a photosensitizing effective amount of a free radical generating compound. Through the selected exposure of films and coatings prepared from the composition, it is possible to record information in the materials in a manner to alter the physical and/or chemical properties of the films and coatings. Upon selected exposure of the film or coating to imaging energies, the photosensitive species within the composition either itself undergoes a degradative reaction or promotes degradation of one or more of the other components of the composition. This selective modification can then be simply manifested by contacting the exposed surface of the film or coating, subsequent to such exposure, with an alkaline developing solution. The compositions are useful in the graphic arts and in the manufacture of printed circuit boards for the electronics industry.

U.S. Pat. No. 3,455,868 (D'Alessandro), the disclosure of which is totally incorporated herein by reference, discloses a friction composition of particulate friction material and a binder of a heat-hardenable resin and a thermoplastic polyaryiene polyether. The thermoplastic polyarylene polyether is linear and of the basic structure composed of recurring units having the formula

—O—E—O—E'— wherein E is the residuum of the dihydric phenol and E' is the residuum of the benzenoid compound having an inert electron withdrawing group in at least one of the positions ortho and para to the valence bonds, and wherein both of said residua are valently bonded to the ether oxygens through aromatic carbon atoms. Preferred linear thermoplastic polyarylene polyethers are composed of recurring units having the formula

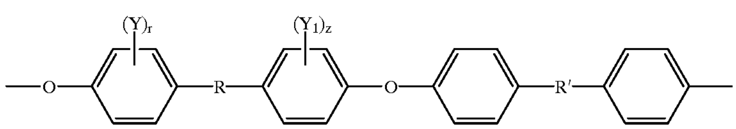

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide, and ethylidene groups, and Y and $Y_1$ each represent inert substituent groups selected from the group consisting of halogen, alkyl groups having from 1 to 4 carbon atoms, and alkoxy groups having from 1 to 4 carbon atoms, and where r and z are integers having a value from 0 to 4 inclusive, and preferably having a value of 0. In Example 14, the polyarylene polyether is of the formula

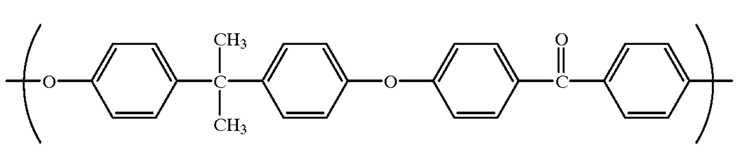

U.S. Pat. No. 5,336,720 (Richards et al.), the disclosure of which is totally incorporated herein by reference, discloses an impact resistant graft polymer and an emulsion polymerization process comprising (1) an agglomerated rubber latex made from a rubber latex and a polymerized polymeric additive, and (2) a grafted polymer. Specifically, the graft polymer comprises:

1) from about 60 to about 95 parts by weight or more (as weight of solid component) of an agglomerated rubber latex (C) having the following composition:

(a) 100 parts by weight (as weight of solid component) of a synthetic rubber latex (A) having particle distribution between about 60 and about 200 nm, and a pH from about 8.0 to about 10.0; and (b) from about 0.1 to about 5.0 parts by weight (as weight of solid component) of a polymerized polymeric additive (B) having an average particle diameter of about 100 to about 300 nm, and formed by polymerizing:

(1) one or more monomer groups where at )east one monomer group always contains at least 30% by weight of unsaturated carboxylic acid selected from acrylic acid, methacrylic acid, itaconic acid, acryloxypropionic acid, crotonic acid, and the like;

(2) from about 5 to about 70% (by weight) of at east one alkyl acrylate having $C_1$–$C_{12}$ alkyl group (such as methyl methacrylate, hydroxyethyl methacrylate, butyl acrylate, and the like; and (3) up to 80% (by weight) of other copolymerizable monomer(s); and 2) from about 5 to about 40 parts by weight of a grafted polymer (D) formed by polymerizing (a) 30% by weight or more of at least one monomer selected from styrene, acrylonitrile, methyl methacrylate, hydroxyethyl methacrylate, butyl acrylate, ethyl acrylate, and the like; and (b) 30% by weight or less of a vinyl monomer having $CH_2$=C< copolymerizable therewith. As stated at columns 4 an 5, bridging paragraph, in the preparation of the (B) component, the "other copolymerizable monomers" can be unsaturated aromatic compounds such as styrene, alpha-methylstyrene, and vinyltoluene; unsaturated nitrile compounds such as acrylonitrile and methacrylonitrile; alkyl methacrylates having $C_1$–$C_{12}$ alkyl group, such as butyl acrylate and hydroxyethylmethacrylate; and diolefins such as butadiene. Crosslinkers or graftlinkers such as ethylenically unsaturated esters (e.g., allyl methacrylate and methallyl methacrylate, 1,3-butylene glycol dimethacrylate, trimethyl glycol propane triacrylate, and the like), or other ethylenically unsaturated monomers (e.g., divinyl benzene and trivinyl benzene) may be used, at levels typically less than or equal to 2% by weight.

EP 0 281 808, the disclosure of which is totally incorporated herein by reference, discloses a thermally stable radiation crosslinkable polymer system which cures without additional heat treatment which comprises a main component A which is a polyether acrylate or a compound in accordance with one of the structural formulae $$CHY_2 \quad (1)$$

$$CHY_2—CHY_2 \quad (2)$$

(3)

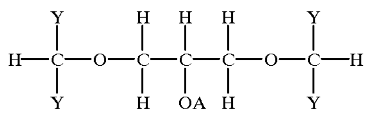

wherein Y denotes a radical of the structure

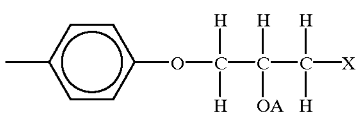

in which X is H, Cl, or OH and where A denotes the acyl radical of a substituted acrylic acid, and 1 to 10 percent by weight of a component B, different therefrom, as a crosslinking intensifier, which component B is selected from pentaerythritol triacrylate or tetraacrylate, dipentaeerythritol pentaacrylate, or trimethylolpropane triacrylate. In one specific embodiment, the polyether acrylate has the general structure

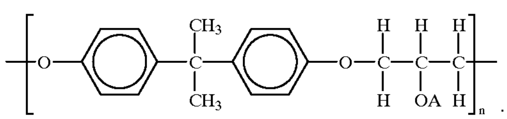

JP 60-57826, the disclosure of which is totally incorporated herein by reference, discloses azido group containing polyether sulfones containing a repeating unit of the formula

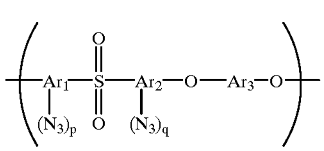

wherein $Ar_1$ represents an aromatic hydrocarbon group with carbon number 6 to 10 (2+p), $Ar_2$ represents an aromatic hydrocarbon group with carbon number 6 to 10 (2+q), $Ar_3$ represents a divalent aromatic group with carbon number 6 to 15, and p and q represent 0, 1, or 2 and satisfy p+q=1 to 4. Specific examples of $Ar_1$ and $Ar_2$ include

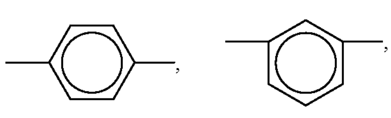

-continued

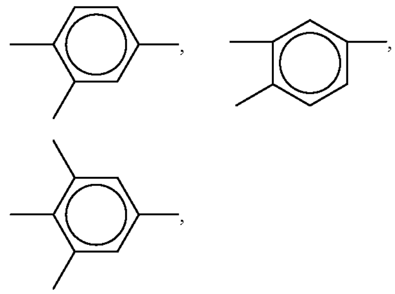

methyl substitutes of the above,

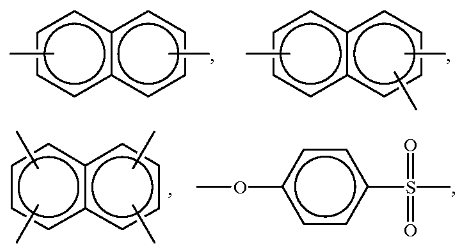

and

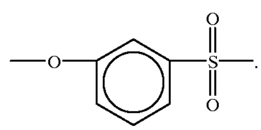

Examples of suitable $Ar_3$ groups include

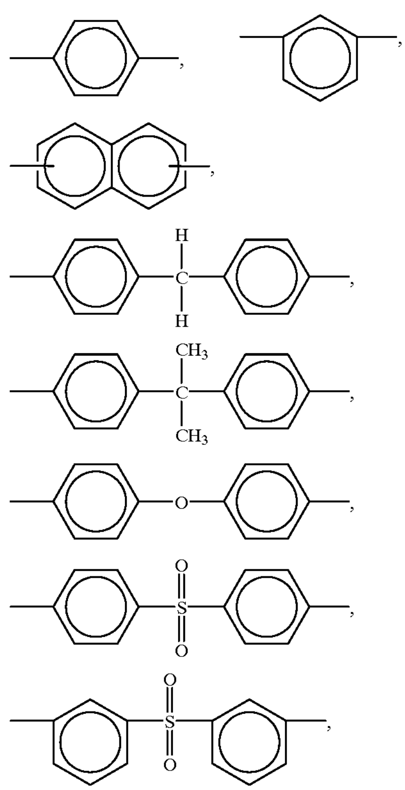

-continued

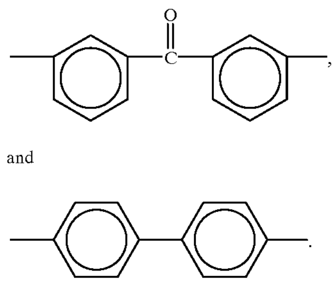

The resin is heat resistant and photosensitive, and suitable for use as a photoresist for microprocessing.

JP 56-050929, the disclosure of which is totally incorporated herein by reference, discloses a polysulfone characterized by having a carbon-carbon double bond in the side chain, represented by the formula

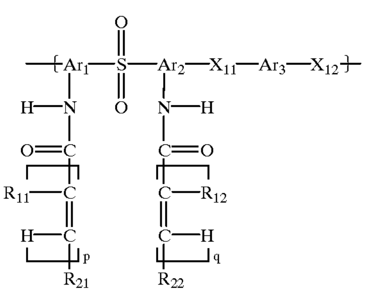

wherein $Ar_1$ is a (2+p) valence aromatic hydrocarbon group having 6 to 10 carbon atoms, $Ar_2$ is a (2+q) valence aromatic hydrocarbon group having 6 to 10 carbon atoms, $Ar_3$ is a divalent aromatic hydrocarbon group having 6 to 15 carbon atoms, —$X_{11}$— and —$X_{12}$— are the same or different and show connecting —O— or —$NR_3$—, $R_3$ is a hydrogen atom or univalent hydrocarbon group having 1 to 10 carbon atoms, $R_{11}$ and $R_{12}$ are the same or different and hydrogen atoms or methyl groups, $R_{21}$ and $R_{22}$ are the same or different and hydrogen atoms or phenyl groups, $r_{21}$ and $r_{22}$ are independently 1 or 2, p and q are independently 0, 1, or 2, and the equation p+q=1 to 4 must be satisfied.

JP 56-050928, the disclosure of which is totally incorporated herein by reference, discloses a polysulfone characterized by having, in the side chain, a (meth)acrylate group comprising a constituting unit represented by the following general formula (I):

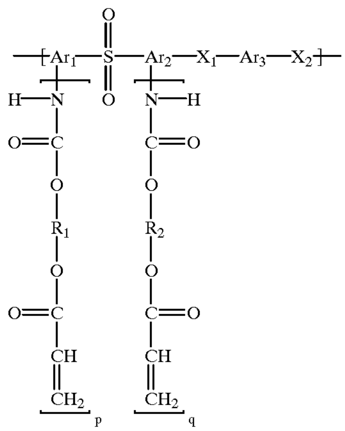

wherein $Ar_1$ is a (2+p) valence aromatic hydrocarbon group having 6 to 10 carbon atoms, $Ar_2$ is a (2+q) valence aromatic hydrocarbon group having 6 to 10 carbon atoms, $Ar_3$ is a divalent aromatic hydrocarbon group having 6 to 15 carbon atoms which may contain the hetero atom S or O, —$X_1$— and —$X_2$— are the same or different and show connecting —O— or —$NR_3$—, $R_1$ is a hydrogen atom or univalent hydrocarbon group having 1 to 10 carbon atoms, $R_2$ is an alkyl group having 2 to 5 carbon atoms, and furthermore, $R_3$ is a hydrogen atom or methyl group; p and 1 are independently 0, 1, or 2, and the equation p+q=1 to 4 must be satisfied.

U.S. Pat. No. 4,086,209 (Hara et al.), the disclosure of which is totally incorporated herein by reference, discloses substantially linear or at least partially crosslinked nitrogen-containing polymers having an aryleneimine or arylenether unit in the main chain with an amino group or a group derived from it being bonded as a pendant group to a nuclear carbon atom of the arylene group of the above unit. According to the number and type of the pendant groups, the polymers can have various useful properties such as thermal stability, hydrophilicity, oxidative reducibility, photosensitivity, color formability, or the ability to form coordination bonds. Further, the polymers have good solubility in aprotic polar organic solvents. Permselective membranes having good performance can be prepared from solutions of the polymers in these solvents.

EP 0 663 411, the disclosure of which is totally incorporated herein by reference, discloses a photoimaging resist ink containing (A) an unsaturated group-having polycarboxylic acid resin which is a reaction product of (c) succinic anhydride with an additive reaction product of (a) an epoxy resin with (b) an unsaturated group-having monocarboxylic acid, wherein (a) the epoxy resin is represented by the formula

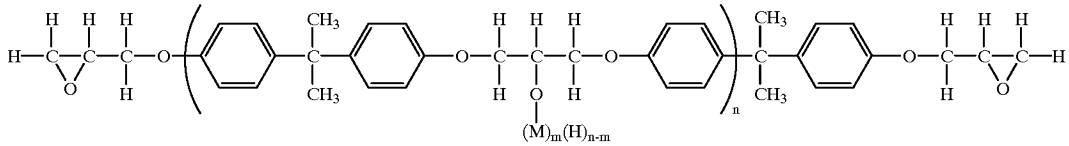

wherein M stands for

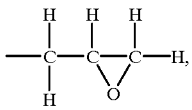

n is at least 1 on the average, and m is 1 to n on the average. In specific embodiments, the resist further contains (B) a photopolymerization initiator, (C) a diluent, and (D) a curing component. In forming a solder resist pattern by exposing a coating film of a resist ink through a patterned film to ultraviolet light and developing the coating film to dissolve away the unexposed portions thereof, the resist ink is excellent in developability and photosensitivity, while the cure product thereof is excellent in flex resistance and folding resistance, heat resistance, and the like. The resist ink is especially suitable as a liquid solder resist ink for flexible printed circuit boards and thin pliable rigid circuit boards.

U.S. Pat. No. 4,448,948 (Tsubaki et al.), the disclosure of which is totally incorporated herein by reference, discloses an epoxy resin substantially represented by the general formula

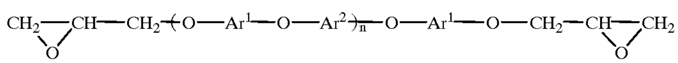

wherein $Ar^1$ is a residual group of a dihydric phenol derived from a compound having one or two benzene nuclei, $Ar^2$ is a residual group of a halogen-substituted benzenoid compound having two halogen atoms on its nuclei and represented by the formula $$—Ar^3—Y—Ar^4—$$

wherein each of $Ar^3$ and $Ar^4$ is a hydrocarbon group having a divalent benzene nucleus and Y is a sulfone group or a carbonyl group, and n is an integer of from 1 to 50.

U.S. Pat. No. 5,728,498 (Yanus et al.), the disclosure of which is totally incorporated herein by reference, discloses a flexible electrophotographic imaging member including a supporting substrate coated with at least one imaging layer comprising hole transporting material containing at least two long chain alkyl carboxylate groups dissolved or molecularly dispersed in a film forming binder. Preferred charge transporting materials are of the formula

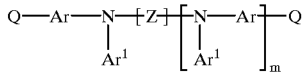

wherein m is 0 or 1, Z is selected from the group consisting of

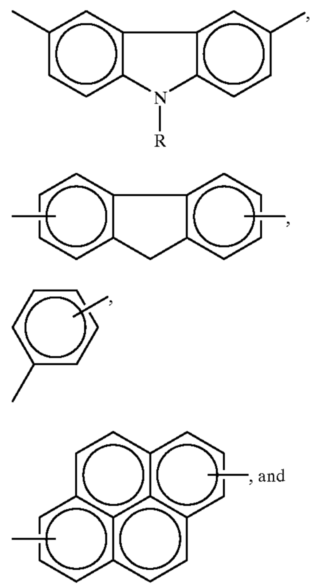

-continued

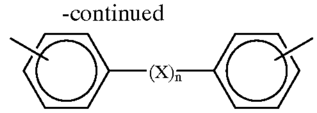

n is 0 or 1, Ar is selected from the group consisting of

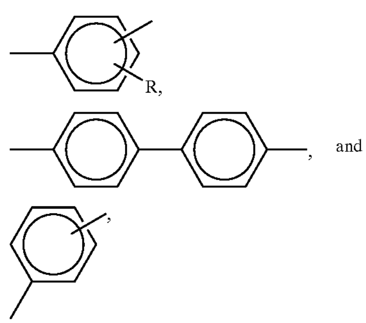

R is selected from the group consisting of $—CH_3$, $—C_2H_5$, $—C_3H_7$, and $—C_4H_9$, Ar' is selected from the group consisting of

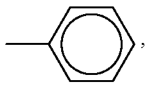

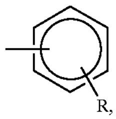

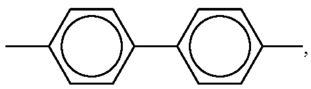
, and

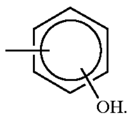

X is selected from the group consisting of —$CH_2$—, —$C(CH_3)_2$—, —O—, —S—,

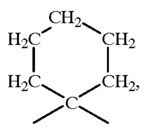

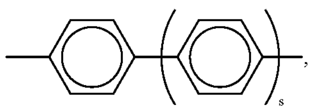

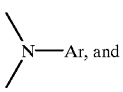

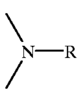

s is 0, 1, or 2, and Q is represented by the formula $$-(O)_p\left(\underset{R_2}{\overset{R_1}{C}}\right)_s\overset{O}{\overset{\|}{C}}-O\left(\underset{R_4}{\overset{R_3}{C}}\right)_n CH_3$$

wherein p is 1 or 0, $R_1$, $R_2$, $R_3$, $R_4$ are independently selected from —H, —$CH_3$, —$(CH_2)_vCH_3$, —$CH(CH_3)_2$, —$C(CH_3)_3$, wherein v is 1 to 10, and s and n are independently selected from 0 to 10.

Copending application U.S. Ser. No. (not yet assigned; Attorney Docket No. D/97682Q1), filed concurrently herewith, entitled "Ink Jet Printheads Containing Arylene Ether Alcohol Polymers," with the named inventors Timothy J. Fuller, John F. Yanus, Damodar M. Pai, Markus R. Silvestri, Ram S. Narang, William W. Limburg, and Dale S. Renfer, the disclosure of which is totally incorporated herein by reference, discloses an ink jet printhead containing a polymer of the formula

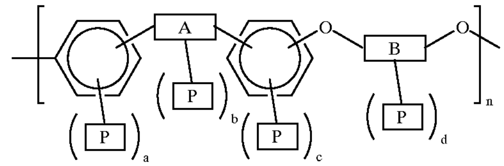

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A is

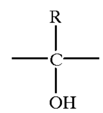

or a mixture of

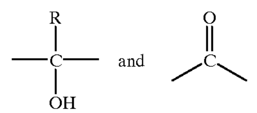

wherein R is a hydrogen atom, an alkyl group, an aryl group, or mixtures thereof, B is one of specified groups, such as

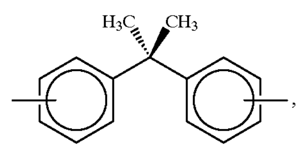

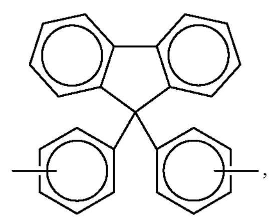

or mixtures thereof, and n is an integer representing the number of repeating monomer units.

Copending application U.S. Ser. No. (not yet assigned; Attorney Docket No. D/97682Q2), filed concurrently herewith, entitled "Imaging Members Containing Arylene Ether Alcohol Polymers," with the named inventors Timothy J. Fuller, John F. Yanus, Damodar M. Pai, Markus R. Silvestri, Ram S. Narang, William W. Limburg, and Dale S. Renfer, the disclosure of which is totally incorporated herein by reference, discloses an imaging member which comprises a conductive substrate, a photogenerating material, and a binder comprising a polymer of the formula

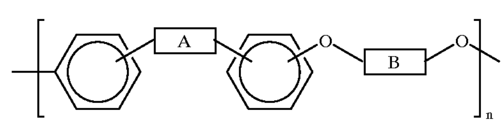

wherein A is

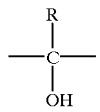

or a mixture of

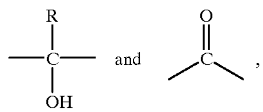

wherein R is a hydrogen atom, an alkyl group, an aryl group, or mixtures thereof, B is one of specified groups, such as

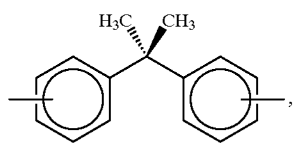

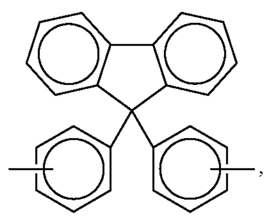

or mixtures thereof, and n is an integer representing the number of repeating monomer units.

While known compositions and processes are suitable for their intended purposes, a need remains for improved materials suitable for microelectronics applications. A need also remains for improved ink jet printheads. Further, there is a need for crosslinkable or chain extendable polymeric materials which are heat stable, electrically insulating, and mechanically robust. Additionally, there is a need for crosslinkable or chain extendable polymeric materials which are chemically inert with respect to the materials that might be employed in ink jet ink compositions. There is also a need for crosslinkable or chain extendable polymeric materials which exhibit low shrinkage during post-cure steps in microelectronic device fabrication processes. In addition, a need remains for crosslinkable or chain extendable polymeric materials which exhibit a relatively long shelf life. Further, there is a need for photopatternable polymeric materials which can be patterned with relatively low photo-exposure energies. Additionally, a need remains for crosslinkable or chain extendable polymeric materials which, in the cured form, exhibit good solvent resistance. There is also a need for crosslinkable or chain extendable polymeric materials which, when applied to microelectronic devices by spin casting techniques and cured, exhibit reduced edge bead and no apparent lips and dips. In addition, there remains a need for crosslinkable or chain extendable polymeric materials which have relatively low dielectric constants. Further, there is a need for crosslinkable or chain extendable polymeric materials which exhibit reduced water sorption. Additionally, a need remains for crosslinkable or chain extendable polymeric materials which exhibit improved hydrolytic stability, especially upon exposure to alkaline solutions. A need also remains for photopatternable polymeric materials which are stable at high temperatures, typically greater than about 150° C. There is also a need for photopatternable polymeric materials which either have high glass transition temperatures or are sufficiently crosslinked that there are no low temperature phase transitions subsequent to photoexposure. Further, a need remains for photopatternable polymeric materials with low coefficients of thermal expansion. There is a need for polymers which are thermally stable, patternable as thick films of about 30 microns or more, exhibit low $T_g$ prior to photoexposure, have low dielectric constants, are low in water absorption, have low coefficients of expansion, have desirable mechanical and adhesive characteristics, and are generally desirable for interlayer dielectric applications, including those at high temperatures, which are also photopatternable. There is also a need for photoresist compositions with good to excellent processing characteristics. Further, a need remains for improved photosensitive imaging members. A need also remains for improved binders for photosensitive imaging members. In addition, there is a need for polymeric binders suitable for use in photogenerating layers in imaging members. Further, a need remains for polymeric binders suitable for use in charge transport layers in imaging members. Additionally, there is a need for polymeric binders with high glass transition temperatures. There is also a need for polymeric binders which enable the incorporation of high loadings of charge transport materials and/or plasticizers therein. In addition, a need remains for polymeric binders which exhibit good film properties and good adhesion to imaging member substrates. Further, a need remains for polymeric binders for imaging members which have high resistance to a wide variety of solvents. Additionally, a need remains for polymeric binders suitable for charge transport layers in imaging members which enable incorporation of charge transport materials such as N,N'-diphenyl-N,N'-bis(3"-methylphenyl)-(1,1'-biphenyl)-4,4'-diamine in the layer in amounts of 50 percent by weight and higher without resulting in severe plasticization. There is also a need for polymeric binders which can be coated onto photosensitive imaging members from a wide variety of solvents. Further, a need remains for polymeric binders in which charge transport molecules exhibit reduced or eliminated tendency to crystallize. In addition, there is a need for polymeric binders which have a reduced tendency to crystallize compared to widely used photoreceptor binder polymers. There is also a need for abrasion resistant and wear resistant photoconductive imaging members. Further, there is a need for photoconductive imaging members which are flat after oven drying. Additionally, there is a need for polymeric binders and transport polymers with improved wear and abrasion resistance compared to known polymers commonly used in photoconductive imaging members. A need also remains for photoconductive imaging members which are curl-free and stress-free after removal of coating solvents. In addition, a need remains for polymers suitable for use as adhesive layer materials in photoconductive imaging members. Further, a need remains for polymers suitable for use as protective overcoating layer materials in photoconductive imaging members. Additionally, a need remains for polymers which, when mixed with a solvent and coated onto an imaging member, adhere well to materials commonly used as photoconductive imaging member overcoats (such as LUCKAMIDE), particularly when the polymer is subjected to a one-shot drying process, wherein the overcoat is coated onto the layer containing the polymer of the present invention before said layer has dried. There is also a need for polymers that, when incorporated into photoconductive imaging members, exhibit improved wear resistance to bias charging rolls, including improvements of up to twice the wear resistance observed for commonly used, such as polycarbonates based on 1,1-cyclohexyl-4,4'-bisphenol.

SUMMARY OF THE INVENTION

The present invention is directed to a polymer of the formula

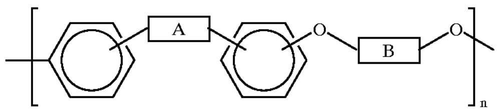

wherein A is

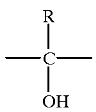

or a mixture of

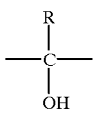

and

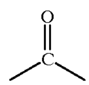

wherein R is a hydrogen atom, an alkyl group, an aryl group, or mixtures thereof, B is

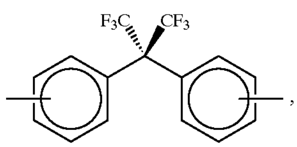

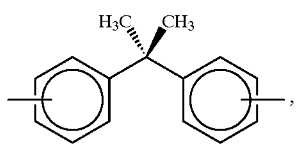

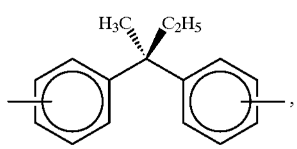

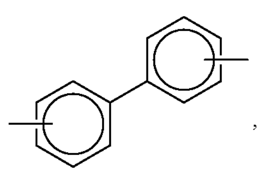

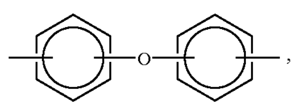

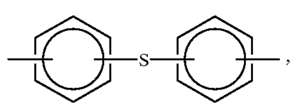

-continued

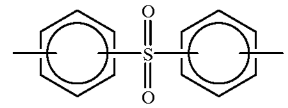

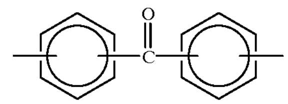

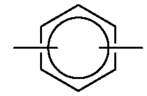

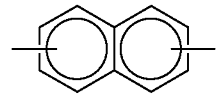

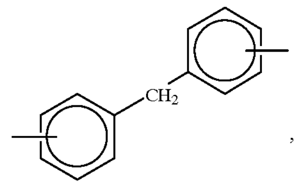

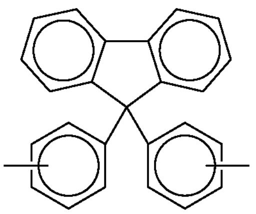

$-(CH_2)_v-$, wherein v is an integer of from 1 to about 20,

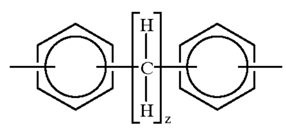

wherein z is an integer of from 2 to about 20,

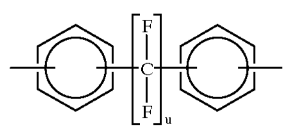

wherein u is an integer of from 1 to about 20,

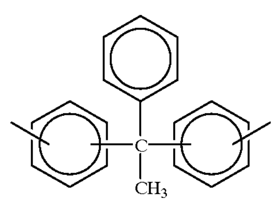

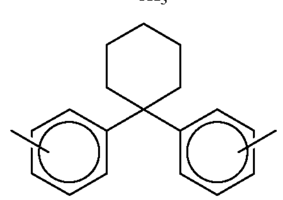

-continued

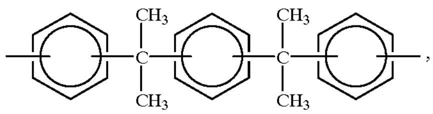

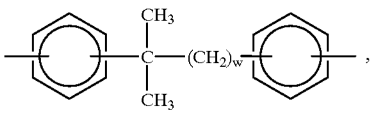

wherein w is an integer of from 1 to about 20,

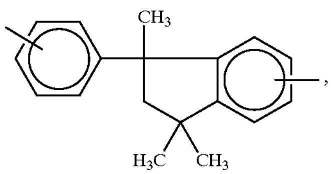

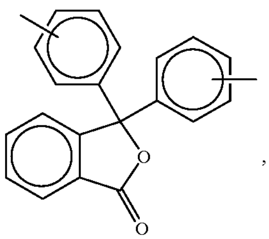

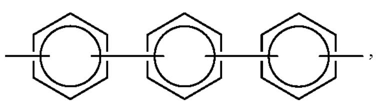

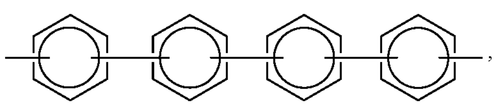

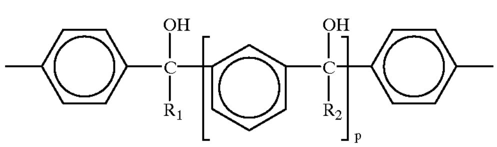

wherein $R_1$ and $R_2$ each, independently of the other, are hydrogen atoms, alkyl groups, or aryl groups, and p is an integer of 0 or 1,

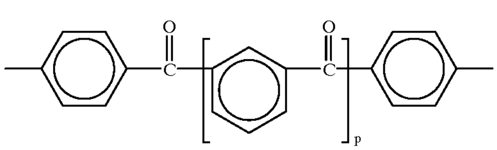

wherein p is an integer of 0 or 1, $$—(CH_2O)_t—$$

wherein t is an integer of from 1 to about 20,

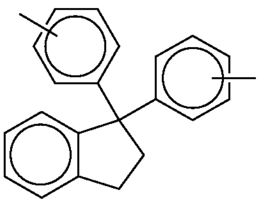

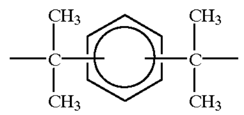

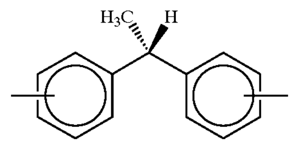

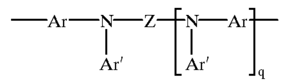

wherein (1) Z is

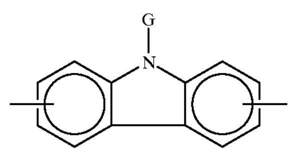

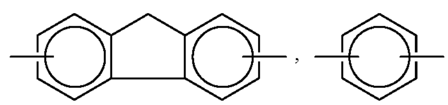

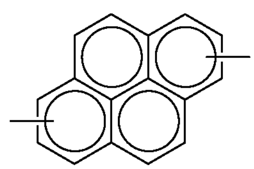

, or —Ar—$(X)_p$—Ar— wherein p is 0 or 1; (2) Ar is

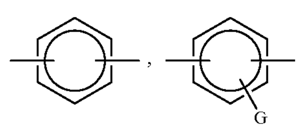

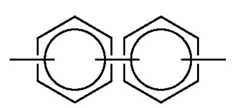

(3) G is an alkyl group selected from alkyl or isoalkyl groups containing from about 2 to about 10 carbon atoms; (4) Ar' is

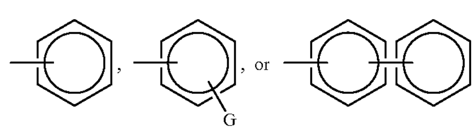

(5) X is

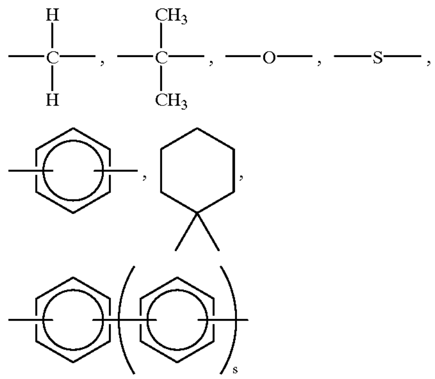

wherein s is 0, 1, or 2,

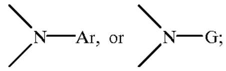

and (6) q is 0 or 1; or mixtures thereof, hydroxy-substituted, hydroxyalkyl-substituted, or hydroxyaryl-substituted derivatives thereof, or mixtures thereof, and n is an integer representing the number of repeating monomer units. Another embodiment of the present invention is directed to a polymer of the formula

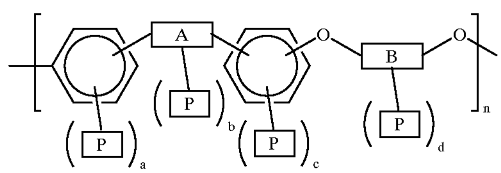

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A and B are as defined above, and n is an integer representing the number of repeating monomer units. Yet another embodiment of the present invention is directed to a crosslinked or chain extended polymer formed by crosslinking or chain extending a precursor polymer having terminal end groups and monomer repeat units, said precursor polymer being of the formula

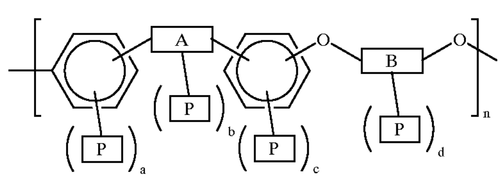

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A and B are as defined above, and n is an integer representing the number of repeating monomer units, said crosslinking or chain extension occurring through crosslinking substituents contained on at least some of the monomer repeat units of the precursor polymer. Still another embodiment of the present invention is directed to a process for preparing a polymer which comprises (1) providing a precursor polymer of the formula

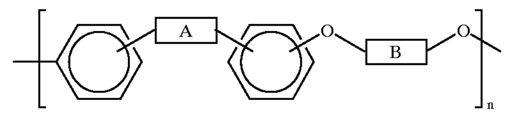

wherein A is

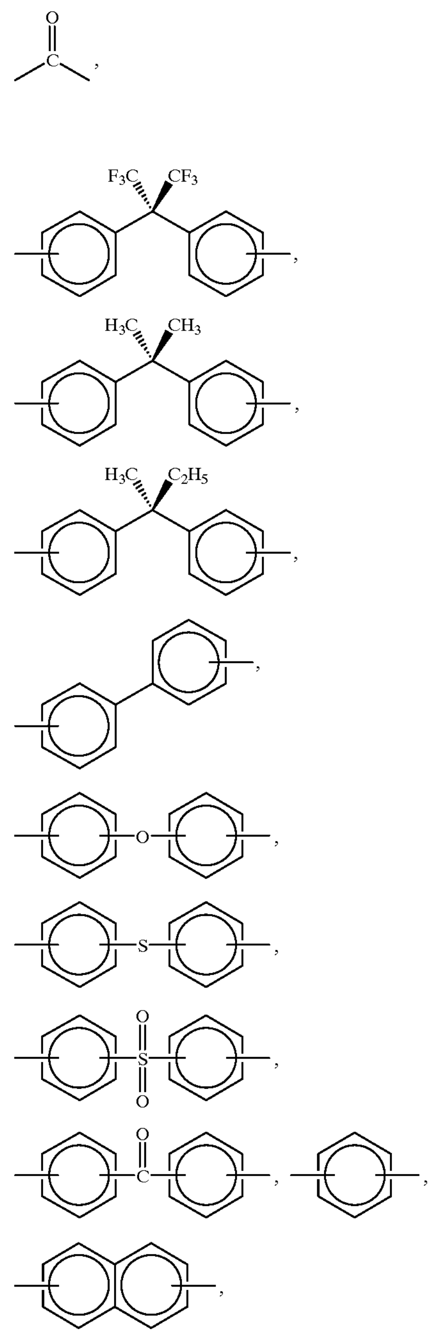

-continued

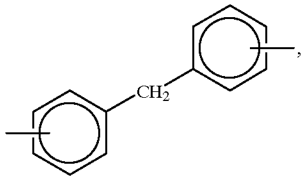

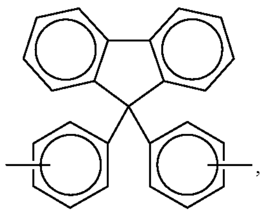

, $-(CH_2)_v-$ , wherein v is an integer of from 1 to about 20,

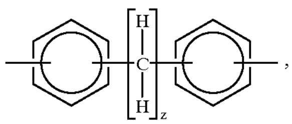

wherein z is an integer of from 2 to about 20,

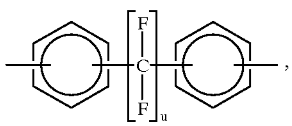

wherein u is an integer of from 1 to about 20,

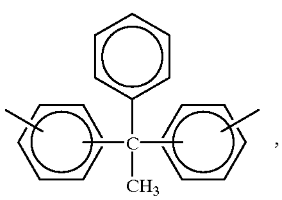

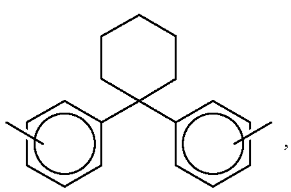

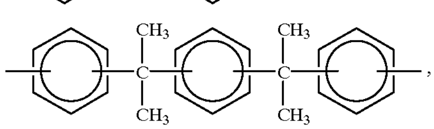

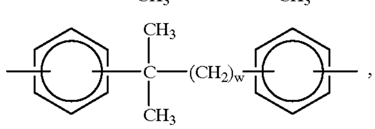

wherein w is an integer of from 1 to about 20,

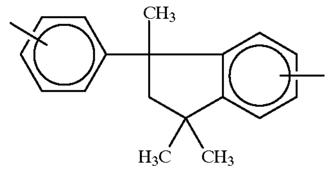

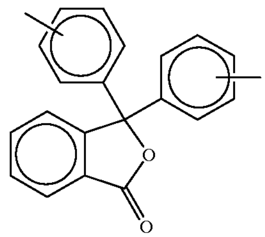

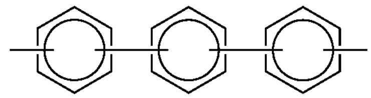

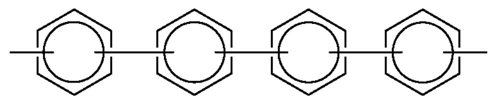

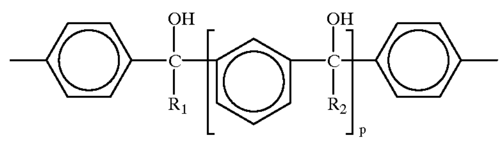

wherein $R_1$ and $R_2$ each, independently of the other, are hydrogen atoms, alkyl groups, or aryl groups, and p is an integer of 0 or 1,

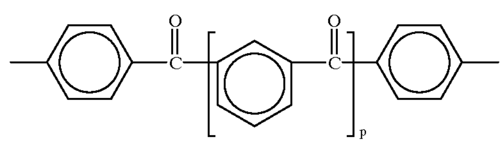

wherein p is an integer of 0 or 1, $-(CH_2O)_t-$ wherein t is an integer of from 1 to about 20,

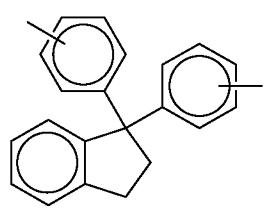

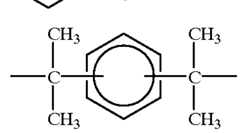

-continued

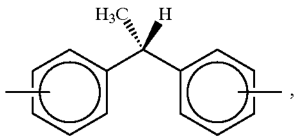

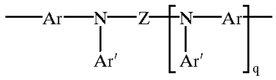

wherein (1) Z is

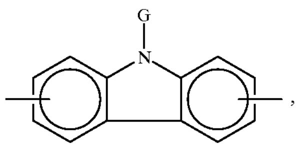

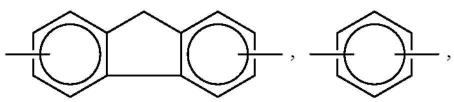

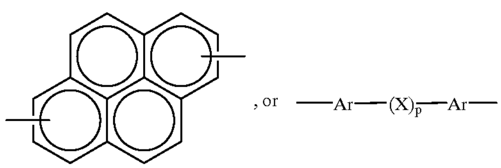

wherein p is 0 or 1; (2) Ar is

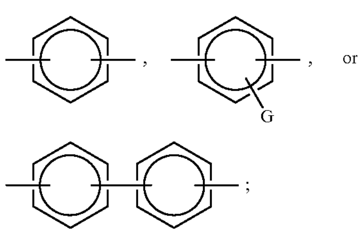

(3) G is an alkyl group selected from alkyl or isoalkyl groups containing from about 2 to about 10 carbon atoms; (4) Ar' is

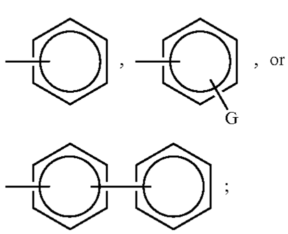

(5) X is

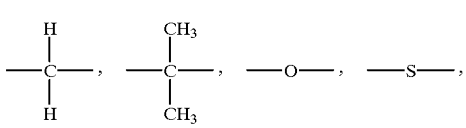

-continued

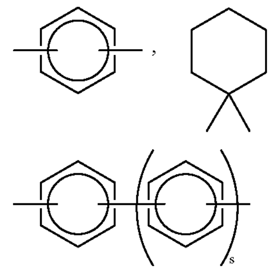

wherein s is 0, 1, or 2,

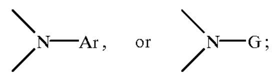

and (6) q is 0 or 1; or mixtures thereof, hydroxy-substituted, hydroxyolkyl-substituted, or hydroxyaryl-substituted derivatives thereof, or mixtures thereof, and n is an integer representing the number of repeating monomer units, and (2) reacting the precursor polymer with borane, resulting in formation of a polymer of the formula

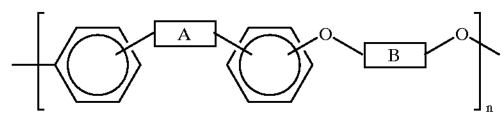

wherein A is

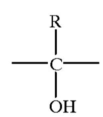

or a mixture of

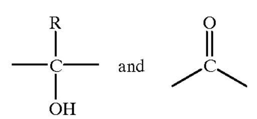

wherein R is a hydrogen atom, an alkyl group, an aryl group, or mixtures thereof. Another embodiment of the present invention is directed to a process for preparing a polymer which comprises (1) providing a precursor polymer of the formula

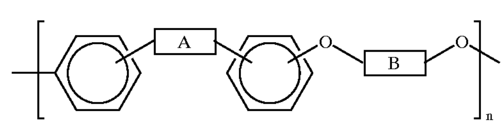

wherein A is
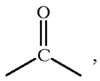
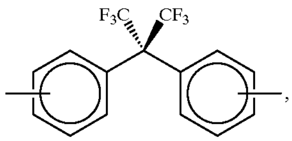
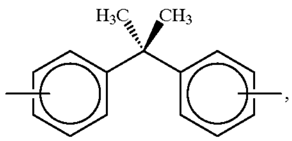
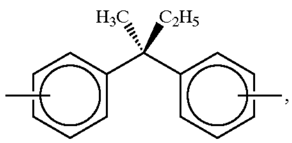
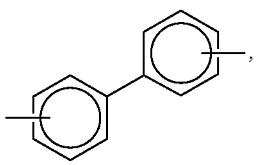
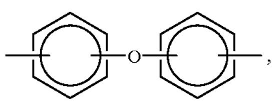
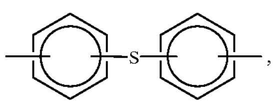
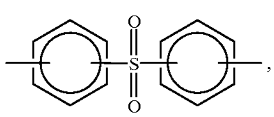
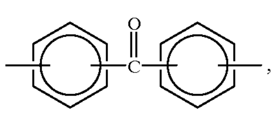
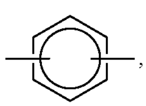
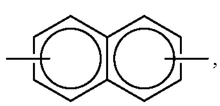
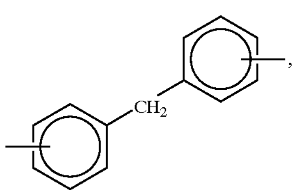
-continued
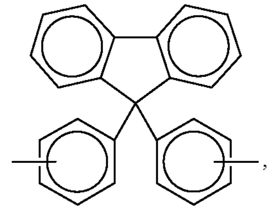
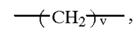
wherein v is an integer of from 1 to about 20,
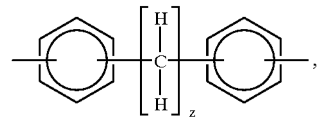
wherein z is an integer of from 2 to about 20,
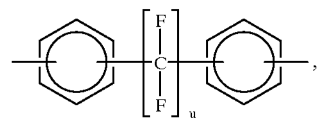
wherein u is an integer of from 1to about 20,
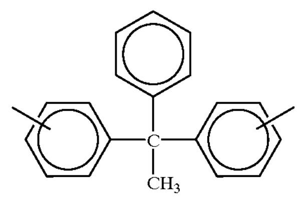
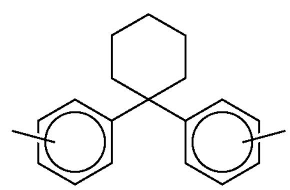
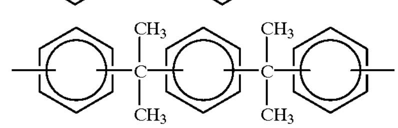
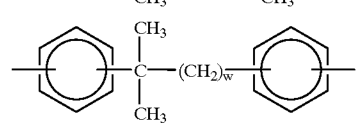
wherein w is an integer of from 1 to about 20,
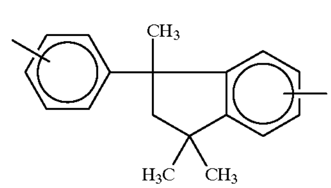

-continued

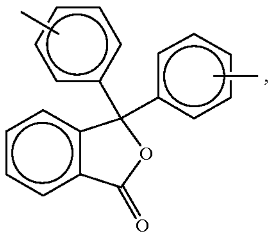

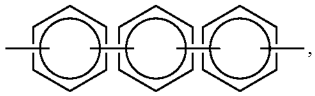

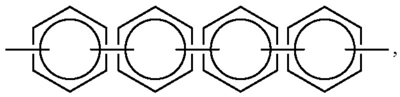

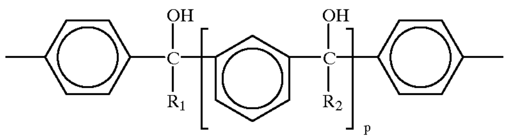

wherein $R_1$ and $R_2$ each, independently of the other, are hydrogen atoms, alkyl groups, or aryl groups, and p is an integer of 0 or 1,

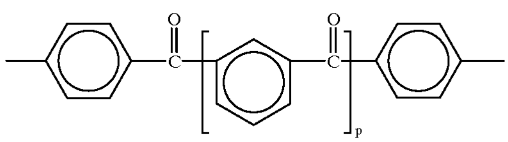

wherein p is an integer of 0 or 1, $—(CH_2O)_t—$ wherein t is an integer of from 1 to about 20,

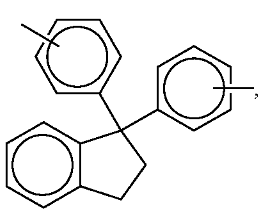

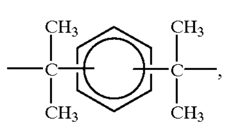

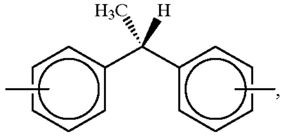

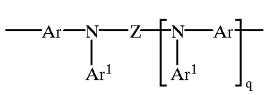

wherein (1) Z is

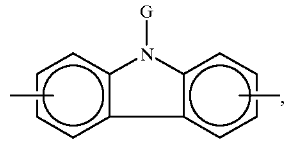

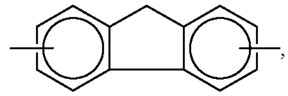

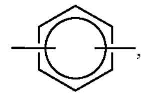

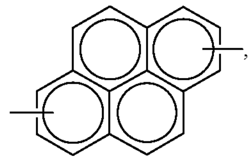

or —Ar—$(X)_p$—Ar— wherein p is 0 or 1; (2) Ar is

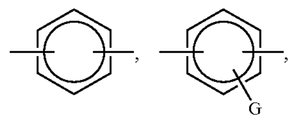

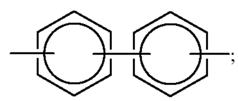

(3) G is an alkyl group selected from alkyl or isoalkyl groups containing from about 2 to about 10 carbon atoms; (4) Ar' is

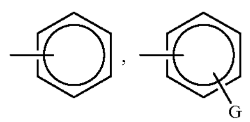

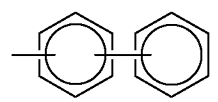

(5) X is

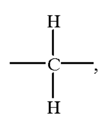

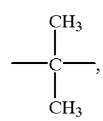

—O—, —S—,

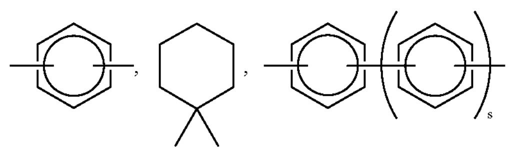

wherein s is 0, 1, or 2,

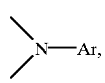

or

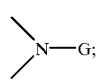

and (6) q is 0 or 1; or mixtures thereof, hydroxy-substituted, hydroxyalkyl-substituted, or hydroxyaryl-substituted derivatives thereof, or mixtures thereof, and n is an integer representing the number of repeating monomer units, (2) reacting the precursor polymer with a reagent of the formula RMgX, wherein R is a hydrogen atom, an alkyl group, an aryl group, or mixtures thereof and X is a halogen atom, and (3) subsequent to step 2, adding water or acid to the polymer, thereby resulting in formation of a polymer of the formula

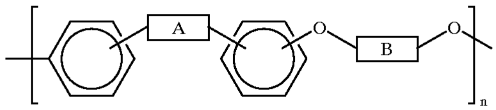

wherein A is

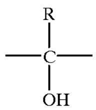

or a mixture of

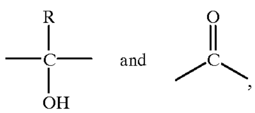

wherein R is a hydrogen atom, an alkyl group, an aryl group, or mixtures thereof.

DETAILED DESCRIPTION OF THE INVENTION

The present invention is directed to polymers of the general formula

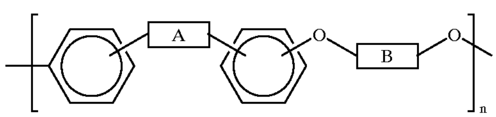

wherein A is

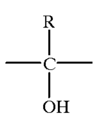

or a mixture of

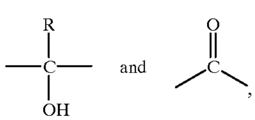

wherein R is a (a) hydrogen atom, (b) an alkyl group, including unsubstituted alkyl groups and substituted alkyl groups, such as hydroxyalkyl groups, preferably with from 1 to about 20 carbon atoms, more preferably with from 1 to about 10 carbon atoms, and even more preferably with from 1 to about 5 carbon atoms, although the number of carbon atoms can be outside of this range, (c) an aryl group, including unsubstituted aryl groups and substituted aryl groups, such as hydroxyaryl groups, preferably with from 6 to about 18 carbon atoms, more preferably with from 6 to about 12 carbon atoms, and even more preferably with 6 carbon atoms, although the number of carbon atoms can be outside of this range, or (d) mixtures thereof, B is

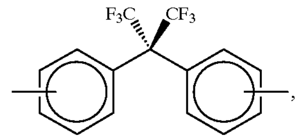

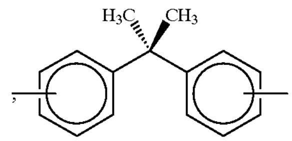

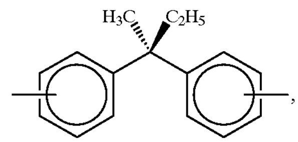

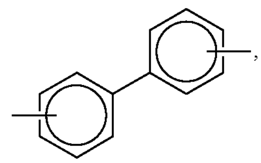

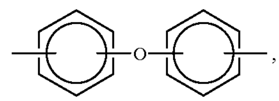

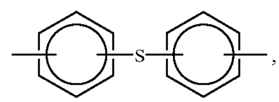

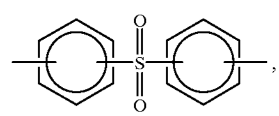

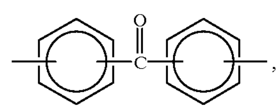

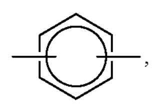

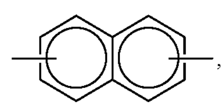

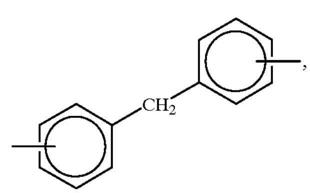

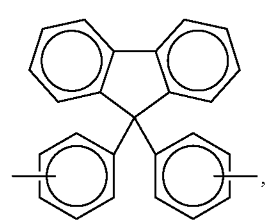

wherein v preferably is an integer of from 1 to about 20, and more preferably from 1 to about 10,

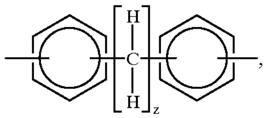

wherein z preferably is an integer of from 2 to about 20, and more preferably from 2 to about 10,

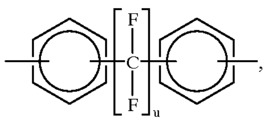

wherein u preferably is an integer of from 1 to about 20, and more preferably from 1 to about 10,

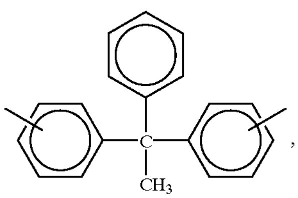

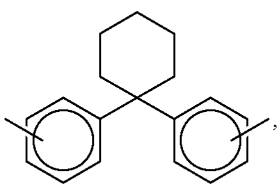

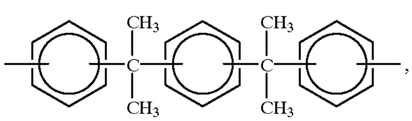

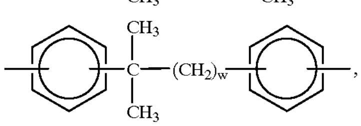

wherein w preferably is an integer of from 1 to about 20, and more preferably from 1 to about 10,

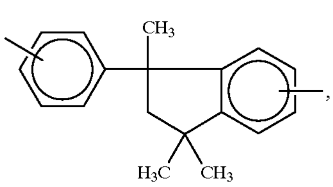

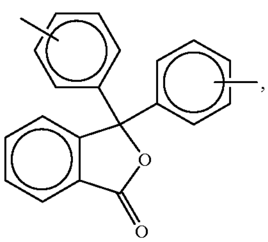

-continued

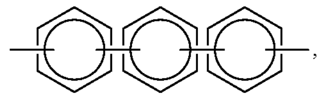

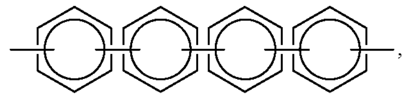

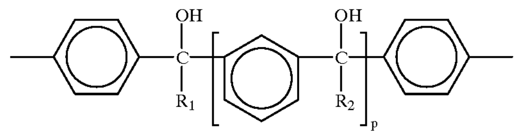

wherein $R_1$ and $R_2$ each, independently of the other, are (a) hydrogen atoms, (b) alkyl groups, including unsubstituted alkyl groups and substituted alkyl groups, such as hydroxyalkyl groups, preferably with from 1 to about 20 carbon atoms, more preferably with from 1 to about 10 carbon atoms, and even more preferably with from 1 to about 5 carbon atoms, although the number of carbon atoms can be outside of this range, (c) aryl groups, including unsubstituted aryl groups and substituted aryl groups, such as hydroxyaryl groups, preferably with from 6 to about 18 carbon atoms, more preferably with from 6 to about 12 carbon atoms, and even more preferably with 6 carbon atoms, although the number of carbon atoms can be outside of this range, or (d) mixtures thereof, and p is an integer of 0 or 1,

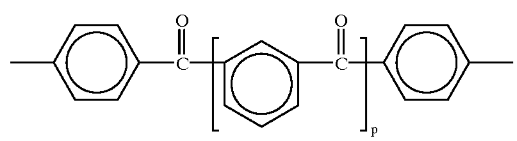

wherein p is an integer of 0 or 1, $$—(CH_2O)_t—$$

wherein t is an integer of from 1 to about 20,

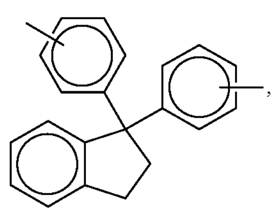

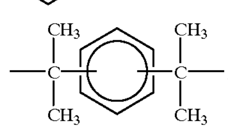

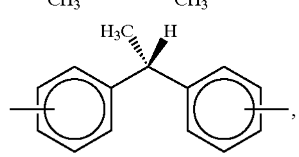

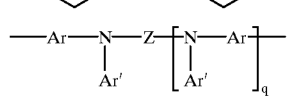

wherein (1) Z is

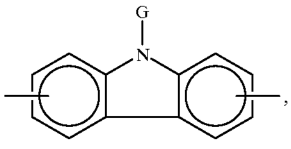

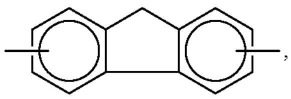

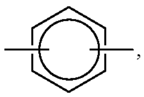

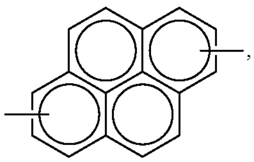

—Ar—$(X)_p$—Ar— wherein p is 0 or 1; (2) Ar is

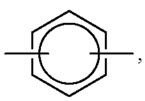

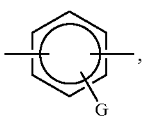

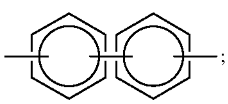

(3) G is an alkyl group selected from alkyl or isoalkyl groups containing from about 2 to about 10 carbon atoms; (4) Ar' is

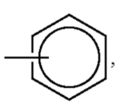

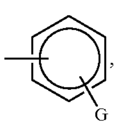

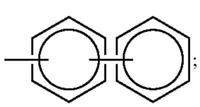

(5) X is

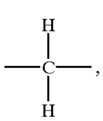

-continued

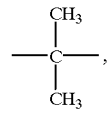

—O—,

—S—,

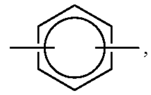

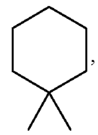

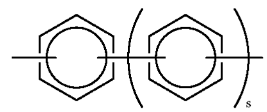

wherein s is 0, 1, or 2,

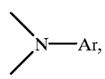

or

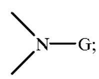

and (6) q is 0 or 1; or mixtures thereof, hydroxy-substituted derivatives thereof, hydroxyalkyl-substituted derivatives thereof, with the hydroxyalkyl substituents preferably having from 1 to about 20 carbon atoms, more preferably from 1 to about 10 carbon atoms, and even more preferably from 1 to about 5 carbon atoms, although the number of carbon atoms can be outside of this range, hydroxyaryl-substituted derivatives thereof, with the hydroxyaryl substituents preferably having from 6 to about 18 carbon atoms, more preferably from 6 to about 12 carbon atoms, and even more preferably about 6 carbon atoms, although the number of carbon atoms can be outside of this range, or mixtures thereof, and n is an integer representing the number of repeating monomer units. Specific examples of some preferred substituted derivatives include (but are not limited to)

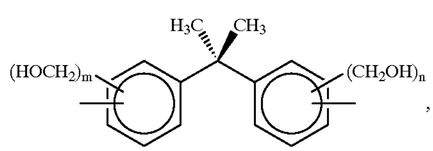

wherein m and n are each integers of 0, 1, or 2,

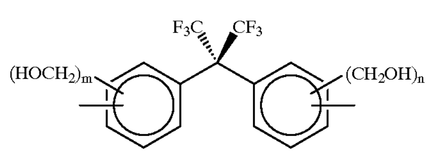

wherein m and n are each integers of 0, 1, or 2,

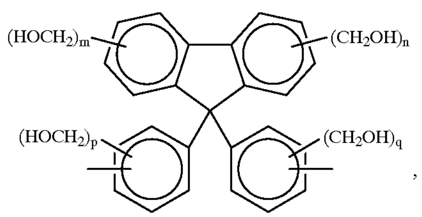

wherein m, n, p, and q are each integers of 0, 1, or 2,

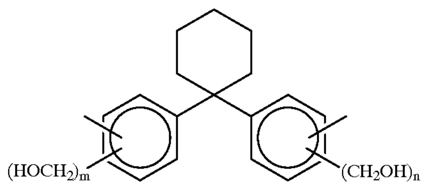

wherein m and n are each integers of 0, 1, or 2, and the like. Desirable values for n, and the corresponding weight average molecular weight and number average molecular weight, depend on the desired use for the polymer. For example, when the polymer is to be provided with crosslinking groups such as photosensitivity-imparting groups and used for applications such as photoresists or ink jet printheads, the value of n is preferably such that the weight average molecular weight of the material is from about 1,000 to about 100,000, preferably from about 1,000 to about 65,000, more preferably from about 1,000 to about 40,000, and even more preferably from about 3,000 to about 25,000, although the weight average molecular weight can be outside these ranges; preferably, n is an integer of from about 2 to about 70, more preferably from about 5 to about 70, and even more preferably from about 8 to about 50, although the value of n can be outside these ranges. When the polymer is to be used as, for example, a binder polymer in an imaging member (either substituted or unsubstituted with crosslinking groups), the value of n is preferably such that the number average molecular weight of the material is from about 10,000 to about 100,000, more preferably is from about 30,000 to about 100,000, and even more preferably is from about 30,000 to about 60,000, although the $M_n$ can be outside these ranges; the weight average molecular weight of the material preferably is from about 20,000 to about 350,000, and more preferably is from about 100,000 to about 250,000, although the $M_w$ can be outside these ranges; and the polydispersity ($M_w/M_n$) typically is from about 2 to about 9, and preferably is about 3, although higher or lower polydispersity values may also be used. The phenyl groups and the A and/or B groups may also be substituted, although the presence of two or more substituents on the B group ortho to the oxygen groups can render substitution difficult when it is desired to place crosslinking functional groups onto the polymer. Substituents can be present on the polymer either prior to or subsequent to the placement of crosslinking functional groups thereon. Substituents can also be placed on the polymer during the process of placement of crosslinking functional groups thereon. Substituents and/or crosslinking groups can be placed on the polymer before, during, or after preparation of the polymer of the basic formula

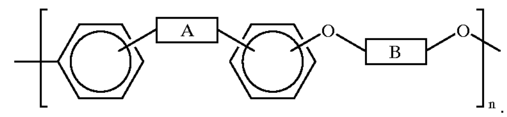

Examples of suitable substituents include (but are not limited to) alkyl groups, including saturated, unsaturated, and cyclic alkyl groups, preferably with from 1 to about 6 carbon atoms, substituted alkyl groups, including saturated, unsaturated, and cyclic substituted alkyl groups, preferably with from 1 to about 6 carbon atoms, aryl groups, preferably with from 6 to about 24 carbon atoms, substituted aryl groups, preferably with from 6 to about 24 carbon atoms, arylalkyl groups, preferably with from 7 to about 30 carbon atoms, substituted arylalkyl groups, preferably with from 7 to about 30 carbon atoms, alkoxy groups, preferably with from 1 to about 6 carbon atoms, substituted alkoxy groups, preferably with from 1 to about 6 carbon atoms, aryloxy groups, preferably with from 6 to about 24 carbon atoms, substituted aryloxy groups, preferably with from 6 to about 24 carbon atoms, arylalkyloxy groups, preferably with from 7 to about 30 carbon atoms, substituted arylalkyloxy groups, preferably with from 7 to about 30 carbon atoms, hydroxy groups, and the like.

One preferred embodiment of the present invention is directed to a polymer of the formula

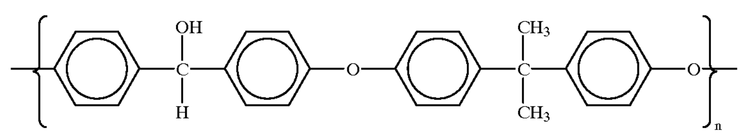

wherein n is an integer representing the number of repeating monomer units. Another preferred embodiment of the present invention is directed to a polymer of the formula

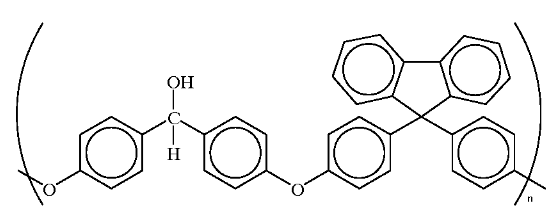

wherein n is an integer representing the number of repeating monomer units.

Polymers of the present invention can be prepared by any desired or suitable process. For example, the polymers can be prepared by providing the corresponding poly(arylene ether ketone) and then reducing the poly(arylene ether ketone) with borane to form the poly(arylene ether alcohol), as follows:

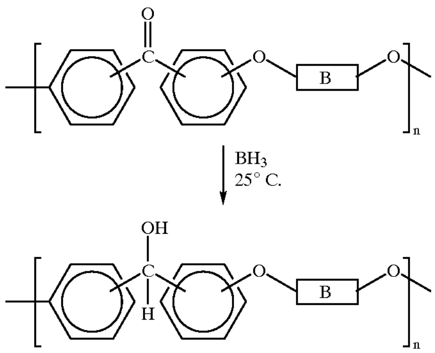

Typically, about 10 parts by weight of the corresponding poly(arylene ether ketone) are dissolved in about 100 grams of a suitable solvent, such as tetrahydrofuran, to which is added under inert atmosphere (such as argon) and with mechanical stirring a one Molar solution of a borane-tetrahydrofuran complex in tetrahydrofuran (available from, for example, Aldrich Chemical Co., Milwaukee, Wis.). Generally, one mole of the borane-tetrahydrofuran complex is added for each polymeric carbonyl group to assure complete reduction of the carbonyl groups. Some or all of the keto groups can be reduced, depending on the amount of borane-tetrahydrofuran complex added. When not all of the carbonyl groups are reduced to alcohol groups, preferably at least about 0.1 percent of the carbonyl groups are reduced, more preferably at least about 10 percent of the carbonyl groups are reduced, and even more preferably at least about 25 percent of the carbonyl groups are reduced. Most preferably, about 100 percent of the carbonyl groups are reduced.

Hydroxymethyl groups can also be placed on the polymer by using as a starting material the corresponding poly (arylene ether ketone) substituted with, for example, acetyl groups, as follows:

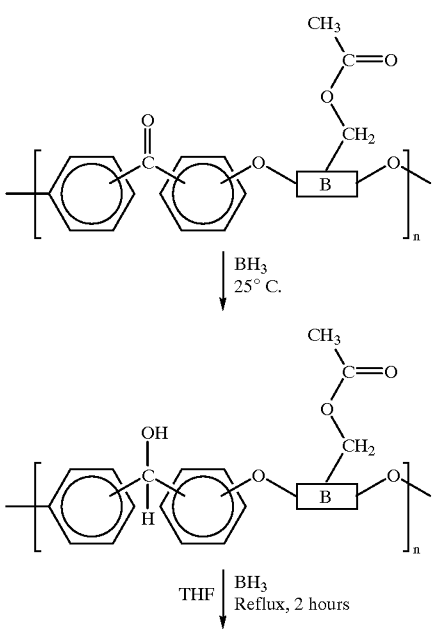

-continued

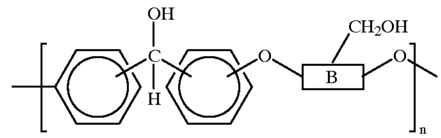

The backbone carbonyl groups are reduced by the borane-tetrahydrofuran complex at 25° C.; the pendant acetyl groups, however, generally are reduced under elevated temperatures (e.g., tetrahydrofuran boiling at reflux for up to about 2 hours). One mole of the borane-tetrahydrofuran complex is added to reduce each mole of acetyl groups to the corresponding hydroxymethyl groups.

The polymers of the present invention can also be prepared via a Grignard process. Specifically, about 10 parts by weight of the polymer in about 100 parts by weight of dry tetrahydrofuran are reacted with one molar equivalent of the Grignard reagent (RMgX, wherein R is the group ultimately added to the carbonyl bond in the polymer and X is a halogen, such as chlorine, bromine, or iodine) at ambient temperature (about 25° C.) with mechanical stirring under an inert atmosphere (such as argon). Subsequent addition of water or an acid yields the product. The reaction proceeds as follows:

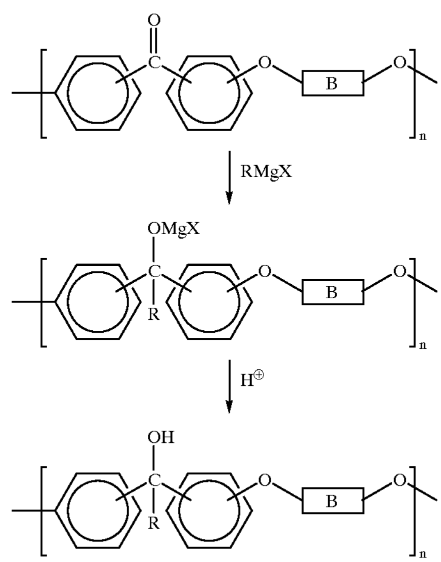

The corresponding polyarylene ether ketone can be prepared by any desired or suitable process. Processes for the preparation of these materials are known, and disclosed in, for example, U.S. Pat. No. 5,849,809, U.S. Pat. No. 5,739,254, U.S. Pat. No. 5,753,783, U.S. Pat. No. 5,761,809, U.S. Pat. No. 5,863,963, U.S. Pat. No. 5,814,426, U.S. Pat. No. 5,874,192, Copending Application U.S. Ser. No. 08/705,375, Copending Application U.S. Ser. No. 09/221,024, Copending Application U.S. Ser. No. 09/159,426, Copending Application U.S. Ser. No. 08/705,488, Copending Application U.S. Ser. No. 09/221,690, Copending Application U.S. Ser. No. 08/697,761, Copending Application U.S. Ser. No. 09/221,278, Copending Application U.S. Ser. No. 08/705,376, Copending Application U.S. Ser. No. 09/220,273, Copending Application U.S. Ser. No. 08/705,372, Copending Application U.S. Ser. No. 09/246,167, Copending Application U.S. Ser. No. 09/163,672, Copending Application U.S. Ser. No. 08/697,760, Copending Application U.S. Ser. No. 09/247,104, Copending Application U.S. Ser. No. 08/976,238, Copending Application U.S. Ser. No.

09/105,501, Copending Application U.S. Ser. No. 09/120,746, and Copending Application U.S. Ser. No. 09/217,330, the disclosures of each of which are totally incorporated herein by reference. Further background material is contained in, for example, P. M. Hergenrother, *J. Macromol. Sci. Rev. Macromol. Chem.*, C19 (1), 1–34 (1980); P. M. Hergenrother, B. J. Jensen, and S. J. Havens, *Polymer*, 29, 358 (1988); B. J. Jensen and P. M. Hergenrother, "High Performance Polymers," Vol. 1, No. 1) page 31 (1989), "Effect of Molecular Weight on Poly(arylene ether ketone) Properties"; V. Percec and B. C. Auman, *Makromol. Chem.* 185, 2319 (1984); "High Molecular Weight Polymers by Nickel Coupling of Aryl Polychlorides," I. Colon, G. T. Kwaiatkowski, *J. of Polymer Science, Part A, Polymer Chemistry*, 28, 367 (1990); M. Ueda and T. Ito, *Polymer J.*, 23 (4), 297 (1991); "Ethynyl-Terminated Polyarylates: Synthesis and Characterization," S. J. Havens and P. M. Hergenrother, *J. of Polymer Science: Polymer Chemistry Edition*, 22, 3011 (1984); "Ethynyl-Terminated Polysulfones: Synthesis and Characterization," P. M. Hergenrother, *J. of Polymer Science: Polymer Chemistry Edition*, 20, 3131 (1982); K. E. Dukes, M. D. Forbes, A. S. Jeevarajan, A. M. Belu, J. M. DeDimone, R. W. Linton, and V. V. Sheares, *Macromolecules*, 29, 3081 (1996); G. Hougham, G. Tesoro, and J. Shaw, *Polym. Mater. Sci. Eng.*, 61, 369 (1989); V. Percec and B. C. Auman, *Makromol. Chem*, 185, 617 (1984); "Synthesis and characterization of New Fluorescent Poly(arylene ethers)," S. Matsuo, N. Yakoh, S. Chino, M. Mitani, and S. Tagami, *Journal of Polymer Science: Part A: Polymer Chemistry*, 32, 1071 (1994); "Synthesis of a Novel Naphthalene-Based Poly(arylene ether ketone) with High Solubility and Thermal Stability," Mami Ohno, Toshikazu Takata, and Takeshi Endo, *Macromolecules*, 27, 3447 (1994); "Synthesis and Characterization of New Aromatic Poly(ether ketones)," F. W. Mercer, M. T. Mckenzie, G. Merlino, and M. M. Fone, *J. of Applied Polymer Science*, 56, 1397 (1995); H. C. Zhang, T. L. Chen, Y. G. Yuan, Chinese Pat. No. CN 85108751 (1991); "Static and laser light scattering study of novel thermoplastics. 1. Phenolphthalein poly(aryl ether ketone)," C. Wu, S. Bo, M. Siddiq, G. Yang and T. Chen, *Macromolecules*, 29, 2989 (1996); "Synthesis of t-Butyl-Substituted Poly(ether ketone) by Nickel-Catalyzed Coupling Polymerization of Aromatic Dichloride", M. Ueda, Y. Seino, Y. Haneda, M. Yoneda, and J.-I. Sugiyama, *Journal of Polymer Science: Part A: Polymer Chemistry*, 32, 675 (1994); "Reaction Mechanisms: Comb-Like Polymers and Graft Copolymers from Macromers 2. Synthesis, Characterzation and Homopolymerization of a Styrene Macromer of Poly(2,6-dimethyl-1,4-phenylene Oxide)," V. Percec, P. L. Rinaldi, and B. C. Auman, *Polymer Bulletin*, 10, 397 (1983); *Handbook of Polymer Synthesis Part A*, Hans R. Kricheldorf, ed., Marcel Dekker, Inc., New York-Basel-Hong Kong (1992); and "Introduction of Carboxyl Groups into Crosslinked Polystyrene," C. R. Harrison, P. Hodge, J. Kemp, and G. M. Perry, Die *Makromolekulare Chemie*, 176, 267 (1975), the disclosures of each of which are totally incorporated herein by reference. Further background on high performance polymers is disclosed in, for example, U.S. Pat. No. 2,822,351; U.S. Pat. No. 3,065,205; British Patent 1,060,546; British Patent 971,227; British Patent 1,078,234; U.S. Pat. No. 4,175,175; N. Yoda and H. Hiramoto, *J. Macromol. Sci.-Chem.*, A21(13 &14) pp. 1641 (1984) (Toray Industries, Inc., Otsu, Japan; B. Sillion and L. Verdet, "Polyimides and other High-Temperature polymers", edited by M. J. M. Abadie and B. Sillion, Elsevier Science Publishers B.V. (Amsterdam 1991); "Polyimides with Alicyclic Diamines. II. Hydrogen Abstraction and Photocrosslinking Reactions of Benzophenone Type Polyimides," Q. Jin, T. Yamashita, and K. Honie, *J. of Polymer Science: Part A: Polymer Chemistry*, 32, 503 (1994); Probimide® 300, product bulletin, Ciba-Geigy Microelectronics Chemicals, "Photosensitive Polyimide System;" *High Performance Polymers and Composites*, J. I. Kroschwitz (ed.), John Wiley & Sons (New York 1991); and T. E. Atwood, D. A. Barr, T. A. King, B. Newton, and B. J. *Rose, Polymer*, 29, 358 (1988), the disclosures of each of which are totally incorporated herein by reference. Further information on radiation curing is disclosed in, for example, *Radiation Curing: Science and Technology*, S. Peter Pappas, ed., Plenum Press (New York 1992), the disclosures of each of which are totally incorporated herein by reference.

Substituted poly(arylene ether alcohol)s can also be prepared by this method; for example, a haloalkylated poly (arylene ether ketone) or an acryloylated poly(arylene ether ketone) can be reacted with borane to yield the corresponding poly(arylene ether alcohol)s as follows:

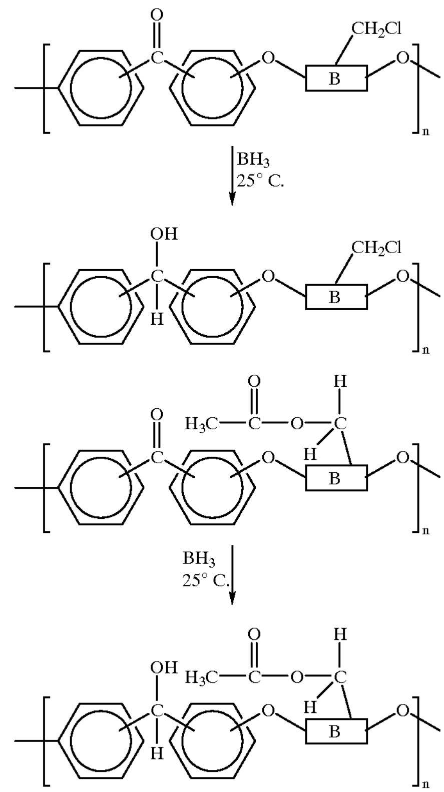

The acetyl or acetoxy group can be converted to a hydroxyl group by continuing the reaction with borane at from about 70 to about 80° C., as follows:

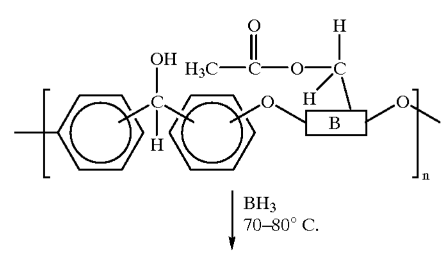

-continued

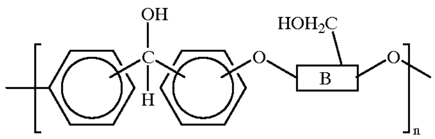

In some instances, the desired substituents on the final polymer can be present on the ketone precursor polymer prior to reduction thereof; for example, haloalkyl groups or cyano groups can be present on the polymer during the reduction process and emerge therefrom unchanged. Other groups may react with the borane reducing agent; for example, amide groups might be reduced to amino groups, hydroxyl groups might be converted to borate esters, acid groups and ester groups might be reduced to alcohols, and the like.

The poly(arylene ether alcohol) can be further reacted with diisocyanates, acryloyl halides such as acryloyl chloride, methacryloyl halides such as methacryloyl chloride, isocyanoto-ethyl acrylate moieties, isocyanato-ethyl methacrylate moieties, or the like to allow thermal and/or photochemical crosslinking of the modified resins. Generally, a molar equivalent of the hydroxy-substituted polymer is combined with a molar equivalent of the reacting agent, such as an isocyanate, and the reaction is allowed to proceed in a solvent, such as tetrahydrofuran, other polar aprotic solvents, or the like, at ambient temperature (about 25° C.) for about 16 hours. For example, the reaction of a poly(arylene ether alcohol) with isocyanato-ethyl methacrylate proceeds as follows:

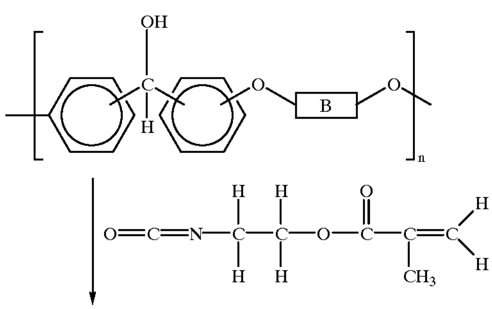

-continued

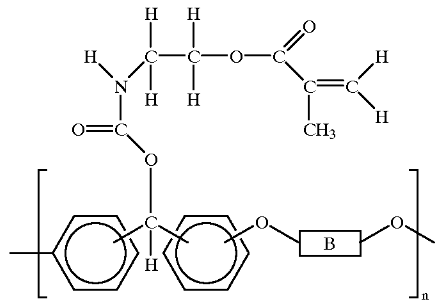

The hydroxymethyl-substituted poly(arylene ether alcohol)s, such as

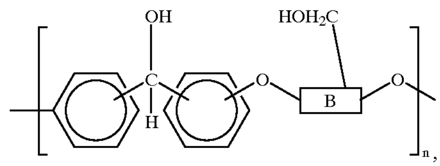

with one specific example being

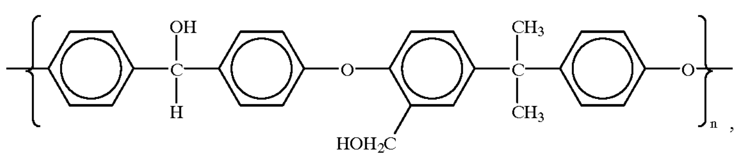

are like phenolic resins, which can be thermally cured without further modification, especially with acidic catalysts. In particular, light activated cationic initiators can be used in this situation.

The polymers of the present invention suitable for use as photoresists or in other applications wherein crosslinking or chain extension of the polymer can occur via exposure to actinic radiation, heat, crosslinking agents, or combinations thereof, contain in at least some of the monomer repeat units thereof crosslinking substituents which enable crosslinking or chain extension of the polymer upon exposure to actinic radiation. Crosslinking substituents include photosensitivity-imparting substituents, which enable crosslinking or chain extension of the polymer upon exposure to actinic radiation, thermal sensitivity-imparting substituents, which enable crosslinking or chain extension of the polymer upon exposure to heat, chemical crosslinking substituents, which enable crosslinking or chain extension of the polymer upon reaction with a crosslinking agent, substituents which require two or more of actinic radiation, heat, and/or contact with a crosslinking agent to cause crosslinking or chain extension of the polymer, and the like. These polymers, while being encompassed by the more general formula

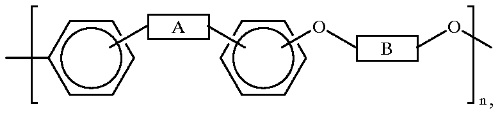

are more specifically represented by the formula

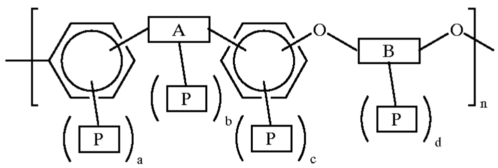

wherein P is a substituent which enables crosslinking of the polymer, a, b, c, and d are each integers of 0, 1, 2, 3, or 4, provided that at least one of a, b, c, and d is equal to or greater than 1 in at least some of the monomer repeat units of the polymer, A is

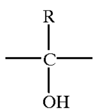

or a mixture of

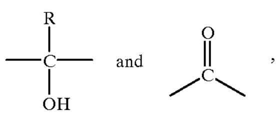

wherein R is a (a) hydrogen atom, (b) an alkyl group, including unsubstituted alkyl groups and substituted alkyl groups, such as hydroxyalkyl groups, preferably with from 1 to about 20 carbon atoms, more preferably with from 1 to about 10 carbon atoms, and even more preferably with from 1 to about 5 carbon atoms, (c) an aryl group, including unsubstituted aryl groups and substituted aryl groups, such as hydroxyaryl groups, preferably with from 6 to about 18 carbon atoms, more preferably with from 6 to about 12 carbon atoms, and even more preferably with 6 carbon atoms, or (d) mixtures thereof, B is

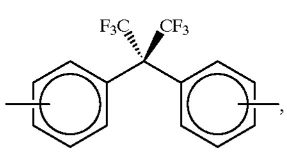

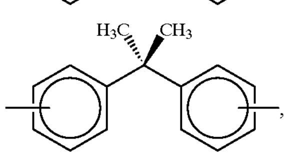

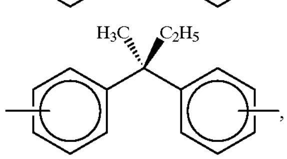

-continued

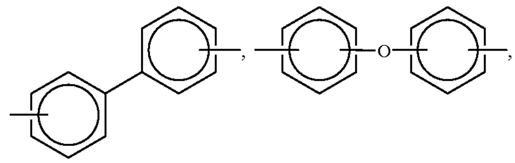

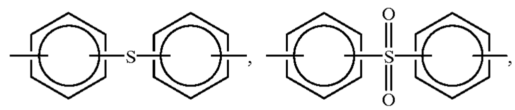

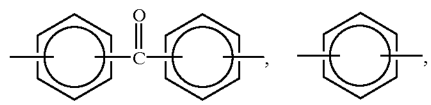

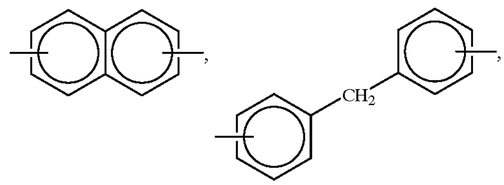

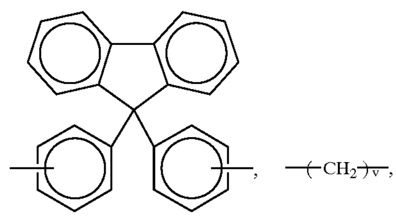

wherein v preferably is an integer of from 1 to about 20, and more preferably from 1 to about 10,

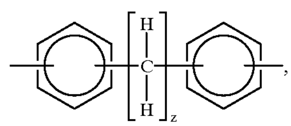

wherein z preferably is an integer of from 2 to about 20, and more preferably from 2 to about 10,

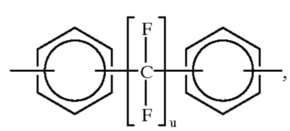

wherein u preferably is an integer of from 1 to about 20, and more preferably from 1 to about 10,

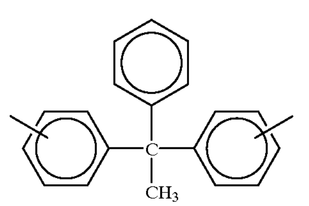

-continued

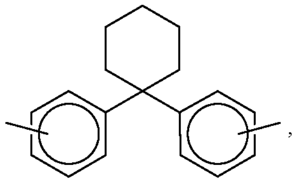

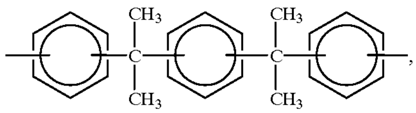

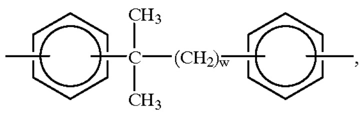

wherein w preferably is an integer of from 1 to about 20, and more preferably from 1 to about 10 ,

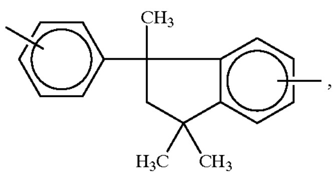

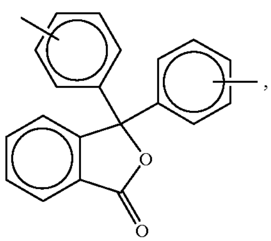

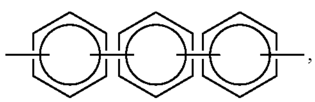

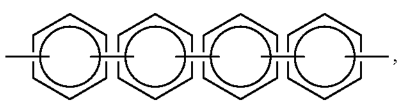

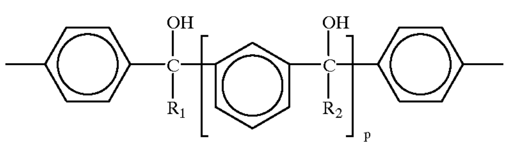

wherein $R_1$ and $R_2$ each, independently of the other, are (a) hydrogen atoms, (b) alkyl groups, including unsubstituted alkyl groups and substituted alkyl groups, such as hydroxyalkyl groups, preferably with from 1 to about 20 carbon atoms, more preferably with from 1 to about 10 carbon atoms, and even more preferably with from 1 to about 5 carbon atoms, although the number of carbon atoms can be outside of this range, (c) aryl groups, including unsubstituted aryl groups and substituted aryl groups, such as hydroxyaryl groups, preferably with from 6 to about 18 carbon atoms, more preferably with from 6 to about 12 carbon atoms, and even more preferably with 6 carbon atoms, although the number of carbon atoms can be outside of this range, or (d) mixtures thereof, and p is an integer of 0 or 1,

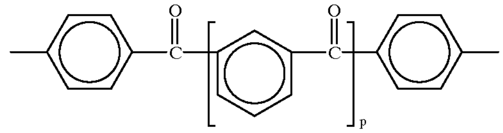

wherein p is an integer of 0 or 1, $—(CH_2O)_t—$ wherein t is an integer of from 1 to about 20,

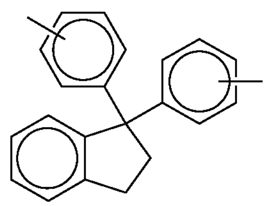

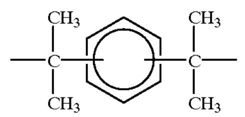

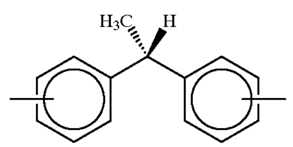

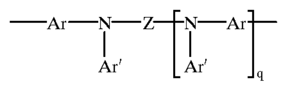

wherein (1) Z is

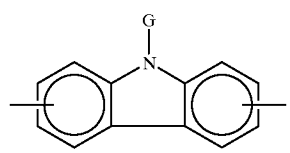

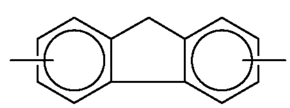

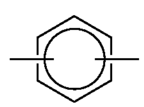

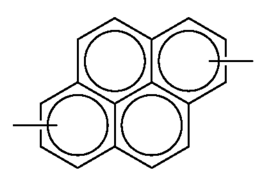

$—Ar—(X)_p—Ar—$ wherein P is 0 or 1; (2) Ar is

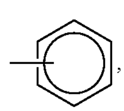

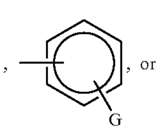

-continued

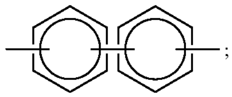

(3) G is an alkyl group selected from alkyl or isoalkyl groups containing from about 2 to about 10 carbon atoms; (4) Ar' is

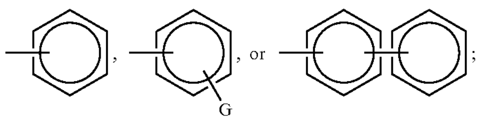

(5) X is

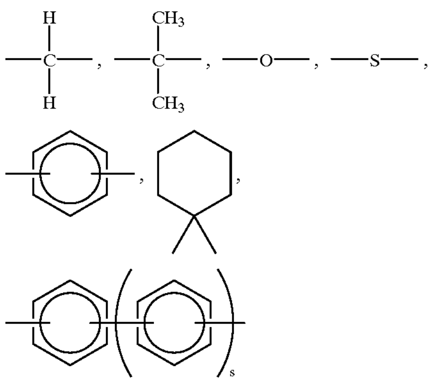

wherein s is 0, 1, or 2,

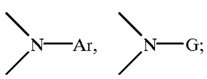

and (6) q is 0 or 1; or mixtures thereof, hydroxy-substituted derivatives thereof, hydroxyalakyl-substituted derivatives thereof, with the hydroxyalkyl substituents preferably having from 1 to about 20 carbon atoms, more preferably from 1 to about 10 carbon atoms, and even more preferably from 1 to about 5 carbon atoms, although the number of carbon atoms can be outside of this range, hydroxyaryl-substituted derivatives thereof, with the hydroxyaryl substituents preferably having from 6 to about 18 carbon atoms, more preferably from 6 to about 12 carbon atoms, and even more preferably about 6 carbon atoms, although the number of carbon atoms can be outside of this range, or mixtures thereof, and n is an integer representing the number of repeating monomer units.

Actinic radiation which activates crosslinking or chain extension of photosensitivity imparting crosslinking groups can be of any desired source and any desired wavelength, including (but not limited to) visible light, infrared light, ultraviolet light, electron beam radiation, x-ray radiation, or the like. Examples of suitable photosensitivity imparting groups include unsaturated ester groups, such as acryloyl groups, methacryloyl groups, cinnamoyl groups, crotonoyl groups, ethacryloyl groups, oleoyl groups, linoleoyl groups, maleoyl groups, fumaroyl groups, itaconoyl groups, citraconoyl groups, phenylmaleoyl groups, esters of 3-hexene-1,6-dicarboxylic acid, and the like. Also suitable are alkylcarboxymethylene and ether groups. Under certain conditions, such as imaging with electron beam, deep ultraviolet, or x-ray radiation, halomethyl groups are also photoactive. Epoxy groups, allyl ether groups, hydroxyalkyl groups, and unsaturated ammonium, phosphonium, and ether groups are also suitable photoactive groups.

The photopatternable polymers containing these groups can be prepared by any suitable or desired process. For example, unsaturated ester groups can be placed directly on the polymer having no photosensitive groups by a process which comprises reacting the polymer with (i) a formaldehyde source, and (ii) an unsaturated acid in the presence of an acid catalyst, thereby forming a curable polymer with unsaturated ester groups, as disclosed in, for example, Copending Application U.S. Ser. No. 08/697,761, filed Aug. 29, 1996, and Copending Application U.S. Ser. No. 09/221,278, filed Dec. 23, 1998, entitled "Process for Direct Substitution of High Performance Polymers with Unsaturated Ester Groups," with the named inventors Timothy J. Fuller, Ram S. Narang, Thomas W. Smith, David J. Luca, and Raymond K. Crandall, the disclosures of each of which are totally incorporated herein by reference.

Alternatively, one or more intermediate materials can be prepared. For example, the polymer backbone can be functionalized with a substituent which allows for the facile derivatization of the polymer backbone, such as hydroxyl groups, carboxyl groups, haloalkyl groups such as chloromethyl groups, hydroxyalkyl groups such as hydroxy methyl groups, methoxy methyl groups, alkylcarboxymethylene groups, and the like. For example, the polymer can be substituted with photosensitivity-imparting groups such as unsaturated ester groups or the like by first preparing the haloalkylated derivative and then replacing at least some of the haloalkyl groups with unsaturated ester groups, as disclosed in U.S. Pat. No. 5,739,254, filed Aug. 29, 1996, and U.S. Pat. No. 5,753,783, filed Aug. 28, 1997, entitled "Process for Haloalkylation of High Performance Polymers," with the named inventors Timothy J. Fuller, Ram S. Narang, Thomas W. Smith, David J. Luca, and Raymond K. Crandall, and in U.S. Pat. No. 5,761,809, filed Aug. 29, 1996, entitled "Processes for Substituting Haloalkylated Polymers With Unsaturated Ester, Ether, and Alkylcarboxymethylene Groups," with the named inventors Timothy J. Fuller, Ram S. Narang, Thomas W. Smith, David J. Luca, and Raymond K. Crandall, the disclosures of each of which are totally incorporated herein by reference. For example, the haloalkylated polymer can be substituted with unsaturated ester groups by reacting the haloalkylated polymer with an unsaturated ester salt in solution. Ether groups and alkylcarboxymethylene groups can also be placed on the haloalkylated polymer by a process analogous to that employed to place unsaturated ester groups on the haloalkylated polymer, except that the corresponding alkylcarboxylate or alkoxide salt is employed as a reactant. Some or all of the haloalkyl groups can be replaced with unsaturated ester, ether, or alkylcarboxymethylene substituents. Longer reaction times generally lead to greater degrees of substitution of haloalkyl groups with unsaturated ester, ether, or alkylcarboxymethylene substituents.

The haloalkylated polymer can be allyl ether substituted or epoxidized by first reacting the haloalkylated polymer with an unsaturated alcohol salt, such as an allyl alcohol salt, in solution, to generate the allyl-substituted polymer; if desired, the allyl-substituted polymer can be converted to an epoxy-substituted polymer by reacting it with a peroxide, such as hydrogen peroxide, m-chloroperoxybenzoic acid, acetyl peroxide, and the like, as well as mixtures thereof, to yield the epoxidized polyarylene ether, as disclosed in Copending Application U.S. Ser. No. 08/705,372, filed Aug. 29, 1996, and Copending Application U.S. Ser. No. 09/246,167, filed Feb. 8, 1999, entitled "High Performance Curable Polymers and Processes for the Preparation Thereof," with the named inventors Ram S. Narang and Timothy J. Fuller, the disclosures of each of which are totally incorporated herein by reference. Some or all of the haloalkyl groups can be replaced with allyl ether or epoxy substituents. Longer reaction times generally lead to greater degrees of substitution of haloalkyl groups with allyl ether or epoxy substituents. As also disclosed in the aforementioned references, the epoxidized polymer can also be prepared by reaction of the haloalkylated polymer with an epoxy-group-containing alcohol salt, such as a glycidolate salt, or an unsaturated alcohol salt, such as those set forth hereinabove, in the presence of a molar excess of base (with respect to the unsaturated alcohol salt or epoxy-group-containing alcohol salt), such as sodium hydride, sodium hydroxide, potassium carbonate, quaternary alkyl ammonium salts, or the like, under phase transfer conditions. Unsaturated or allyl ether groups can also be placed on the haloalkylated polymer by other methods, such as by a Grignard reaction, a Wittig reaction, or the like.

The haloalkylated polymer can be substituted with a photosensitivity-imparting, water-solubility-enhancing (or water-dispersability-enhancing) group by reacting the haloalkylated polymer with an unsaturated amine, phosphine, or alcohol, as disclosed in Copending Application U.S. Ser. No. 08/697,760, filed Aug. 29, 1996, entitled "Aqueous Developable High Performance Curable Aromatic Ether Polymers," and Copending Application U.S. Ser. No. 09/247,104, filed Feb. 9, 1999, entitled "Aqueous Developable High Performance Curable Polymers," with the named inventors Ram S. Narang and Timothy J. Fuller, the disclosures of each of which are totally incorporated herein by reference. Some or all of the haloalkyl groups can be replaced with photosensitivity-imparting, water-solubility-enhancing or water-dispersability-enhancing) substituents. Longer reaction times generally lead to greater degrees of substitution of haloalkyl groups with photosensitivity-imparting, water-solubility-enhancing (or water-dispersability-enhancing) substituents. As also disclosed in the aforementioned references, the unsubstituted polymer can be substituted with two different functional groups, one of which imparts photosensitivity to the polymer and one of which imparts water solubility or water dispersability to the polymer. Examples of reactants which can be reacted with the polymer to substitute the polymer with suitable water solubility enhancing groups or water dispersability enhancing groups include tertiary amines, tertiary phosphines, alkyl thio ethers, and the like. These water solubility imparting substituents or water dispersability imparting substituents can be placed on the polymer by any suitable or desired process. For example, two equivalents of the nucleophilic reagent (amine, phosphine, or thio ether) can be allowed to react with one equivalent of the haloalkylated polymer at 25° C. in a polar aprotic solvent such as dimethylacetamide, dimethyl sulfoxide, N-methyl pyrrolidinone, dimethyl formamide, or the like, with the reactants present in the solvent in a concentration of about 30 percent by weight solids. Reaction times typically are from about 1 to about 24 hours, with 2 hours being typical. Alternatively, the water solubility imparting group or water dispersability imparting group can be nonionic. Nonionic substituents can be placed on the polymer by, for example, reacting from about 2 to about 10 milliequivalents of a salt of the nonionic group (such as an alkali metal salt or the like) with 1 equivalent of the haloalkylated polymer in a polar aprotic solvent such as tetrahydrofuran, dimethylacetamide, dimethyl sulfoxide, N-methyl pyrrolidinone, dimethyl formamide, or the like, in the presence of a base, such as at least about 2 equivalents of sodium hydroxide, at least about 1 equivalent of sodium hydride, or the like, at about 80° C. for about 16 hours. The substitution of poly (vinyl benzyl chloride) polymers with polyether chains is disclosed in further detail in, for example, Japanese Patent Kokai 78-79,833 (1978) and in Chem. Abstr., 89, 180603 (1978), the disclosures of each of which are totally incorporated herein by reference. Higher degrees of haloalkylation generally enable higher degrees of substitution with water solubility imparting groups or water dispersability imparting groups.

The hydroxymethylation of a polymer of the above formula can be accomplished by reacting the polymer in solution with formaldehyde or paraformaldehyde and a base, such as sodium hydroxide, potassium hydroxide, calcium hydroxide, ammonium hydroxide, tetramethylammonium hydroxide, or the like, as disclosed in U.S. Pat. No. 5,849,809, filed Aug. 29, 1996, and Copending Application U.S. Ser. No. 09/159,426, filed Sep. 23, 1998, entitled "Hydroxyalkylated High Performance Curable Polymers," with the named inventors Ram S. Narang and Timothy J. Fuller, the disclosures of each of which are totally incorporated herein by reference. Longer reaction times generally result in higher degrees of hydroxymethylation. As also disclosed in the aforementioned references, the unsubstituted polymers can also be hydroxyalkylated by first preparing the haloalkylated derivative and then replacing at least some of the haloalkyl groups with hydroxyalkyl groups. Higher degrees of haloalkylation generally enable higher degrees of substitution with hydroxyalkyl groups, and thereby enable greater photosensitivity of the polymer. Some or all of the haloalkyl groups can be replaced with hydroxyalkyl substituents. Longer reaction times generally lead to greater degrees of substitution of haloalkyl groups with hydroxyalkyl substituents.

Intermediate derivatives can also be prepared by any suitable or desired process. For example, suitable processes for haloalkylating polymers include reaction of the polymers with formaldehyde and hydrochloric acid, bischloromethyl ether, chloromethyl methyl ether, octylchloromethyl ether, or the like, generally in the presence of a Lewis acid catalyst. Bromination of a methyl group on the polymer can also be accomplished with elemental bromine via a free radical process initiated by, for example, a peroxide initiator or light. Halogen atoms can be substituted for other halogens already on a halomethyl group by, for example, reaction with the appropriate hydrohalic acid or halide salt. Methods for the haloalkylation of polymers are also disclosed in, for example, "Chloromethylation of Condensation Polymers Containing an Oxy-1,4-Phenylene Backbone," W. H. Daly et al., *Polymer Preprints,* Vol. 20, No.1, 835 (1979), the disclosure of which is totally incorporated herein by reference. One specific process suitable for haloalkylating the polymer entails reacting the polymer with an acetyl halide, such as acetyl chloride, and dimethoxymethane in the presence of a halogen-containing Lewis acid catalyst, as disclosed in U.S. Pat. No. 5,739,254, filed Aug. 29, 1996, and U.S. Pat. No. 5,753,783, filed Aug. 28, 1997, entitled "Process for Haloalkylation of High Performance Polymers," with the named inventors Timothy J. Fuller, Ram S. Narang, Thomas W. Smith, David J. Luca, and Raymond K. Crandall, the disclosures of each of which are totally incorporated herein by reference.

Other procedures for placing functional groups on aromatic polymers are disclosed in, for example, W. H. Daly, S.

Chotiwana, and R. Nielsen, *Polymer Preprints,* 20(1), 835 (1979); "Functional Polymers and Sequential Copolymers by Phase Transfer Catalysis, 3. Synthesis And Characterization of Aromatic Poly(ether sulfone)s and Poly(oxy-2,6-dimethyl-1,4-phenylene) Containing Pendant Vinyl Groups," V. Percec and B. C. *Auman, Makromol. Chem.,* 185, 2319 (1984); F. Wang and J. Roovers, *Journal of Polymer Science: Part A: Polymer Chemistry,* 32, 2413 (1994); "Details Concerning the Chloromethylation of Soluble High Molecular Weight Polystyrene Using Dimethoxymethane, Thionyl Chloride, And a Lewis Acid: A Full Analysis," M. E. Wright, E. G. Toplikar, and S. A. Svejda, *Macromolecules,* 24, 5879 (1991); "Functional Polymers and Sequential Copolymers by Phase Transfer Catalysts," V. Percec and P. L. Rinaldi, *Polymer Bulletin,* 10, 223 (1983); "Preparation of Polymer Resin and Inorganic Oxide Supported Peroxy-Acids and Their Use in the Oxidation of Tetrahydrothiophene," J. A. Greig, R. D. Hancock, and D. C. Sherrington, *Euopean Polymer J.,* 16, 293 (1980); "Preparation of Poly(vinylbenzyltriphenylphosphonium Perbromide) and Its Application in the Bromination of Organic Compounds," A. Akelah, M. Hassanein, and F. Abdel-Galil, *European Polymer J.,* 20 (3) 221 (1984); J. M. J. Frechet and K. K. Haque, *Macromelcules,* 8, 130 (1975); U. S. Pat. No. 3,914,194; U.S. Pat. No. 4,110,279; U.S. Pat. No. 3,367,914; "Synthesis of Intermediates for Production of Heat Resistant Polymers (Chloromethylation of Diphenyl oxide)," E. P. Tepenitsyna, M. I. Farberov, and A. P. Ivanovski, *Zhumal Prikladnoi Khimii,* Vol. 40, No. 11, 2540 (1967); U.S. Pat. No. 3,000,839; Chem Abst. 56, 590f (1962); U.S. Pat. No. 3,128,258; Chem Abstr. 61, 4560a (1964); J. D. Doedens and H. P. Cordts, *Ind. Eng. Ch.,* 83, 59 (1961); British Patent 863,702; and Chem Abstr 55, 18667b (1961); the disclosures of each of which are totally incorporated herein by reference.

Thermal sensitivity-imparting groups are also suitable crosslinking groups for the polymers of the present invention. Examples of thermal sensitivity-imparting crosslinking groups include those disclosed in Copending Application U.S. Ser. No. 08/705,488, filed Aug. 29, 1996, entitled "High Performance Polymer Compositions Having Photosensitivity-Imparting Substituents and Thermal Sensitivity-Imparting Substituents," and Copending Application U.S. Ser. No. 09/221,690, filed Dec. 23, 1998, entitled "High Performance Polymer Compositions," with the named inventors Thomas W. Smith, Timothy J. Fuller, Ram S. Narang, and David J. Luca, the disclosures of each of which are totally incorporated herein by reference. The thermal sensitivity imparting groups can be placed on the polymer by any suitable or desired synthetic method. Processes for putting the above mentioned thermal sensitivity imparting groups on polymers are disclosed in, for example, "Polyimides," C. E. Sroog, *Prog. Polym. Sci.,* Vol. 16, 561–694 (1991); F. E. Arnold and L. S. Tan, *Symposium on Recent Advances in Polyimides and Other High Performance Polymers,* Reno, Nev. (Jul. 1987); L. S. Tan and F. E. Arnold, J. *Polym. Sci. Part A,* 26, 1819 (1988); U.S. Pat. No. 4,973,636; and U.S. Pat. No. 4,927,907; the disclosures of each of which are totally incorporated herein by reference. Other procedures for placing thermally curable end groups on aromatic polymers are disclosed in, for example, P. M. Hergenrother, *J. Macromol. Sci. Rev. Macromol. Chem.,* C19 (1), 1–34 (1980); V. Percec and B. C. Auman, *Makromol. Chem.,* 185, 2319 (1984); S. J. Havens, and P. M. Hergenrother, *J. of Polymer Science: Polymer Chemistry Edition,* 22 3011 (1984); P. M. Hergenrother, *J. of Polymer Science: Polymer Chemistry Edition,* 20, 3131 (1982); V. Percec, P. L. Rinaldi, and B. C. Auman, *Polymer Bulletin,* 10, 215 (1983); "Functional Polymers and Sequential Copolymers by Phase Transfer Catalysis, 2. Synthesis and Characterization of Aromatic Poly(ether sulfones Containing Vinylbenzyl and Ethynylbenzyl Chain Ends," V. Percec and B. C. Auman, *Makromol. Chem.* 185, 1867 (1984); "Functional Polymers and Sequential Copolymers by Phase Transfer Catalysis, 6. On the Phase Transfer Catalyzed Williamson Polyetherification as a New Method for the Preparation of Alternating Block copolymers," V. Percec, B. Auman, and P. L. Rinaldi, *Polymer Bulletin,* 10, 391 (1983); "Functional Polymers and Sequential Copolymers by Phase Transfer Catalysis, 3 Synthesis and Characterization of Aromatic Poly(ether sulfone)s and Poly(oxy-2,6-dimethyl-1,4-phenylene) Containing Pendant Vinyl Groups," V. Percec and B. C. Auman, *Makromol. Chem.,* 185, 2319 (1984); and "Phase Transfer Catalysis, Functional Polymers and Sequential Copolymers by PTC,5. Synthesis and Characterization of Polyformals of Polyether Sulfones," *Polymer Bulletin,* 10, 385 (1983); the disclosures of each of which are totally incorporated herein by reference. When both photosensitivity-imparting crosslinking groups and thermal sensitivity-imparting crosslinking groups are present on the polymers of the present invention, as disclosed in Copending Application U.S. Ser. No. 08/705,488 and Copending Application U.S. Ser. No. 09/221,690, the polymers can also be cured in a two-stage process which entails (a) exposing the polymer to actinic radiation, thereby causing the polymer to become crosslinked or chain extended through the photosensitivity-imparting groups; and (b) subsequent to step (a), heating the polymer to a temperature sufficient to cause the thermal sensitivity-imparting groups to react, thereby causing further crosslinking or chain extension of the polymer through the thermal sensitivity imparting groups.

Examples of suitable thermal sensitivity imparting groups include ethynyl groups, such as those of the formula $$—(R)_a—C\equiv C—R'$$

wherein R is

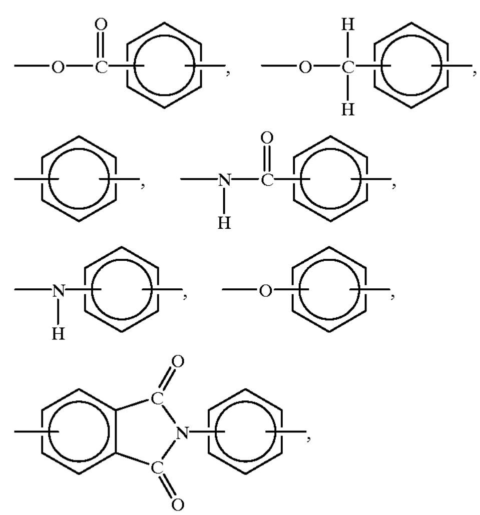

a is an integer of 0 or 1, and R' is a hydrogen atom or a phenyl group, ethylenic linkage-containing groups, such as allyl groups, including those of the formula

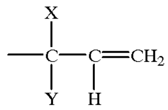

wherein X and Y each, independently of the other, are hydrogen atoms or halogen atoms, such as fluorine, chlorine, bromine, or iodine, vinyl groups, including those of the formula

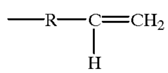

wherein R is an alkyl group, including both saturated, unsaturated, linear, branched, and cyclic alkyl groups, preferably with from 1 to about 30 carbon atoms, more preferably with from 1 to about 11 carbon atoms, even more preferably with from 1 to about 5 carbon atoms, a substituted alkyl group, an aryl group, preferably with from 6 to about 24 carbon atoms, more preferably with from 6 to about 18 carbon atoms, a substituted aryl group, an arylalkyl group, preferably with from 7 to about 30 carbon atoms, more preferably with from 7 to about 19 carbon atoms, or a substituted arylalkyl group, wherein the substituents on the substituted alkyl groups, substituted aryl groups, substituted arylalkyl groups, substituted alkoxy groups, substituted aryloxy groups, and substituted arylalkyloxy groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, mixtures thereof, and the like, wherein any two or more substituents can be joined together to form a ring, vinyl ether groups, such as those of the formula

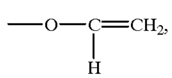

epoxy groups, including those of the formula

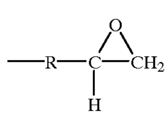

R is an alkyl group, including both saturated, unsaturated, linear, branched, and cyclic alkyl groups, preferably with from 1 to about 30 carbon atoms, more preferably with from 1 to about 11 carbon atoms, even more preferably with from 1 to about 5 carbon atoms, a substituted alkyl group, an aryl group, preferably with from 6 to about 24 carbon atoms, more preferably with from 6 to about 18 carbon atoms, a substituted aryl group, an arylalkyl group, preferably with from 7 to about 30 carbon atoms, more preferably with from 7 to about 19 carbon atoms, or a substituted arylalkyl group, wherein the substituents on the substituted alkyl groups, substituted aryl groups, substituted arylalkyl groups, substituted alkoxy groups, substituted aryloxy groups, and substituted arylalkyloxy groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, mixtures thereof, and the like, wherein any two or more substituents can be joined together to form a ring, halomethyl groups, such as fluoromethyl groups, chloromethyl groups, bromomethyl groups, and iodomethyl groups, hydroxymethyl groups, benzocyclobutene groups, including those of the formula

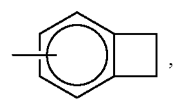

phenolic groups (—ϕ—OH), provided that the phenolic groups are present in combination with either halomethyl groups or hydroxymethyl groups; the halomethyl groups or hydroxymethyl groups can be present on the same polymer bearing the phenolic groups or on a different polymer, or on a monomeric species present with the phenolic group substituted polymer; maleimide groups, such as those of the formula

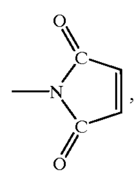

biphenylene groups, such as those of the formula

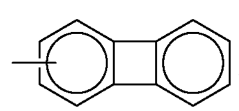

5-norbornene-2,3-dicarboximido (nadimido) groups, such as those of the formula

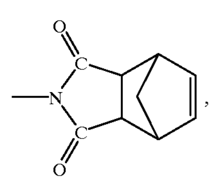

alkylcarbboxylate groups, such as those of the formula

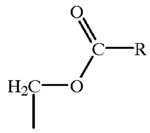

wherein R is an alkyl group (including saturated, unsaturated, and cyclic alkyl groups), preferably with from 1 to about 30 carbon atoms, more preferably with from 1 to about 6 carbon atoms, a substituted alkyl group, an aryl group, preferably with from 6 to about 30 carbon atoms, more preferably with from 1 to about 2 carbon atoms, a substituted aryl group, an arylalkyl group, preferably with from 7 to about 35 carbon atoms, more preferably with from 7 to about 15 carbon atoms, or a substituted arylalkyl group, wherein the substituents on the substituted alkyl, aryl, and arylalkyl groups can be (but are not limited to) alkoxy groups, preferably with from 1 to about 6 carbon atoms, aryloxy groups, preferably with from 6 to about 24 carbon atoms, arylalkyloxy groups, preferably with from 7 to about 30 carbon atoms, hydroxy groups, amine groups, imine groups, ammonium groups, pyridine groups, pyridinium groups, ether groups, ester groups, amide groups, carbonyl groups, thiocarbonyl groups, sulfate groups, sulfonate groups, sulfide groups, sulfoxide groups, phosphine groups, phosphonium groups, phosphate groups, mercapto groups, nitroso groups, sulfone groups, acyl groups, acid anhydride groups, azide groups, and the like, wherein two or more substituents can be joined together to form a ring, and the like. Any desired or suitable degree of substitution can be employed. Preferably, the degree of substitution is from about 1 to about 4 thermal sensitivity imparting groups per repeat monomer unit, although the degree of substitution can be outside this range. Preferably, the degree of substitution is from about 0.5 to about 5 milliequivalents of thermal sensitivity imparting group per gram of polymer, and more preferably from about 0.75 to about 1.5 milliequivalents per gram, although the degree of substitution can be outside this range.

The temperature selected for the thermal crosslinking generally depends on the thermal sensitivity imparting group which is present on the polymer. For example, ethynyl groups preferably are cured at temperatures of from about 150 to about 300° C. Halomethyl groups preferably are cured at temperatures of from about 150 to about 260° C. Hydroxymethyl groups preferably are cured at temperatures of from about 150 to about 250° C. Phenylethynyl phenyl groups preferably are cured at temperatures of greater than about 250° C. Vinyl groups preferably are cured at temperatures of from about 80 to about 250° C. Allyl groups preferably are cured at temperatures of over about 200° C. Epoxy groups preferably are cured at temperatures of about 150° C. Maleimide groups preferably are cured at temperatures of from about 200 to about 300° C. Benzocyclobutene groups preferably are cured at temperatures of over about 200° C. 5-Norbornene-2,3-dicarboximidogroups preferably are cured at temperatures of from about 200 to about 300° C. Vinyl ether groups preferably are cured at temperatures of about 150° C. Phenolic groups in the presence of hydroxymethyl or halomethyl groups preferably are cured at temperatures of from about 150 to about 210° C. Alkylcarboxylate groups preferably are cured at temperatures of from about 150 to about 250° C. Curing temperatures usually do not exceed about 400° C., although higher temperatures can be employed provided that decomposition of the polymer does not occur. Higher temperature cures preferably take place in an oxygen-excluded environment.

Further examples of suitable crosslinking groups include isocyanate groups, acryloyl halide groups such as acryloyl chloride groups, vinyl benzyl halide groups such as vinyl benzyl chloride groups, ethynyl benzyl halide groups such as ethynyl benzyl chloride groups, methacryloyl halide groups such as methacryloyl chloride groups, 2-isocyanatoethyl methacrylate groups, diisocyanate groups, including toluene diisocyanate, hexane diisocyanate, and the like, and any other suitable functional group which enables crosslinking or chain extension 4b of the polymer upon exposure to actinic radiation, heat, crosslinking agents, mixtures thereof, or the like.

Further information regarding photoresist compositions is disclosed in, for example, J. J. Zupancic, D. C. Blazej, T. C. Baker, and E. A. Dinkel, *Polymer Preprints,* 32, (2), 178 (1991); "High Performance Electron Negative Resist, Chloromethylated Polystyrene. A Study on *Molecular Parameters,*" S. Imamura, T. Tamamura, and K. Harada, *J. of Applied Polymer Science,* 27,937 (1982); "Chloromethylated Polystyrene as a Dry Etching-Resistant Negative Resist for Submicron Technology" , S. Imamura, *J. Electrochem. Soc.: Solid-state Science and Technology,* 126(9), 1628 (1979); "UV curing of composites based on modified unsaturated polyesters," W. Shi and B. Ranby, J. of Applied Polymer Science, Vol. 51, 1129 (1994); "Cinnamates VI. Light-Sensitive Polymers with Pendant o-,m- and p-hydroxycinnamate Moieties," F. Scigalski, M. Toczek, and J. Paczkowski, *Polymer,* 35, 692 (1994); and "Radiation-cured Polyurethane Methacrylate Pressure-sensitive Adhesives," G. Ansell and C. Butler, *Polymer,* 35 (9), 2001 (1994), the disclosures of each of which are totally incorporated herein by reference.

When the crosslinking groups are photosensitivity imparting groups, the photopatternable polymer can be cured by uniform exposure to actinic radiation at wavelengths and/or energy levels capable of causing crosslinking or chain extension of the polymer through the photosensitivity-imparting groups. Alternatively, the photopatternable polymer is developed by imagewise exposure of the material to radiation at a wavelength and/or at an energy level to which the photosensitivity-imparting groups are sensitive. Typically, a photoresist composition will contain the photopatternable polymer, an optional solvent for the photopatternable polymer, an optional sensitizer, and an optional photoinitiator. Solvents may be particularly desirable when the uncrosslinked photopatternable polymer has a high $T_g$. The solvent and photopatternable polymer typically are present in relative amounts of from 0 to about 99 percent by weight solvent and from about 1 to 100 percent polymer, preferably are present in relative amounts of from about 20 to about 60 percent by weight solvent and from about 40 to about 80 percent by weight polymer, and more preferably are present in relative amounts of from about 30 to about 60 percent by weight solvent and from about 40 to about 70 percent by weight polymer, although the relative amounts can be outside these ranges.

While not being limited to any particular theory, it is believed that exposure to, for example, ultraviolet radiation generally leads to crosslinking or chain extension at the "long" bond sites as shown below for the unsaturated ester-substituted polymer having, for example, acryloyl functional groups, wherein the ethylenic linkage in the acryloyl group is opened to form the link:

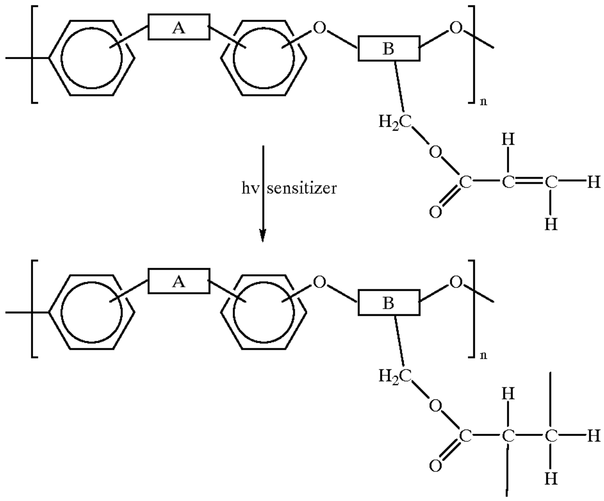

Similarly, it is believed that exposure to, for example, ultraviolet radiation generally leads to crosslinking or chain extension at the "long" bond sites as shown below for the acrylate-isocyanate modified polymer, wherein the ethylenic linkage in the functional group is opened to form the link:

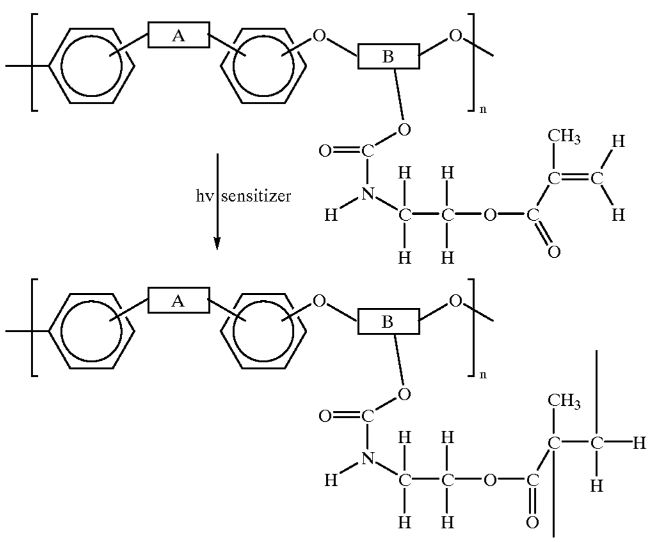

An analogous opening of the ethylenic linkage occurs for other unsaturated groups. The alkylcarboxymethylene and ether substituted polymers are curable by exposure to ultraviolet light, preferably in the presence of heat and one or more cationic initiators, such as triarylsulfonium salts, diaryliodonium salts, and other initiators as disclosed in, for example, Ober et al., *J. M. S.—Pure Appl. Chem.,* A30 (12), 877–897 (1993); G. E. Green, B. P. Stark, and S. A. Zahir, "Photocrosslinkable Resin Systems," *J. Macro. Sci.—Revs. Macro. Chem.,* C21(2), 187 (1981); H. F. Gruber, "Photoinitiators for Free Radical Polymerization," *Prog. Polym. Sci.,* Vol. 17, 953 (1992); Johann G. Kloosterboer, "Network Formation by Chain Crosslinking Photopolymerization and Its Applications in Electronics," *Advances in Polymer Science,* 89, Springer-Verlag Berlin Heidelberg (1988); and "Diaryliodonium Salts as Thermal Initiators of Cationic Polymerization," J. V. Crivello, T. P. Lockhart, and J. L. Lee, *J. of Polymer Science: Polymer Chemistry Edition,* 21, 97 (1983), the disclosures of each of which are totally incorporated herein by reference. While not being limited to any particular theory, it is believed that the cationic mechanism is as shown below for the methylcarboxymethylene polymer, wherein acetic acid is liberated and the "long" bond indicates the crosslinking or chain extension site:

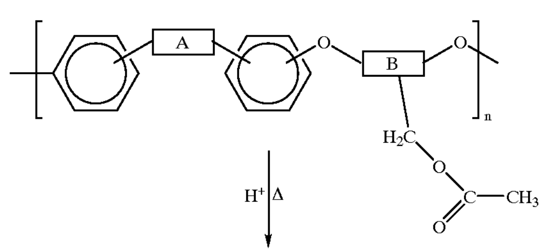

-continued

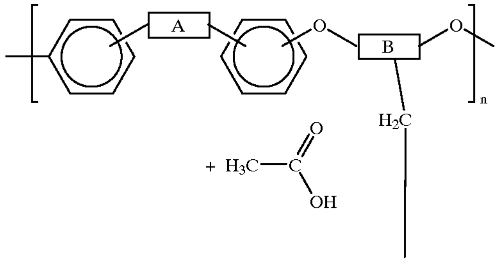

-continued

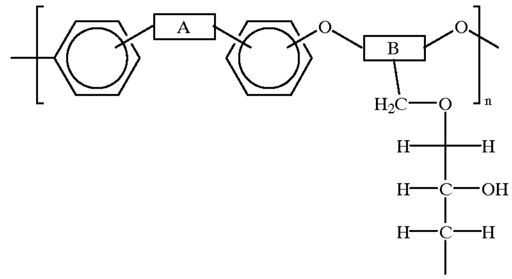

The reaction is similar for the ether-substituted polymer, except that the corresponding alkanol is liberated.

The allyl ether substituted polymer is developed by imagewise exposure of the material to radiation at a wavelength to which it is sensitive. While not being limited to any particular theory, it is believed that exposure to, for example, ultraviolet radiation generally opens the ethylenic linkage in the allyl ether groups and leads to crosslinking or chain extension at the "long" bond sites as shown below:

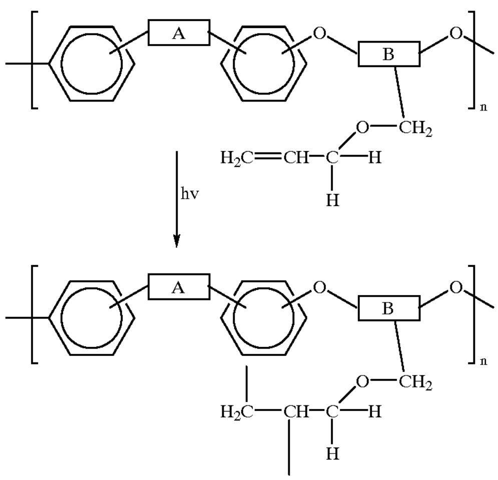

For the epoxy-substituted polymer, while not being limited to any particular theory, it is believed that exposure to, for example, ultraviolet radiation generally causes generation of acidic species by the initiator, followed by reaction of the acidic species with the epoxy groups to cause ring opening and crosslinking or chain extension at the "long" bond sites as shown below:

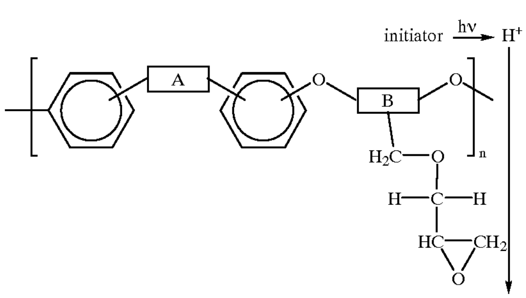

Amine curing of the epoxidized polymer is also possible, with curing occurring upon the application of heat. While not being limited to any particular theory, it is believed that the curing scheme in one example is as follows:

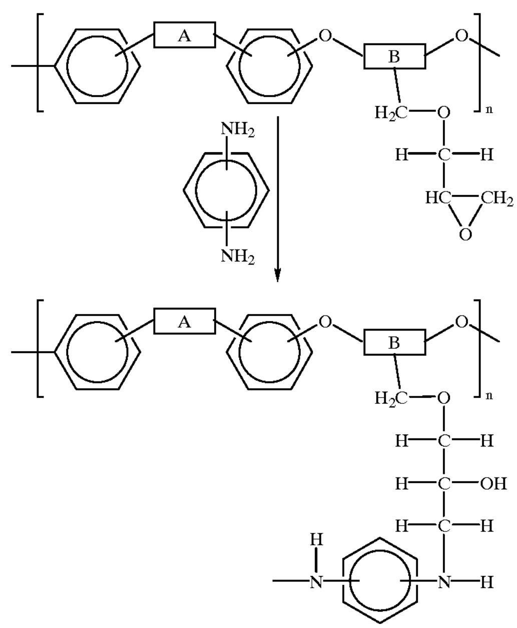

For the halomethylated polymer, while not being limited to any particular theory, it is believed that exposure to, for example, e-beam, deep ultraviolet, or x-ray radiation generally results in free radical cleavage of the halogen atom from the methyl group to form a benzyl radical. Crosslinking or chain extension then occurs at the "long" bond sites as illustrated below:

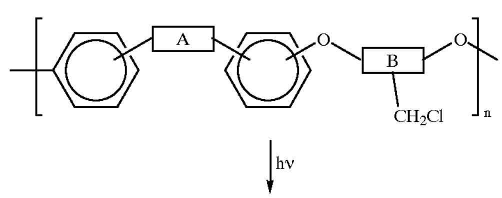

-continued

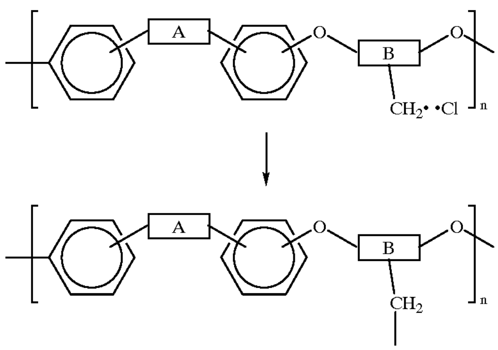

For the unsaturated ammonium or unsaturated phosphonium substituted polymers of the present invention, while not being limited to any particular theory, it is believed that exposure to, for example, ultraviolet radiation generally opens the ethylenic linkage in the photosensitivity-imparting groups and leads to crosslinking or chain extension at the "long" bond sites as shown below:

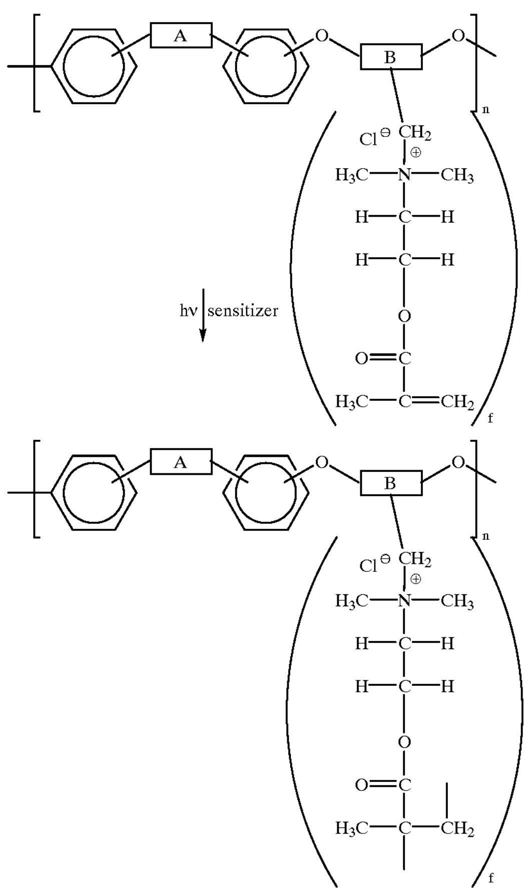

For the hydroxyalkylated, holoalkylated, and allyl-substituted polymers of the present invention, one specific example of a class of suitable sensitizers or initiators is that of bis(azides), of the general formula

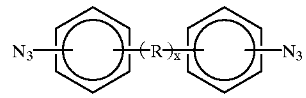

wherein R is

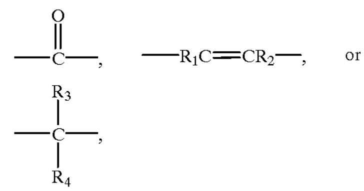

wherein $R_1$, $R_2$, $R_3$, and $R_4$ each, independently of the others, is a hydrogen atom, an alkyl group, including saturated, unsaturated, and cyclic alkyl groups, preferably with from 1 to about 30 carbon atoms, and more preferably with from 1 to about 6 carbon atoms, a substituted alkyl group, an aryl group, preferably with from 6 to about 18 carbon atoms, and more preferably with about 6 carbon atoms, a substituted aryl group, an arylalkyl group, preferably with from 7 to about 48 carbon atoms, and more preferably with from about 7 to about 8 carbon atoms, or a substituted arylalkyl group, and x is 0 or 1, wherein the substituents on the substituted alkyl, aryl, and aryl groups can be (but are not limited to) alkyl groups, including saturated, unsaturated, linear, branched, and cyclic alkyl groups, preferably with from 1 to about 6 carbon atoms, substituted alkyl groups, preferably with from 1 to about 6 carbon atoms, aryl groups, preferably with from 6 to about 24 carbon atoms, substituted aryl groups, preferably with from 6 to about 24 carbon atoms, arylalkyl groups, preferably with from 7 to about 30 carbon atoms, substituted arylalkyl groups, preferably with from 7 to about 30 carbon atoms, alkoxy groups, preferably with from 1 to about 6 carbon atoms, substituted alkoxy groups, preferably with from to about 6 carbon atoms, aryloxy groups, preferably with from 6 to about 24 carbon atoms, substituted aryloxy groups, preferably with from 6 to about 24 carbon atoms, arylalkyloxy groups, preferably with from 7 to about 30 carbon atoms, substituted arylalkyloxy groups, preferably with from 7 to about 30 carbon atoms, amine groups, imine groups, ammonium groups, pyridine groups, pyridinium groups, ether groups, ester groups, amide groups, carbonyl groups, thiocarbonyl groups, sulfate groups, sulfonate groups, sulfide groups, sulfoxide groups, phosphine groups, phosphonium groups, phosphate groups, mercapto groups, nitroso groups, sulfone groups, acyl groups, acid anhydride groups, azide groups, and the like, wherein the substituents on the substituted alkyl groups, substituted aryl groups, substituted arylalkyl groups, substituted alkoxy groups, substituted aryloxy groups, and substituted arylalkyloxy groups can be (but are not limited to) hydroxy groups, amine groups, imine groups, ammonium groups, pyridine groups, pyridinium groups, ether groups, aldehyde groups, ketone groups, ester groups, amide groups, carboxylic acid groups, carbonyl groups, thiocarbonyl groups, sulfate groups, sulfonate groups, sulfide groups, sulfoxide groups, phosphine groups, phosphonium groups, phosphate groups, cyano groups, nitrile groups, mercapto groups, nitroso groups, halogen atoms, nitro groups, sulfone groups, acyl groups, acid anhydride groups, azide groups, mixtures thereof, and the like, wherein any two or more substituents can be joined together to form a ring. Examples of suitable bis(azides) include 4,4'-diazidostilbene, of the formula

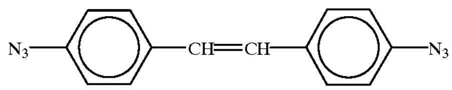

4,4'-diazidobenzophenone, of the formula

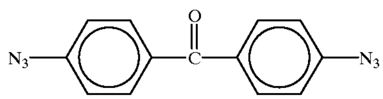

2,6-di-(4'-azidobenzal)-4-methylcyclohexanone, of the formula

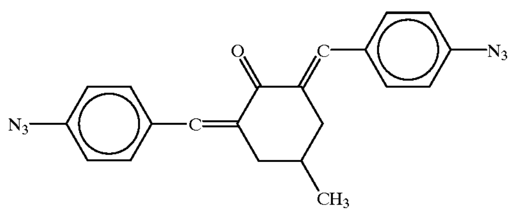

4,4'-diazidobenzalacetone, of the formula

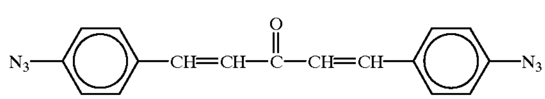

and the like. While not being limited to any particular theory, it is believed that exposure to, for example, ultraviolet radiation enables curing, as illustrated below for the hydroxymethylated polymer:

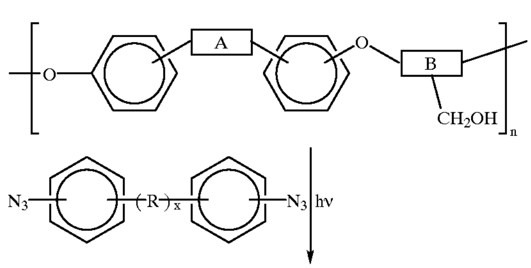

-continued

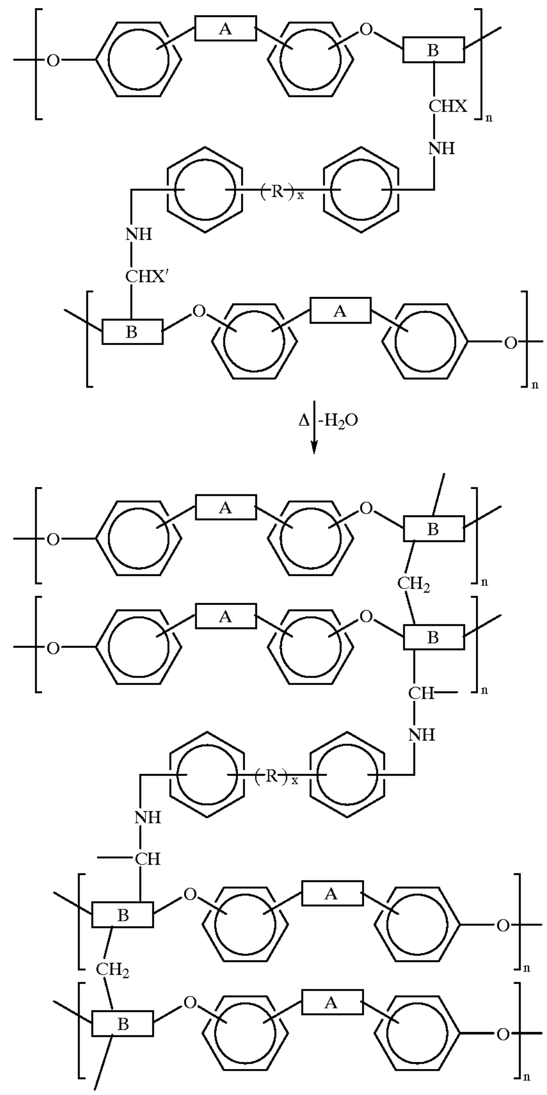

wherein X and X'each, independently of the other, is —H or —OH (or —H or a halogen atom in the case of the haloalkylated polymer). Similarly, for the allyl-substituted polymer, it is believed that the curing reaction scheme is as follows:

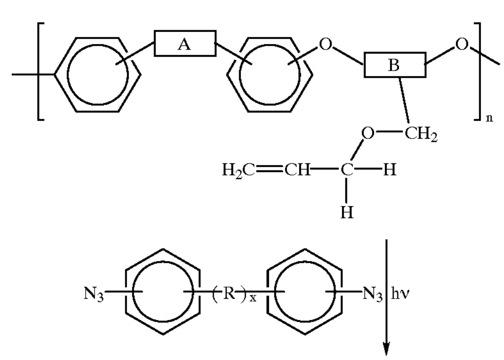

-continued

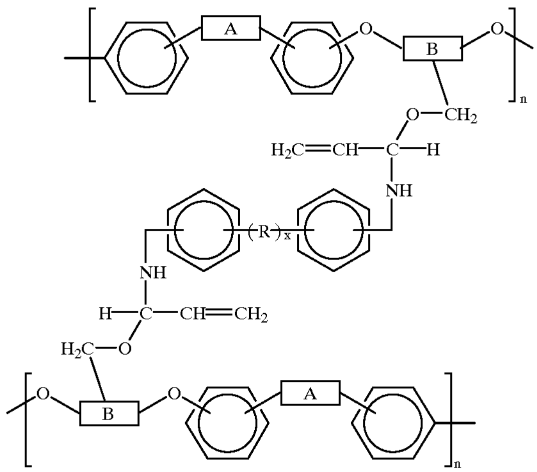

Alternatively, a hydroxyalkylated polymer can be further reacted to render it more photosensitive. For example, a hydroxymethylated polymer of the formula

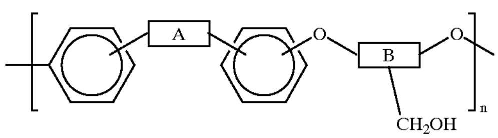

can react with isocyanato-ethyl methacrylate, of the formula

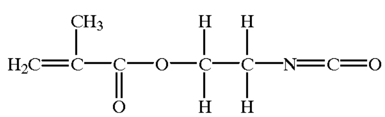

(available from Polysciences, Warrington, Pa.) to form a photoactive polymer of the formula

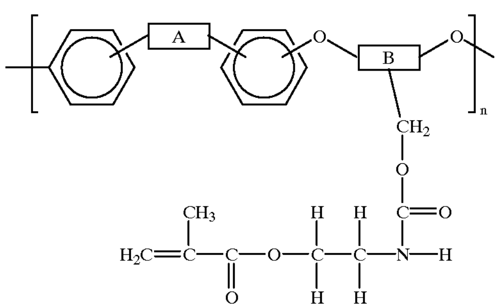

This reaction can be carried out in tetrahydrofuran at 25° C. with 1 part by weight polymer, 1 part by weight isocyanato-ethyl methacrylate, and 50 parts by weight methylene chloride. Typical reaction temperatures are from about 0 to about 50° C., with 10 to 25° C. preferred. Typical reaction times are between about 1 and about 24 hours, with about 16 hours preferred. During exposure to, for example, ultraviolet radiation, the ethylenic bond opens and crosslinking or chain extension occurs at that site.

While not being limited to any particular theory, it is believed that thermal cure can also lead to extraction of the hydroxy group and to crosslinking or chain extension at the "long" bond sites as shown below:

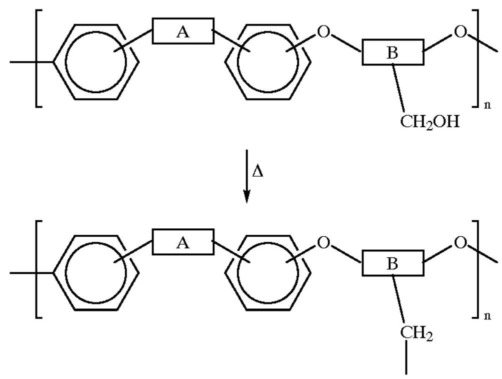

If desired, the hydroxyalkylated polymer can be further reacted with an unsaturated acid chloride to substitute some or all of the hydroxyalkyl groups with photosensitive groups such as acryloyl or methacryloyl groups or other unsaturated ester groups, as disclosed in U.S. Pat. No. 5,849,809 and Copending Application U.S. Ser. No. 09/159,426. Some or all of the hydroxyalkyl groups can be replaced with unsaturated ester substituents. Longer reaction times generally lead to greater degrees of substitution of hydroxyalkyl groups with unsaturated ester substituents.

Crosslinkable or chain extendable polymeric materials of the present invention can be used as components in ink jet printheads. The printheads of the present invention can be of any suitable configuration. Polymeric materials of the present invention, including both those unsubstituted with crosslinking or chain extending groups and those having crosslinking or chain extending groups, can be used as components in photosensitive imaging members. The imaging members of the present invention can be of any suitable configuration.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A polymer of the formula

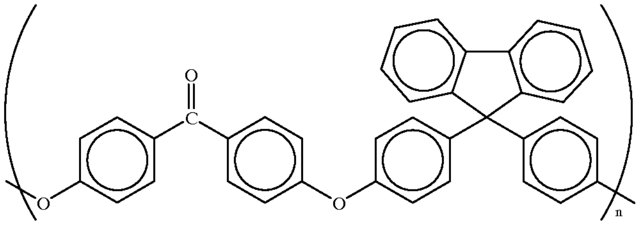

(hereinafter referred to as poly(4-FPK-FBPA)) wherein n is about 130 and represents the number of repeating monomer units was prepared as follows. A 1-liter, 3-neck round-bottom flask equipped with a Dean-Stark trap (Barrett) trap, condenser, mechanical stirrer, argon inlet, and stopper was situated in a silicone oil bath. 4,4'-Difluorobenzophenone (Aldrich Chemical Co., Milwaukee, Wis., 43.47 grams, 0.1992 mole), 9,9'-bis(4-hydroxyphenyl)fluorenonel (Aldrich, 75.06 grams, 0.2145 mole) potassium carbonate (65.56 grams), anhydrous N,N-dimethylacetamide (300 milliliters), and toluene (52 milliliters) were added to the flask and heated to 175° C. (oil bath temperature) while the volatile toluene component was collected and removed. After 5 hours of heating at 175° C. with continuous stirring, the reaction mixture was allowed to cool to 25° C. The solidified mass was extracted with methylene chloride, filtered and added to methanol to precipitate the polymer, which was collected by filtration, washed with water, and washed with methanol. The yield of vacuum dried product, poly(4-FPK-FBPA), was 71.7 grams. The polymer was analyzed by gel permeation chromatography with tetrahydrofuran as the elution solvent with the following results: $M_n$=59,100, $M_{peak}$=144,000, and Mw=136,100. The glass transition temperature of the polymer was 240° C., as determined by using differential scanning calorimetry at a heating rate of 20° C. per minute. Solution cast films from methylene chloride were clear, tough, and flexible. As a result of the stoichiometries used in the reaction, it is believed that this polymer had hydroxyl end groups derived from fluorenone bisphenol.

EXAMPLE II

A polymer of the formula

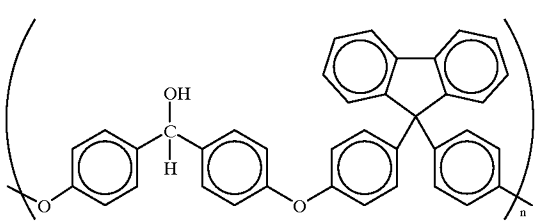

was prepared as follows. A 1-liter, 3-neck round-bottom flask equipped with a condenser, mechanical stirrer, argon inlet, and rubber septum was situated in a silicone oil bath. Poly(4-FPK-FBPA) (10 grams, prepared as described in Example I) in tetrahydrofuran (200 grams) was added, followed by 1 molar borane-tetrahydrofuran complex (Aldrich Chemical Co., Milwaukee, Wis., 83.5 grams). The resultant solution gelled. After refluxing the gel with mechanical stirring for 2 hours, the reaction mixture was allowed to cool and remain at 25° C. for 16 hours. Methanol was then cautiously added dropwise to react with residual borane. The solid residue was filtered off, washed with water, and then vacuum dried. Tetrahydrofuran (300 milliliters) was added to the solid, which did not dissolve until acetic acid (20 milliliters) was added. The solution (in portions of 25 milliliters) was added to water (750 milliliters for each 25 milliliter portion of polymer solution) using a Waring blender to precipitate a white polymer. The polymer was filtered, washed extensively with water, filtered, washed with methanol, filtered, and then vacuum dried. The polymer dissolved in tetrahydrofuran but was insoluble in methylene chloride, ethyl acetate, toluene, and methyl isobutyl ketone. When dissolved in tetrahydrofuran (8.5 grams), the hydroxylated polymer (1.2 grams) with N,N'-diphenyl-N, N'-bis(3"-ethylphenyl)-( 1,1'-biphenyl)-4,4'-diamine) (1.2 grams) was used to coat 25 micron charge (hole) transport layers for organic photoreceptors with hydroxygallium phthalocyanine photogenerator layers. Moreover, the addition of 0.1 gram of hexane diisocyanate to the above coating solution was found to improve markedly the electrical properties of the device.

The above reaction was repeated using 19.7 grams of poly(4-FPK-FBPA) in tetrahydrofuran (400 grams) and 1 molar borane-tetrahydrofuran complex in tetrahydrofuran (215 grams). After 2 hours reflux and 16 hours at 25° C., the reaction mixture was cautiously treated with methanol and then acetic acid, followed by addition to water to reprecipitate the polymer. The polymer was filtered, washed water, washed with methanol, and then vacuum dried.

EXAMPLE III

A polymer of the formula

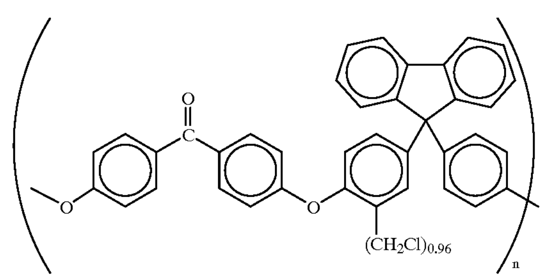

was prepared as follows. To a 5-liter 3-neck round-bottom flask equipped with a mechanical stirrer, reflux condenser, argon inlet and stopper that was situated in a silicone oil bath were added sequentially, acetyl chloride (388 grams, 320 milliliters), dimethoxymethane (450 milliliters), methanol (12.5 milliliters), tetrachloroethane (500 milliliters), and poly-(4-FPK-FBPA) (100 grams, obtained from Scientific Polymer Products) in tetrachloroethane (1250 milliliters). To this mixture was then added tin tetrachloride (5 milliliters) via an air-tight syringe. The reaction mixture was heated for 2 hours at between 90 and 100° C. oil bath set temperature. After cooling to 25° C., the reaction mixture was added to methanol to reprecipitate the polymer with 0.96 chloromethyl groups per repeat unit.

EXAMPLE IV

A polymer of the formula

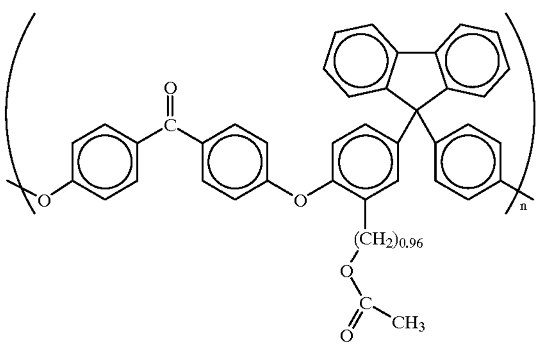

was prepared as follows. Chloromethylated poly(4-FPK-FBPA) (prepared as described in Example III, 78.5 grams) in N,N-dimethylacetamide (1,967 grams) was added to a 5-liter, 3-neck, round-bottom flask equipped with a mechanical stirrer, argon inlet and condenser and situated in a silicone oil bath. Sodium acetate (78.5 grams) was added and the reaction mixture was heated for 24 hours at 100° C. The reaction solution was then added to water to precipitate the polymer product, which was filtered and washed with methanol. In a similar procedure, the same polymer was prepared by magnetically stirring chloromethylated poly(4-FPK-FBPA) (25 grams, prepared as described in Example III) in N,N-dimethylacetamide (700 grams) with sodium acetate (15 grams, Aldrich) for one month at 25° C. The reaction solution was then decanted from the insoluble salts that settled on centrifugation, and was added to methanol to precipitate a white polymer that was filtered, washed with water, washed with methanol, and then vacuum dried. The yield was 12.2 grams.

EXAMPLE V

A polymer of the formula

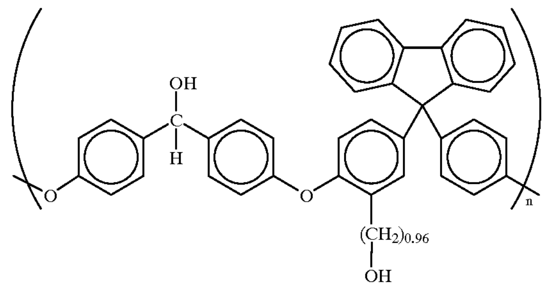

was prepared as follows. The acetylated polymer (50 grams, prepared as described in Example IV) in tetrahydrofuran (2,000 grams) was allowed to react with 1-molar borane-tetrahydrofuran complex in tetrahydrofuran (250 milliliters, Aldrich) at reflux for 1 hour. The reaction vessel was a 5-liter, 3-neck, round-bottom flask that was situated in a silicone oil bath and equipped with a mechanical stirrer, condenser, argon inlet, and rubber septum. Methanol was added to neutralize unreacted borane and acetic acid was added to form a solution of the polymer. The reaction mixture was then added to water to precipitate a white polymer that was filtered, washed with water, washed with methanol, and then vacuum dried. The polymer product dissolved in tetrahydrofuran and in a solution of 1-part ethanol to 9-parts tetrahydrofuran.

EXAMPLE VI

A polymer of the formula

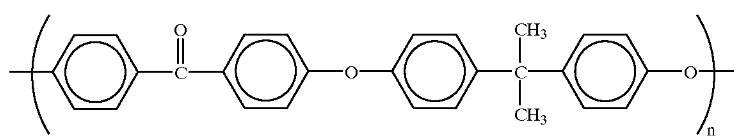

was prepared as follows. A 5-liter, 3-neck round-bottom flask equipped with a Dean-Stark trap (Barrett) trap, condenser, mechanical stirrer, argon inlet, and stopper was situated in a silicone oil bath. 4,4'-Dichlorobenzophenone-(Aldrich, 403.95 grams), bisphenol A (Aldrich, 340.87 grams), potassium carbonate (491.7 grams), anhydrous N,N-dimethylacetamide (2,250 milliliters), and toluene (412.5 milliliters, 359.25 grams) were added to the flask and heated to 170° C. (oil bath temperature) while the volatile toluene component was collected and removed. After 48 hours of heating at 170° C. with continuous stirring, the reaction mixture was allowed to cool to 25° C. The reaction mixture was thereafter filtered to remove insoluble salts, and the solution was then added to methanol to precipitate the polymer. The polymer was isolated by filtration, washed with water, washed with methanol, and then vacuum dried.

EXAMPLE VII

A polymer of the formula

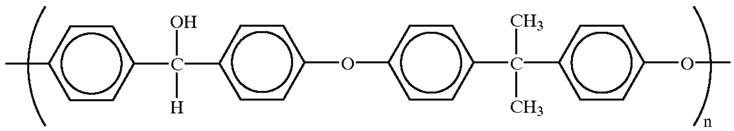

was prepared as follows. Poly(arylene ether ketone) (prepared as described in Example VI, 5 grams) in dioxane (50 milliliters) was treated with 1 molar borane-tetrahydrofuran complex in tetrahydrofuran) (50 milliliters). Heating with stirring at 70° C. was carried out for about 4 hours. The polymer solution gelled at 25° C. within 10 minutes after all the borane solution had been added. Vigorous gas evolution was observed. The polymer was treated with methanol and the polymer dissolved with gas evolution. The reaction mixture was concentrated using a rotary evaporator and was added to water to precipitate a polymer that was extensively washed with water and then with methanol. After vacuum drying, the yield of polymer was 4.6 grams.

Example VIII

A polymer of the formula

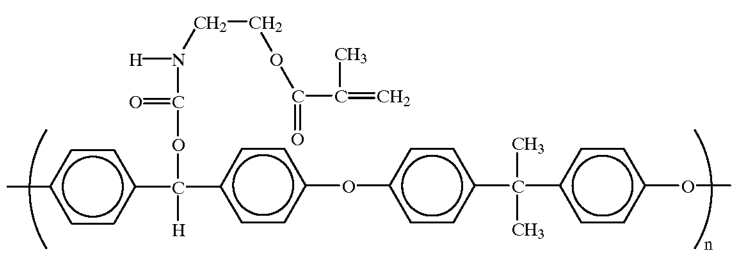

was prepared by adding 2-isocyanato-ethyl methacrylate (0.18 gram, Aldrich) to the polyarylene ether alcohol (prepared in Example VII, 0.5 gram) in tetrahydrofuran (3.76 grams). A photoreceptor charge transport layer was made by adding N,N'-diphenyl-N,N'-bis(3" -methylphenyl)-(1,1'-biphenyl)-4,4'-diamine) (0.5 gram) to the solution. When coated on a hydroxygallium binder generator layer at 29 microns (±5 microns) and tested on a flat plate xerographic scanner, the $V_0$ was 1,020 volts, the dark decay was 60 volts, and the residual voltage after light exposure was 60 volts.

EXAMPLE IX

A polymer of the formula

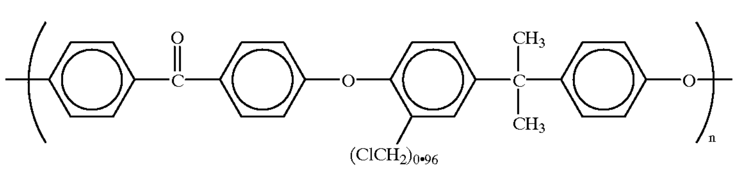

was prepared as follows. To a 5-liter 3-neck round-bottom flask equipped with a mechanical stirrer, reflux condenser, argon inlet and stopper that was situated in an ice bath were added sequentially, acetyl chloride (184 grams), dimethoxymethane (225 milliliters, 193 grams), methanol (6.25 milliliters), methylene chloride (500 milliliters), and poly(4-CPK-BPA) (75 grams, prepared as described in Example Vm) in methylene chloride (625 milliliters). To this mixture was then added tin tetrachloride (6.5 milliliters) via an air-tight syringe. The reaction mixture was heated for 4 hours at 55° C. oil bath set temperature. After cooling to 25° C., the reaction mixture was added to methanol to reprecipitate the polymer with 0.96 chloromethyl groups per repeat unit.

EXAMPLE X

A polymer of the formula

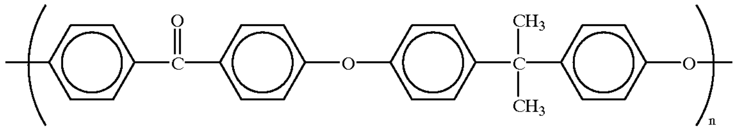

was prepared as follows. A 500-milliliter, 3-neck round-bottom flask equipped with a Dean-Stark trap (Barrett) trap, condenser, mechanical stirrer, argon inlet, and stopper was situated in a silicone oil bath. 4,4'-Difluorobenzophenone (Aldrich, 21.82 grams), bisphenol A (Aldrich, 22.64 grams), potassium carbonate (40 grams), anhydrous N,N-dimethylacetamide (300 milliliters), and toluene (52 milliliters) were added to the flask and heated to 175° C. (oil bath temperature) while the volatile toluene component was collected and removed. After 5 hours of heating at 175° C. with continuous stirring, phenol (5 grams) was added and the reaction mixture was heated and stirred at 175° C. for 30 more minutes. The reaction mixture was then allowed to cool to 25° C. The solidified mass was extracted with methylene chloride (500 milliliters) and filtered to remove insoluble salts. The solution was concentrated using a rotary evaporator and then was added to methanol to precipitate the polymer. The polymer was isolated by filtration, washed with water, washed with methanol, and then vacuum dried. The yield of vacuum dried product, poly(4-FPK-BPA) was 40 grams.

EXAMPLE XI

A polymer of the formula

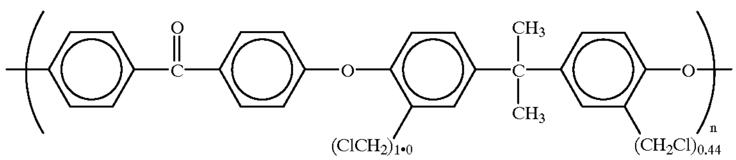

was prepared as follows. To a 1-liter 3-neck round-bottom flask equipped with a mechanical stirrer, reflux condenser, argon inlet and stopper that was situated in a silicone oil bath were added sequentially, acetyl chloride (140.1 grams, 128 milliliters), dimethoxymethane (157.6 grams), methanol (5 milliliters), tetrachloroethane (500 milliliters), and poly(4-FPK-BPA) (40 grams, prepared as described in Example X) in tetrachloroethane (500 milliliters). To this mixture was then added tin tetrachloride (0.6 milliliter) via an air-tight syringe. The reaction mixture was heated for 2 hours at 110° C. oil bath set temperature. After cooling to 25° C., the reaction mixture was added to methanol to reprecipitate the polymer with 1.44 chloromethyl groups per repeat unit.

EXAMPLE XII

A polymer of the formula

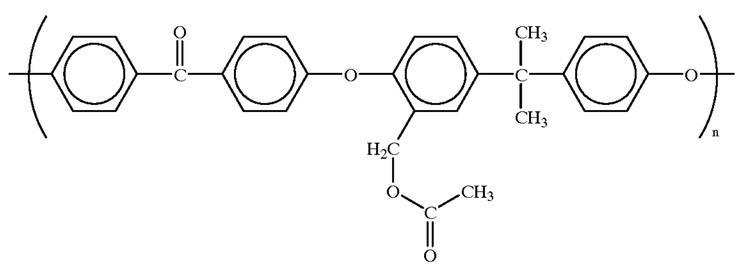

was prepared as follows. The chloromethylated polymer (prepared as described in Example IX, 15 grams) in N,N-dimethylacetamide (300 milliliters) was magnetically stirred with sodium acetate (Aldrich, 9 grams) for one month. The reaction mixture was then centrifuged, and the reaction solution was decanted off from residual salts. The solution was added to water to precipitate a white polymer that was filtered, washed with water, washed with methanol, and then vacuum dried.

EXAMPLE XIII

A polymer of the formula was prepared with the chloromethylated polymer (prepared as described in Example XI, 2 grams) in dioxane (50 milliliters) to which was added 1 molar borane-tetrahydrofuran complex (50 milliliters). The solution gelled within 10 minutes at 25° C. The reaction mixture was heated at between 70–80 minutes for 2 hours. Methanol was cautiously added with vigorous gas evolution, and the resultant solution was added to water to precipitate the polymer product. The white polymer was filtered, washed with water, washed with methanol, and then vacuum dried. The polymer (0.5 grams) in tetrahydrofuran (4.5 grams) was roll milled with titanium dioxide (MT500, 0.5 grams) and 60 grams of stainless steel shot for 16 hours. The dispersion was coated

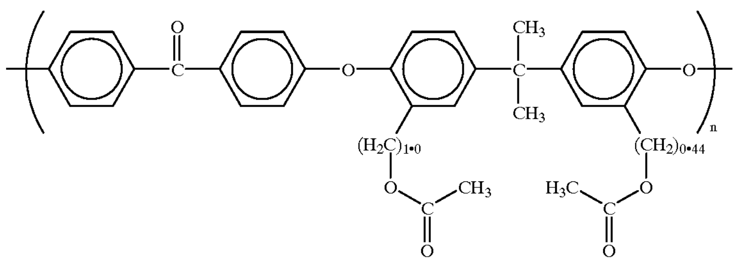

was prepared as follows. The chloromethylated polymer (1.44 CH2Cl groups per repeat unit, prepared as described in Example XI, 15 grams) in N,N-dimethylacetamide (283 grams) was magnetically stirred with sodium acetate (Aldrich, 9 grams) for one month. The reaction mixture was then centrifuged, and the reaction solution was decanted off from residual salts. The solution was added to water to precipitate a white polymer that was filtered, washed with water, washed with methanol, and then vacuum dried. The polymer in methylene chloride was reprecipitated into methanol, filtered, and then vacuum dried.

EXAMPLE XIV

A polymer of the formula using a 0.5 mil Bird applicator on metallized polyethylene terephthalate film and heated from 40 to 150° C. over 40 minutes. A photogenerator layer of hydroxygallium phthalocyanine dispersed in polystyrene-vinyl pyridine in toluene was coated using a 0.25 Bird applicator, and the coating was heated for 5 minutes at 135° C. A charge transport layer solution consisting of N,N'-diphenyl-N,N'-bis(3"-methylphenyl)-(1,1'-biphenyl)-4,4'-diamine (1.2 grams) in polycarbonate (1.2 grams) in methylene chloride (13.45 grams) was coated over the binder generator layer using a 4 mil Bird applicator. The device was dried from 40 to 100° C. over 30 minutes.

EXAMPLE XV

A polymer of the formula

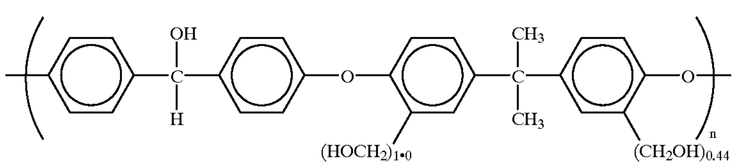

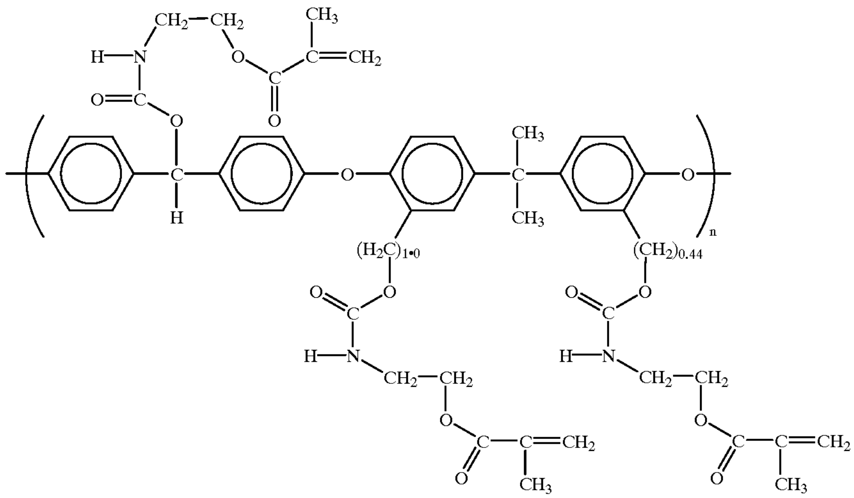

was prepared as follows. The hydroxymethylated-polyarylene ether alcohol (prepared as described in Example XIV, 1.0 gram) was allowed to react with 2-isocyantoethyl methacrylate (1.10 grams) in N-methylpyrrolidinone (9 grams) for 16 hours.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A polymer of the formula

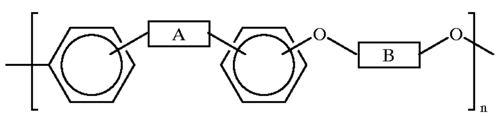

wherein A is

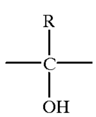

or a mixture of

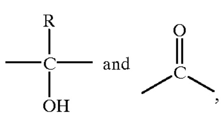

wherein R is a hydrogen atom, an alkyl group, an aryl group, or mixtures thereof, B is

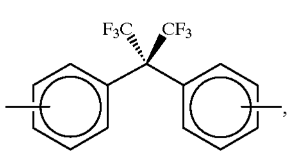

-continued

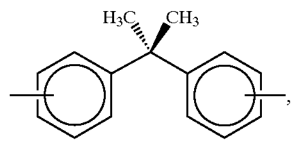

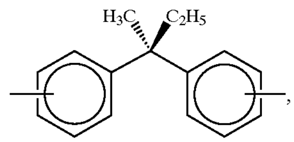

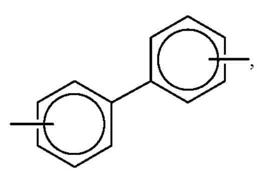

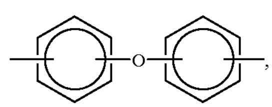

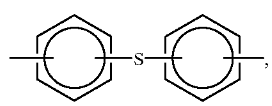

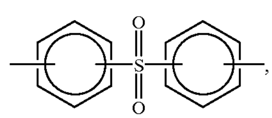

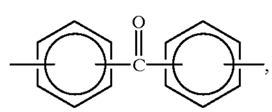

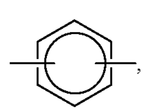

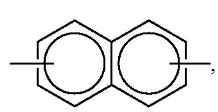

-continued

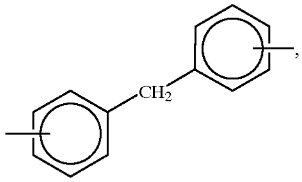

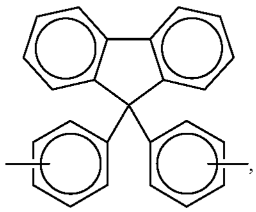

$—(CH_2)_v—$, wherein v is an integer of from 1 to about 20,

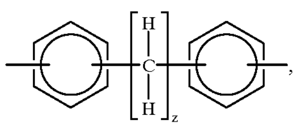

wherein z is an integer of from 2 to about 20,

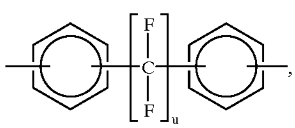

wherein U is an integer of from 1 to about 20,

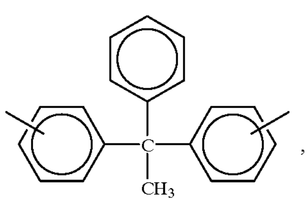

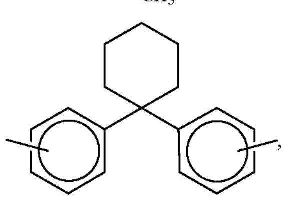

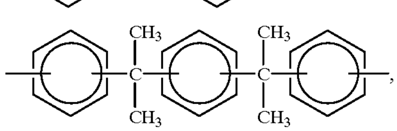

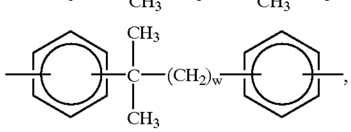

wherein w is an integer of from 1 to about 20,

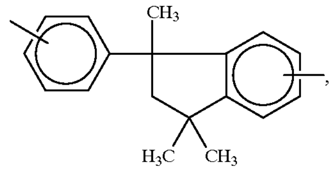

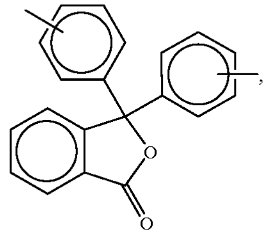

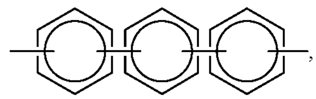

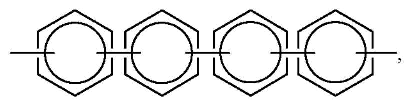

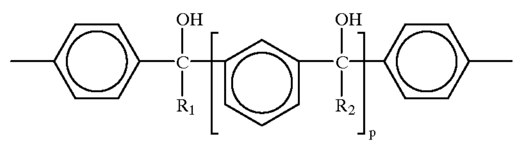

wherein $R_1$ and $R_2$ each, independently of the other, are hydrogen atoms, alkyl groups, or aryl groups, and p is an integer of 0 or 1,

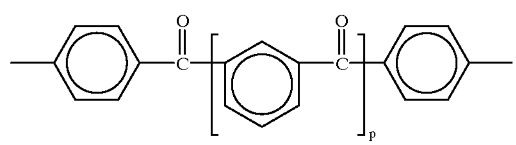

wherein p is an integer of 0 or 1, $—(CH_2O)_t$ wherein t is an integer of from 1 to about 20,

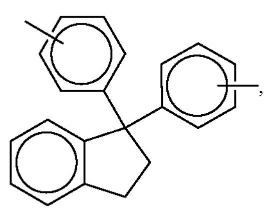

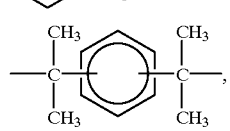

-continued

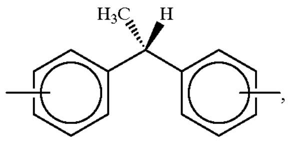

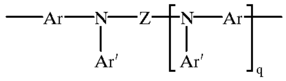

wherein (1) Z is

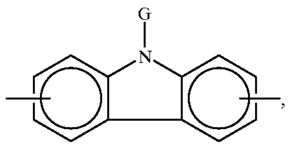

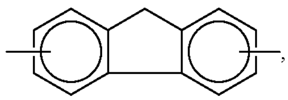

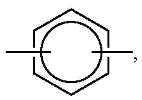

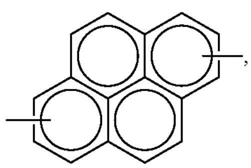

—Ar—(X)$_p$—Ar— wherein p is 0 or 1; (2) Ar is

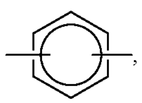

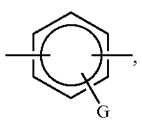

or

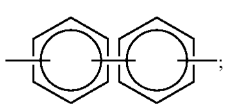

(3) G is an alkyl group selected from alkyl or isoalkyl groups containing from about 2 to about 10 carbon atoms; (4) Ar'is

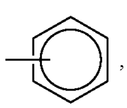

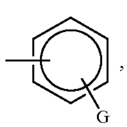

-continued or

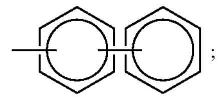

(5) X is

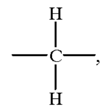

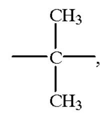

—O—,

—S—,

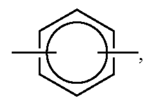

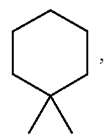

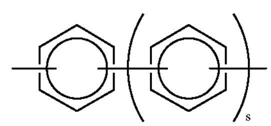

wherein s is 0, 1, or 2,

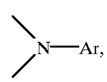

or

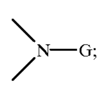

and (6) q is 0 or 1; or mixtures thereof, hydroxy-substituted, hydroxyalkyl-substituted, or hydroxyaryl-substituted derivatives thereof, or mixtures thereof, and n is an integer representing the number of repeating monomer units.

2. A polymer according to claim 1 wherein the weight average molecular weight of the polymer is from about 1,000 to about 100,000.

3. A polymer according to claim 1 wherein n is an integer of from about 2 to about 70.

4. A polymer according to claim 1 wherein the number average molecular weight of the polymer is from about 10,000 to about 100,000.

5. A polymer according to claim 1 wherein the weight average molecular weight of the polymer is from about 20,000 to about 350,000.

6. A polymer according to claim 1 wherein the polydispersity of the polymer is from about 2 to about 9.

7. A polymer according to claim 1 wherein the polymer is of the formula

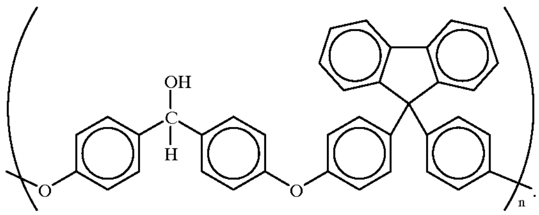

8. A polymer according to claim 1 wherein the polymer is of the formula

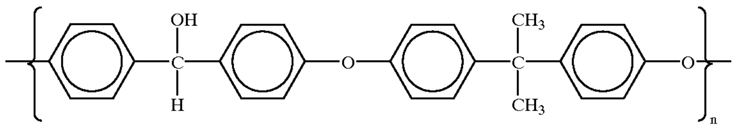

9. A polymer according to claim 1, said polymer being of the formula

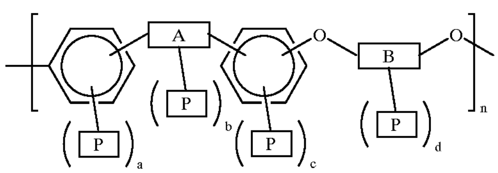

wherein P is a substituent which enables crosslinking of the polymer, and a, b, c, and d are each integers of 0, 1, 2, 3, or 4, provided that at least one of a, b, c, and d is equal to or greater than 1 in at least some of the monomer repeat units of the polymer.

10. A polymer according to claim 9 wherein the crosslinking substituent "P" is a hydroxyalkyl group, a haloalkyl group, an unsaturated ester group, an alkylcarboxymethylene group, an ether group, an epoxy group, an allyl group, an unsaturated ammonium group, an unsaturated phosphonium group, an ethynyl group, a vinyl group, a vinyl ether group, a benzocyclobutene group, a phenolic group, a maleimide group, a biphenylene group, a 5-norbornene-2,3-dicarboximido group, an isocyanate group, an acryloyl halide group, a vinyl benzyl halide group, an ethynyl benzyl halide group, a methacryloyl halide group, a 2-isocyanatoethyl methacrylate groups, a diisocyanate group, or a mixture thereof.

11. A crosslinked or chain extended polymer formed by crosslinking or chain extending a precursor polymer according to claim 9 having terminal end groups and monomer repeat units, said crosslinking or chain extension occurring through crosslinking substituents contained on at least some of the monomer repeat units of the precursor polymer.

12. A crosslinked or chain extended polymer according to claim 11 wherein the crosslinking substituent "P" is a hydroxyalkyl group, a haloalkyl group, an unsaturated ester group, an alkylcarboxymethylene group, an ether group, an epoxy group, an allyl group, an unsaturated ammonium group, an unsaturated phosphonium group, an ethynyl group, a vinyl group, a vinyl ether group, a benzocyclobutene group, a phenolic group, a maleimide group, a biphenylene group, a 5-norbornene-2,3-dicarboximido group, an isocyanate group, an acryloyl halide group, a vinyl benzyl halide group, an ethynyl benzyl halide group, a methacryloyl halide group, a 2-isocyanatoethyl methacrylate groups, a diisocyanate group, or a mixture thereof.

13. A process for preparing a polymer which comprises (1) providing a precursor polymer of the formula

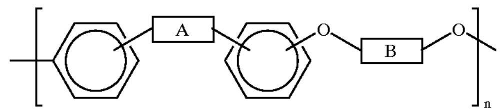

wherein A is

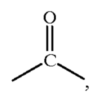

B is

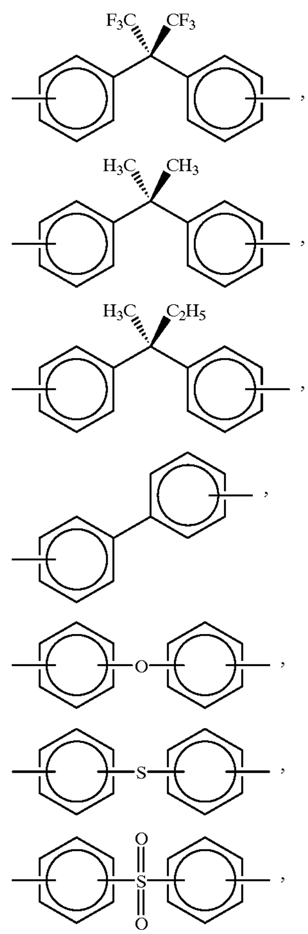

-continued

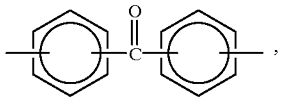

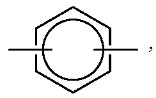

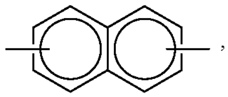

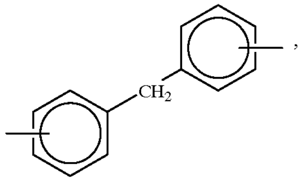

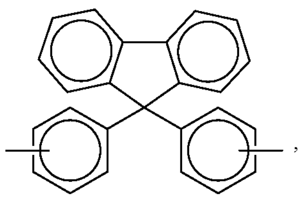

$-(CH_2)_v-$, wherein v is an integer of from 1 to about 20,

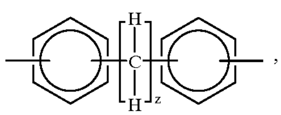

wherein z is an integer of from 2 to about 20,

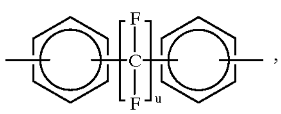

wherein u is an integer of from 1 to about 20,

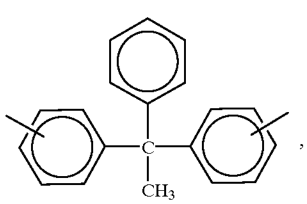

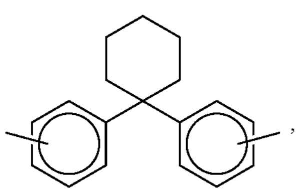

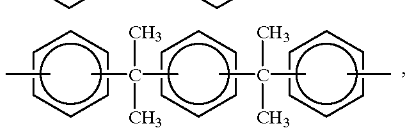

-continued

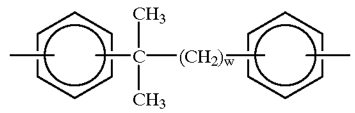

wherein w is an integer of from 1 to about 20,

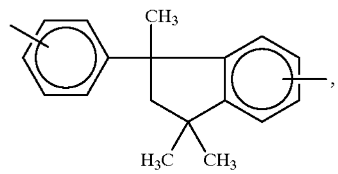

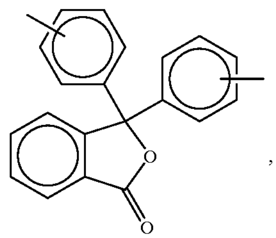

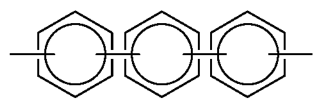

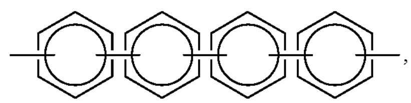

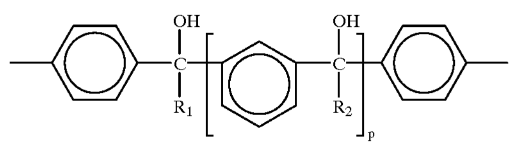

wherein $R_1$ and $R_2$ each, independently of the other, are hydrogen atoms, alkyl groups, or aryl groups, and p is an integer of 0 or 1,

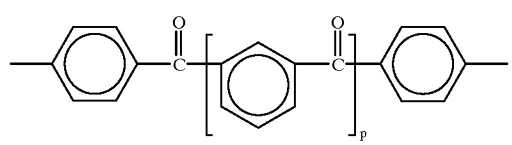

wherein p is an integer of 0 or 1, $-(CH_2O)_t-$ wherein t is an integer of from 1 to about 20,

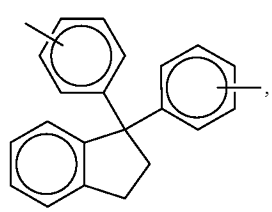

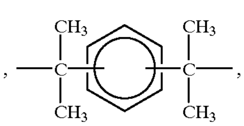

-continued

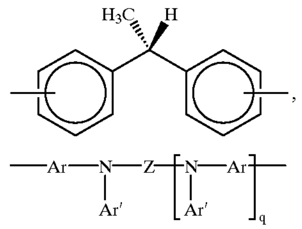

wherein (1) Z is

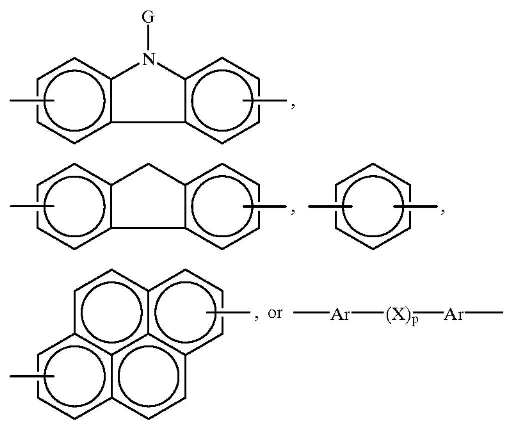

wherein p is 0 or 1; (2) Ar is

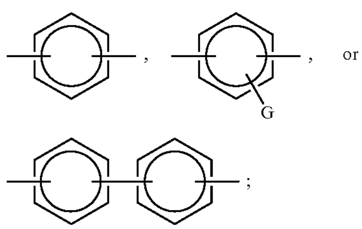

(3) G is an alkyl group selected from alkyl or isoalkyl groups containing from about 2 to about 10 carbon atoms; (4) Ar'is

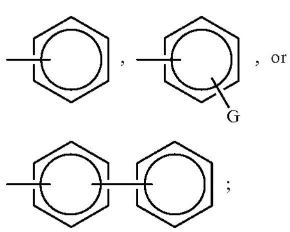

(5) X is

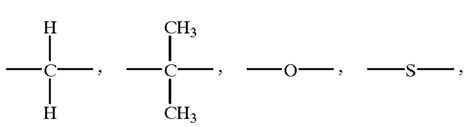

-continued

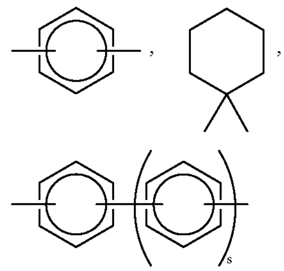

wherein s is 0, 1, or 2,

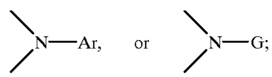

and (6) q is 0 or 1; or mixtures thereof, hydroxy-substituted, hydroxyalkyl-substituted, or hydroxyaryl-substituted derivatives thereof, or mixtures thereof, and n is an integer representing the number of repeating monomer units, and (2) reacting the precursor polymer with borane, resulting in formation of a polymer of the formula

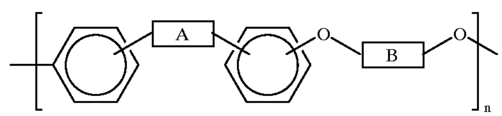

wherein A is

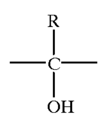

or a mixture of

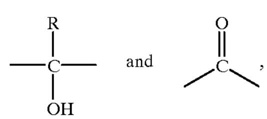

wherein R is a hydrogen atom, an alkyl group, an aryl group, or mixtures thereof.

14. A process according to claim 13 wherein the polymer thus formed has a weight average molecular weight of from about 1,000 to about 100,000.

15. A process according to claim 13 wherein the polymer thus formed has a value of n of from about 2 to about 70.

16. A process according to claim 13 wherein the polymer thus formed has a number average molecular weight of from about 10,000 to about 100,000.

17. A process according to claim 16 wherein the polymer thus formed has a weight average molecular weight of from about 20,000 to about 350,000.

18. A process according to claim 13 wherein the polymer thus formed has a polydispersity of from about 2 to about 9.

19. A polymer prepared by the process of claim 13.

20. A process for preparing a polymer which comprises (1) providing a precursor polymer of the formula

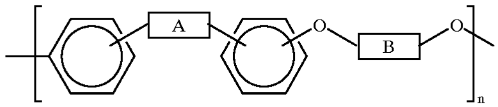
wherein A is
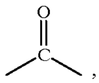
B is
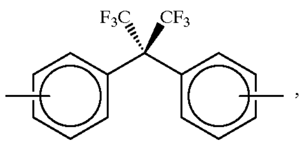
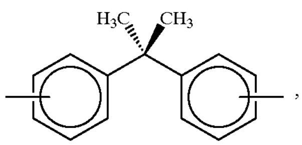
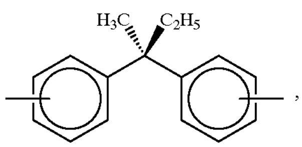
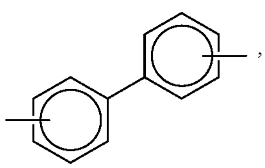
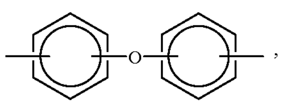
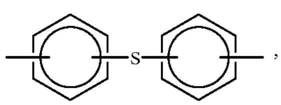
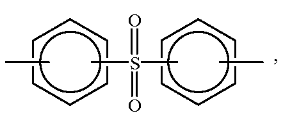
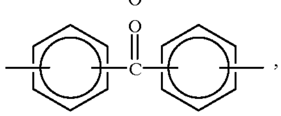
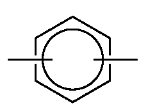
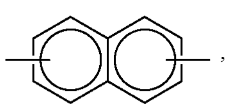
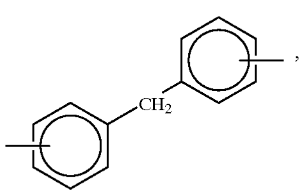
-continued
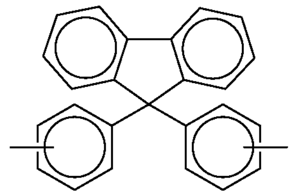
wherein v is an integer of from 1 to about 20,
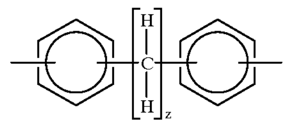
wherein z is an integer of from 2 to about 20,
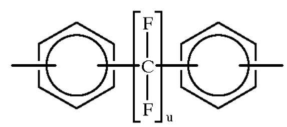
wherein u is an integer of from 1 to about 20,
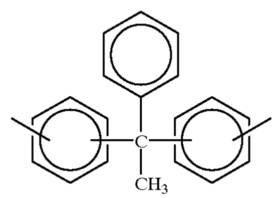
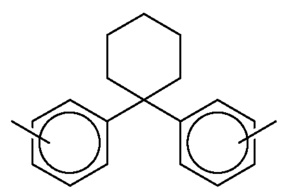
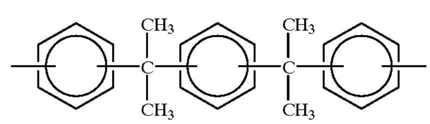
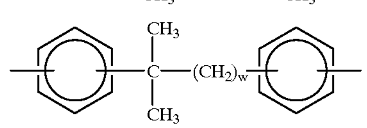
wherein w is an integer of from 1 to about 20,
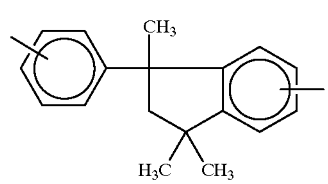

-continued
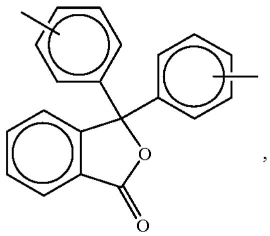
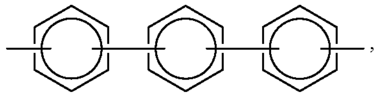
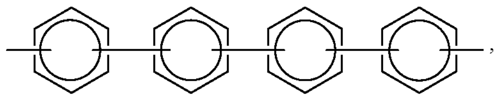
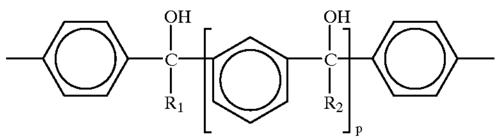
wherein $R_1$ and $R_2$ each, independently of the other, are hydrogen atoms, alkyl groups, or aryl groups, and p is an integer of 0 or 1,
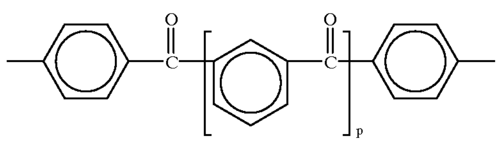
wherein p is an integer of 0 or 1,
$$—(CH_2O)_t—$$
wherein t is an integer of from 1 to about 20,
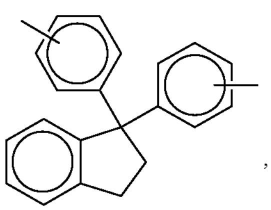
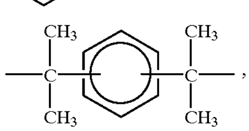
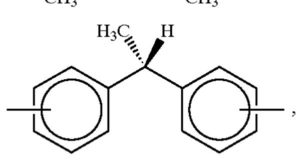
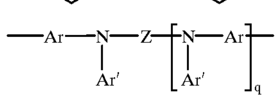
wherein (1) Z is
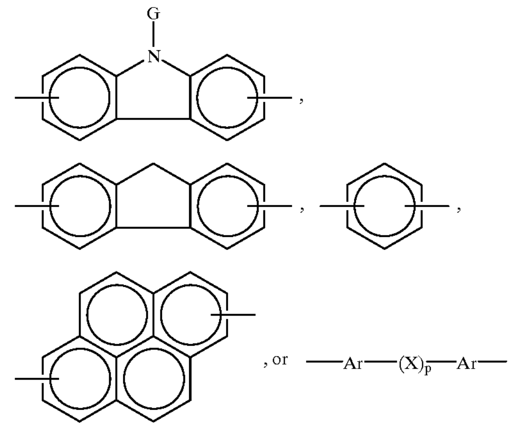
wherein p is 0 or 1; (2) Ar is
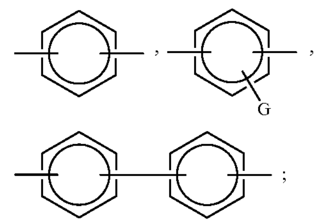
(3) G is an alkyl group selected from alkyl or isoalkyl groups containing from about 2 to about 10 carbon atoms; (4) Ar'is
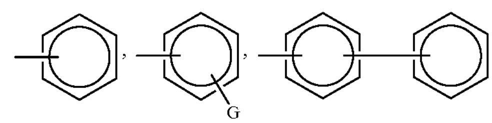
(5) X is
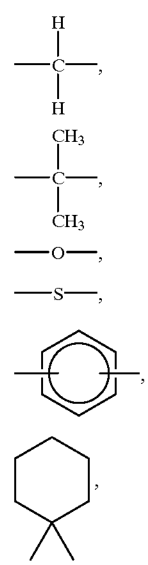

-continued

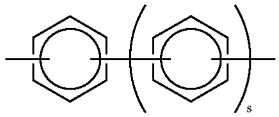

wherein s is 0, 1, or 2,

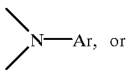

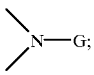

and (6) q is 0 or 1; or mixtures thereof, hydroxy-substituted, hydroxyalkyl-substituted, or hydroxyaryl-substituted derivatives thereof, or mixtures thereof, and n is an integer representing the number of repeating monomer units, (2) reacting the precursor polymer with a reagent of the formula RMgX, wherein R is a hydrogen atom, an alkyl group, an aryl group, or mixtures thereof and X is a halogen atom, and (3) subsequent to step 2, adding water or acid to the polymer, thereby resulting in formation of a polymer of the formula

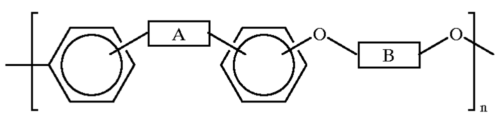

wherein A is

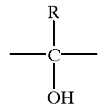

or a mixture of

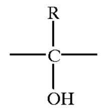

and

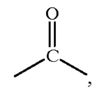

wherein R is a hydrogen atom, an alkyl group, an aryl group, or mixtures there of.

21. A process according to claim 20 wherein the polymer thus formed has a weight average molecular weight of from about 1,000 to about 100,000.

22. A process according to claim 20 wherein the polymer thus formed has a value of n of from about 2 to about 70.

23. A process according to claim 20 wherein the polymer thus formed has a number average molecular weight of from about 10,000 to about 300,000.

24. A process according to claim 20 wherein the polymer thus formed has a weight average molecular weight of from about 20,000 to about 350,000.

25. A process according to claim 20 wherein the polymer thus formed has a polydispersity of from about 2 to about 9.

26. A polymer prepared by the process of claim 20.

* * * * *